US009065598B2

(12) United States Patent
Ouchi et al.

(10) Patent No.: US 9,065,598 B2
(45) Date of Patent: Jun. 23, 2015

(54) TRANSMITTING APPARATUS, RECEIVING APPARATUS, TRANSMITTING METHOD, AND RECEIVING METHOD

(75) Inventors: Mikihiro Ouchi, Osaka (JP); Tomohiro Kimura, Osaka (JP); Yoshinobu Matsumura, Osaka (JP)

(73) Assignee: Panasonic Corporation, Osaka (JP)

( * ) Notice: Subject to any disclaimer, the term of this patent is extended or adjusted under 35 U.S.C. 154(b) by 313 days.

(21) Appl. No.: 13/577,599

(22) PCT Filed: Dec. 9, 2011

(86) PCT No.: PCT/JP2011/006891
§ 371 (c)(1),
(2), (4) Date: Aug. 7, 2012

(87) PCT Pub. No.: WO2012/077353
PCT Pub. Date: Jun. 14, 2012

(65) Prior Publication Data
US 2012/0307159 A1    Dec. 6, 2012

(30) Foreign Application Priority Data

Dec. 10, 2010   (JP) ................................. 2010-276443
Dec. 10, 2010   (JP) ................................. 2010-276444

(51) Int. Cl.
*H04L 27/28*      (2006.01)
*H04L 5/00*       (2006.01)
*H04L 12/28*      (2006.01)

(52) U.S. Cl.
CPC ............ *H04L 5/0007* (2013.01); *H04L 5/0053* (2013.01); *H04L 12/2801* (2013.01)

(58) Field of Classification Search
CPC ... H04L 1/0041; H04L 1/0071; H04L 5/0007; H04L 5/0053; H04L 12/2801; H04L 27/34; H04L 27/2607; H04B 7/0413; H04N 21/4344; H04N 21/4345; H04N 21/6112; H04N 21/4347
USPC ................. 375/260, 295, 298, 316, 320, 340; 348/723, 725
See application file for complete search history.

(56) References Cited

U.S. PATENT DOCUMENTS 8,009,685 B2    8/2011  Himmanen et al.
2009/0094356 A1*  4/2009  Vare .............................. 709/223
(Continued)

FOREIGN PATENT DOCUMENTS

EP    2 234 296      9/2010
WO    2009/095526    8/2009

OTHER PUBLICATIONS

International Search Report issued Jan. 10, 2012 in International (PCT) Application No. PCT/JP2011/006891.
(Continued)

*Primary Examiner* — Syed Haider
(74) *Attorney, Agent, or Firm* — Wenderoth, Lind & Ponack, L.L.P.

(57) ABSTRACT

In order to implement both a physical later pipe (PLP) structure and a plurality of receiver classes, a transmitting apparatus includes: a signaling information generation unit which generates signaling information including a transmission parameter for each of PLPs; a PLP processing group which performs processing based on the transmission parameter for each of the PLPs; and a transmitting unit which transmits data including the generated signaling information and PLP data for each of the PLPs. The PLP data is received by a receiving apparatus that is indicated by a flag of the PLP and is not received by another receiving apparatus, the receiving apparatuses being included in a plurality of receiving apparatuses classified under a plurality of states. The generated signaling information includes, as the transmission parameter for each of the PLPs, the flag of the PLP.

10 Claims, 67 Drawing Sheets

(56) References Cited

U.S. PATENT DOCUMENTS

| | | | |
|---|---|---|---|
| 2009/0196217 | A1 | 8/2009 | Himmanen et al. |
| 2009/0203326 | A1 | 8/2009 | Vesma et al. |
| 2009/0213853 | A1* | 8/2009 | Kwon et al. .................. 370/389 |
| 2010/0250764 | A1 | 9/2010 | Vare et al. |
| 2011/0026447 | A1 | 2/2011 | Lim et al. |
| 2011/0158355 | A1* | 6/2011 | Shinya et al. ................. 375/340 |
| 2013/0219431 | A1* | 8/2013 | Hong et al. .................... 725/54 |
| 2014/0016720 | A1* | 1/2014 | Ko et al. ....................... 375/295 |

OTHER PUBLICATIONS

"ETSI EN 302 755 V1.1.1: Digital Video Broadcasting (DVB); Frame structure channel coding and modulation for a second generation digital terrestrial television broadcasting system (DVB-T2)", European Telecommunications Standards Institute, Sep. 2009, p. 17-20, 55-75.

"DVB BlueBook A133: Implementation guidelines for a second generation digital terrestrial television broadcasting system (DVB-T2) (draft ETSI TR 102 831 V0.10.4)", European Telecommunications Standards Institute, Jun. 2010.

"ETSI EN 302 583 V1.1.2: Digital Video Broadcasting (DVB); Framing structure, channel coding and modulation for Satellite Services to Handheld devices (SH) below 3 GHz", European Telecommunications Standards Institute, Feb. 2010.

"DVB BlueBook A120: Guidelines for Implementation for Satellite Services to Handheld devices (SH) below 3GHz (dTS 102 584 V1.1.2)", European Telecommunications Standards Institute, Jun. 2010.

"DVB TM-H NGH, Call for Technologies(CfT), v1.0", http://www.dvb.org/technology/dvb-ngh/DVB-NGH-Call-for-Technologies.doc, Nov. 2009.

"Commercial Requirements for DVB-NGH, DVB CM-NGH version 1.01", Jun. 29, 2009.

"Final draft ETSI EN 302 583 V1.1.0: Digital Video Broadcasting (DVB); Framing Structure, channel coding and modulation for Satellite Services to Handheld devices (SH) below 3 GHz", European Telecommunications Standards Institute, Jan. 2008, p. 9-10.

Supplementary European Search Report issued Apr. 16, 2015 in European Application No. 11846971.7.

"Digital Video Broadcasting (DVB); Frame structure channel coding and modulation for a second generation digital terrestrial television broadcasting system (DVB-T2)", European Standard (Telecommunications Series), European Telecommunications Standards Institute (ETSI), 650, Route Des Lucioles; F-06921 Sophia-Antipolis; France, No. V1.1.1, Jul. 1, 2009.

DVB Organization: "TM-NGH572_101208LSFH-Minutes_37$^{th}$_Meeting_Jeju_101019_101021.pdf", DVB, Digital Video Broadcasting, c/o EBU—17A Ancienne Route—CH-1218 Grand Saconnex, Geneva—Switzerland, Dec. 8, 2010.

DVB Organization: "TM-NGH417r1_100910FHLS_Summary.pdf", DVB, Digital Video Broadcasting, c/o EBU—17A Ancienne Route—CH-1218 Grand Saconnex, Geneva—Switzerland, Sep. 10, 2010.

* cited by examiner

FIG. 6A

| Receiver class | Component to be received | Maximum number of PLPs to be received | Maximum interleaved total amount | Maximum DJB total capacity |
|---|---|---|---|---|
| class-1 | L2 information, Audio | 2 | (2^17 + 2^15)cells | 1 Mbit |
| class-2 | L2 information, Audio, Video | 3 | (2^19 + 2^15)cells | 2 Mbits |

FIG. 6B

| TS | Program | Corresponding PLP group of program | Corresponding PLP group of receiver class-1 | Corresponding PLP group of receiver class-2 |
|---|---|---|---|---|
| TS-1 | Program-1 | PLP-1, 2, 5 | PLP-1, 5 | PLP-1, 2, 5 |
| TS-1 | Program-2 | PLP-3, 4, 5 | PLP-3, 5 | PLP-3, 4, 5 |
| TS-2 | Program-1 | PLP-6, 7, 8 | PLP-6, 8 | PLP-6, 7, 8 |

FIG. 6C

```
                                               1a
for i=0...NUM_PLP-1
{
  PLP_ID                               1b
  PLP_TYPE
  ......
  PLP_RX_CLASS    //"0": class-2, "1": class-1/2
  PLP_SYNC_COND   //"0": strict, "1": not strict
                                               1c
}
```

FIG. 12

| TS | Program | Corresponding PLP group of program | Corresponding PLP group of receiver class-1 | Corresponding PLP group of receiver class-2 |
|---|---|---|---|---|
| TS-1 | Program-1 | PLP-1, 2, 4 | PLP-1, 4 | PLP-1, 2, 4 |
| | Program-2 | PLP-1, 3, 4 | PLP-1, 4 | PLP-1, 3, 4 |
| TS-2 | Program-1 | PLP-5, 6, 7 | PLP-5, 7 | PLP-5, 6, 7 |

FIG. 16A

| Receiver class | Component to be received | Maximum number of PLPs to be received | Maximum interleaved total amount | Maximum DJB total capacity |
|---|---|---|---|---|
| class-1 | L2 information, Audio | 2 | (2^17 + 2^15)cells | 1 Mbit |
| class-2 | L2 information, Audio, Video B | 3 | (2^18 + 2^15)cells | 1.5 Mbits |
| class-3 | L2 information, Audio, Video B, Video E | 4 | (2^19 + 2^15)cells | 2 Mbits |

FIG. 16B

| TS | Program | Corresponding PLP group of program | Corresponding PLP group of receiver class-1 | Corresponding PLP group of receiver class-2 | Corresponding PLP group of receiver class-3 |
|---|---|---|---|---|---|
| TS-1 | Program-1 | PLP-1, 2, 3, 7 | PLP-1, 7 | PLP-1, 2, 7 | PLP-1, 2, 3, 7 |
| | Program-2 | PLP-4, 5, 6, 7 | PLP-4, 7 | PLP-4, 5, 7 | PLP-4, 5, 6, 7 |
| TS-2 | Program-1 | PLP-8, 9, 10, 11 | PLP-8, 11 | PLP-8, 9, 11 | PLP-8, 9, 10, 11 |

FIG. 16C

```
for i=0...NUM_PLP-1
{
    PLP_ID
    PLP_TYPE
    ......
    PLP_RX_CLASS   //"0": class-3, "1": class-2/3, "2": class-1/2/3
    PLP_SYNC_COND  //"0": strict, "1": not strict
    ......
}
```

FIG. 21A

| Receiver class | Component to be received | Maximum number of PLPs to be received | Maximum interleaved total amount | Maximum DJB total capacity | Minimum number of receiving antennas | MISO-MIMO decoding |
|---|---|---|---|---|---|---|
| class-1 | L2 information, Audio | 2 | (2^17 + 2^15)cells | 1 Mbit | 1 | Unnecessary |
| class-2 | L2 information, Audio, Video B | 3 | (2^19 + 2^15)cells | 1.5 Mbits | 1 | MISO decoding |
| class-3 | L2 information, Audio, Video B, Video E | 4 | (2^20 + 2^15)cells | 2 Mbits | 2 | MISO-MIMO decoding |

FIG. 21B

```
for i=0...NUM_PLP-1
{
    PLP_ID
    PLP_TYPE
    ......
    PLP_RX_CLASS       //"0": class-3, "1": class-2/3, "2": class-1/2/3
    PLP_SYNC_COND      //"0": strict, "1": not strict
    PLP_MIMO_MISO_SISO //"0": MIMO, "1": MISO, "2": SISO
    ......
}
```

FIG. 28A

| Receiver class | Maximum interleaved amount | Maximum DJB capacity | FEC decoding | Standard branch |
|---|---|---|---|---|
| class-1a | 2^19 cells | 2 Mbits | LDPC | Branch 1 |
| class-1b | 2^19 cells | 2 Mbits | Turbo | Branch 1 |
| class-2 | 2^19 cells | 2 Mbits | LDPC, Turbo | Branches 1 and 2 |

FIG. 28B

| TS | Program | Corresponding PLP of program | Corresponding PLP of receiver class-1a, -1b, and -2 | FEC coding | Standard branch |
|---|---|---|---|---|---|
| TS-1 | Program-1 | PLP-1 | PLP-1 (Cannot be received by class-1a) | Turbo | Branch 2 |
| | Program-2 | PLP-2 | PLP-2 (Cannot be received by class-1b) | LDPC | Branch 1 |
| TS-2 | Program-1 | PLP-1 | | | |

FIG. 28C

```
for i=0...NUM_PLP-1
{
   PLP_ID
   PLP_TYPE
   ......
   PLP_RX_CLASS   //"0": class-1a/2 (LDPC), "1": class-1b/2 (Turbo)
   ......
}
```

FIG. 28D

```
for i=0...NUM_PLP-1
{
   PLP_ID
   PLP_TYPE
   ......
   PLP_BRANCH   //"0": br.1 (LDPC), "1": br.2 (Turbo)
   ......
}
```

FIG. 28E

```
for i=0...NUM_PLP-1
{
   PLP_ID
   PLP_TYPE
   ......
   PLP_FEC_CODE   //"0": LDPC (br.1), "1": Turbo(br.2)
   ......
}
```

FIG. 35A

| Receiver class | Maximum interleaved amount | Maximum DJB capacity | Minimum number of receiving antennas | MIMO decoding | Standard version |
|---|---|---|---|---|---|
| class-1 | 2^19 cells | 2 Mbits | 1 | Unnecessary | Version 1 |
| class-2 | 2^20 cells | 2 Mbits | 2 | Necessary | Versions 1 and 2 |

FIG. 35B

| TS | Program | Corresponding PLP of program | Corresponding PLP of receiver class-1 and -2 | SISO or MIMO | Standard version |
|---|---|---|---|---|---|
| TS-1 | Program-1 | PLP-1 | PLP-1 (Cannot be received by class-1) | MIMO | Version 2 |
| | Program-2 | PLP-2 | PLP-2 | SISO | Version 1 |
| TS-2 | Program-1 | PLP-1 | | | |

FIG. 35C

```
for i=0...NUM_PLP-1
{
    PLP_ID
    PLP_TYPE
    ......
    PLP_RX_CLASS   //"0": class-1/2 (SISO), "1": class-2 (MIMO)
    ......
}
```

FIG. 35D

```
for i=0...NUM_PLP-1
{
    PLP_ID
    PLP_TYPE
    ......
    PLP_VERSION   //"0": ver.1 (SISO), "1": ver.2 (MIMO)
    ......
}
```

FIG. 35E

```
for i=0...NUM_PLP-1
{
    PLP_ID
    PLP_TYPE
    ......
    PLP_MIMO_SISO   //"0": SISO (ver.1), "1": MIMO (ver.2)
    ......
}
```

FIG. 46

This receiver belongs to the receiver class-2.
You can enjoy both audio and (standard definition) video of each program.

FIG. 54

This receiver belongs to the receiver class-1b.
You can enjoy only the programs that can be received by the receiver class-1b.

FIG. 57

This receiver belongs to the receiver class-1. You can enjoy only the programs that can be received by the receiver class-1.

FIG. 61

This receiver belongs to the receiver class-1b.
This program cannot be received by the receiver class-1b.

TRANSMITTING APPARATUS, RECEIVING APPARATUS, TRANSMITTING METHOD, AND RECEIVING METHOD

TECHNICAL FIELD

The present invention relates to a digital transmission technology for implementing a receiver class.

BACKGROUND ART

Digital Video Broadcasting-Terrestrial (DVB-T) is a European-based transmission standard for digital terrestrial television and has generally allowed Europe and other countries to proceed with the digitalization of television broadcasting.

In 2006, standardization of Digital Video Broadcasting-Second Generation Terrestrial (DVB-T2) which is a transmission standard for the second generation terrestrial television was started to improve the frequency usage efficiency.

As with the DVB-T standard, the DVB-T2 standard also adopts the Orthogonal Frequency Division Multiplexing (OFDM) method (see Non Patent Literatures 1 and 2).

FIG. 1 is a diagram showing a transmission frame structure according to the DVB-T2 standard.

The DVB-T2 standard has a concept called a physical layer pipe (PLP). More specifically, as one of the characteristics of the DVB-T2 standard, transmission parameters such as a modulation method and a code rate, can be set independently for each PLP. The number of PLPs is 1 at the minimum and 255 at the maximum. FIG. 1 shows the case where the number of PLPs is 10, as an example.

The following is a transmission frame structure.
Super frame=N_T2 frames (N_T2=2 to 255)
Frame=P1 symbol+P2 symbols+data symbols
P1 symbol=1 symbol
P2 symbol=N_P2 symbols (N_P2 is uniquely identified by the FFT size)
Data symbol=L_data symbols (L_data is variable, having upper and lower limits)

The P1 symbol is 1 k in the FFT size and is sent using a guard interval (GI)=½. The P1 symbol includes 7 bits of information of S1 and S2 to transmit information, such as the FFT size, regarding the P2 symbol and the data symbol following the present P1 symbol.

The P2 symbol includes L1 signaling information in a first half and main signal data in a remaining second half. The data symbol includes the rest of the main signal data.

The L1 signaling information to be sent by the P2 symbol includes L1-pre information used mainly for transmitting information that is common to all the PLPs. Moreover, the L1 signaling information includes L1-post information used mainly for transmitting information that may be different for each of the PLPs.

FIG. 2 is a diagram showing a configuration of a transmitting apparatus 2000 according to the DVB-T2 standard (see Non Patent Literature 1 (the DVB-T2 specification)).

The transmitting apparatus 2000 includes two transport stream (TS) generation units 2010 and 2011 and a physical layer processing unit 2012.

It is shown, as an example, that the TS generation unit 2010 generates two programs in a TS.

To be more specific, the TS generation unit 2010 includes an audio coding unit (shown as 20211 and 20212) and a video coding unit (shown as 20221 and 20222) for each of the programs.

Moreover, the TS generation unit 2010 includes a packetization unit (shown as 20231 to 20234) for each of the audio and video service components in the corresponding program.

Furthermore, the TS generation unit 2010 includes a packetized-stream multiplexing unit 2024 and a layer-2 (L2) information processing unit 2025.

It is also shown, as an example, that the TS generation unit 2011 different from the aforementioned TS generation unit 2010 generates one program in a TS.

To be more specific, the TS generation unit 2011 includes an audio coding unit (shown as 20211) and a video coding unit (shown as 20221).

Moreover, the TS generation unit 2011 includes a packetization unit (shown as 20231 and 20232) for each of the audio and video service components in the program.

Furthermore, the TS generation unit 2011 includes a packetized-stream multiplexing unit 2024 and an L2 information processing unit 2025.

It is shown, as an example, that the physical layer processing unit 2012 generates two PLPs (that is, two pieces of PLP data).

To be more specific, the physical layer processing unit 2012 includes a PLP processing unit (shown as 20311 and 20312) for each of the PLPs.

It should be noted that, for convenience of explanation, the PLP data is referred to as the "PLP" when deemed appropriate in the present specification.

The physical layer processing unit 2012 includes a layer-1 (L1) information processing unit 2041, a frame structure unit 2051, and an OFDM signal generation unit 2061.

The following describes an operation performed by the transmitting apparatus 2000.

In each of the TS generation units 2010 and 2011, the corresponding audio coding unit (such as the units 20211 and 20212 of the TS generation unit 2010) performs audio source coding and the corresponding video coding unit (such as the units 20221 and 20222 of the TS generation unit 2010) performs video source coding.

As an example, source coding may be performed according to the H.264 standard.

Each of the packetization units (such as the units 20231 to 20234 of the TS generation unit 2010) packetizes an output from a function block corresponding to the current packetization unit.

Here, the corresponding function block refers to one of the audio coding units (20211 and 20212) and video coding units (20221 and 20222).

Each of the L2 information processing units 2025 of the TS generation units generates L2 information, such as program-specific information (PSI) and system information (SI).

Each of the packetized-stream multiplexing units 2024 of the TS generation units (the TS generation unit 2010, for example) multiplexes outputs from the packetization units (20231 to 20234) with an output from the L2 information processing unit 2025. As a result, the packetized-stream multiplexing unit 2024 generates a TS in which these outputs are multiplexed.

In the physical layer processing unit 2012, each of the PLP processing units (20311 and 20312) associates, with the PLP, the TS outputted from the TS generation unit (2010 or 2011) corresponding to the current PLP processing unit, and performs a process related to this PLP. Then, the PLP processing unit outputs mapping data (namely, a cell) concerning the PLP.

The L1 information processing unit 2041 performs a process related to the L1 information, and then outputs mapping data of the L1 information.

The frame structure unit 2051 generates a DVB-T2-based transmission frame as shown in FIG. 1 described above, using the mapping data of the PLP outputted from the PLP processing units and the mapping data of the L1 information outputted from the L1 information processing unit 2041. Then, the frame structure unit 2051 outputs the generated transmission frame.

The OFDM signal generation unit 2061 performs pilot signal insertion, inverse fast Fourier transform (IFFT), GI insertion, and P1 symbol insertion on the DVB-T2-based transmission frame structure outputted from the frame structure unit 2051. Then, the OFDM signal generation unit 2061 outputs a DVB-T2-based transmission signal.

Next, an operation performed by the PLP processing unit (20311 and 20312) is described in detail.

FIG. 3 is a diagram showing a configuration of a conventional DVB-T2-based PLP processing unit 2031N.

Each of the PLP processing units shown in FIG. 2 has the same configuration as the PLP processing unit 2031N.

As shown in FIG. 3, the PLP processing unit 2031N includes an input processing unit 2071, a forward error correction (FEC) coding unit 2072, a mapping unit 2073, and an interleaving unit 2074.

The input processing unit 2071 of the PLP processing unit 2031N transforms a TS packet to be sent to the PLP processing unit 2031N into a baseband frame.

The FEC coding unit 2072 performs Bose-Chaundhuri-Hocquenghem (BCH) coding and low-density parity-check (LDPC) coding and adds a parity bit, for each aforementioned baseband frame obtained as a result of the transform. Accordingly, the FEC coding unit 2072 generates an FEC frame.

The mapping unit 2073 performs mapping to I-Q coordinates, and then outputs mapping data (that is, a cell).

The interleaving unit 2074 sorts the mapping data (cells) within a time interleaving (TI) block including an integer number of FEC frames.

Next, an operation performed by the L1 information processing unit 2041 (shown in FIG. 2 and FIG. 4 that is described later) is explained in detail.

FIG. 4 is a diagram showing a configuration of a conventional DVB-T2-based L1 information processing unit 2041.

As shown in FIG. 4, the L1 information processing unit 2041 includes an L1 information generation unit 2081, an FEC coding unit 2082, a mapping unit 2083, and an interleaving unit 2084.

The L1 information generation unit 2081 of the L1 information processing unit 2041 generates transmission parameters, and transforms the generated transmission parameters into L1-pre information and L1-post information.

The FEC coding unit 2082 performs BCH coding and LDPC coding and adds a parity bit, for each of the aforementioned pieces of information (i.e., the L1-pre information and the L1-post information).

The mapping unit 2083 performs mapping to I-Q coordinates, and then outputs mapping data (that is, a cell).

The interleaving unit 2084 sorts the mapping data (cells) for each of the pieces of information (i.e., the L1-pre information and the L1-post information).

Here, Digital Video Broadcasting-Satellite Handheld (DVB-SH) is a standard for handheld/mobile receivers, based on hybrid satellite and terrestrial transmission. The DVB-SH standard defines two receiver classes, each of which has a different receiver.

A (receiver in) receiver class-1 can be implemented by a smaller amount of calculation and a smaller amount of memory, as compared with a (receiver in) receiver class-2.

The receiver class-2 is more robust to an extreme reception environment.

To be more specific, these two receiver classes are defined in view of a tradeoff between the amounts of calculation and memory and the reception performance (see Non Patent Literatures 3 and 4).

Moreover, Digital Video Broadcasting-Next Generation Handheld (DVB-NGH) is a transmission standard for handheld/mobile receivers. This standard defines, in Commercial Requirements, that "individual transmission quality for audio and video service components should be possible". This indicates that transmission is performed using a PLP different for each of the service components (see Non Patent Literature 5).

CITATION LIST

Non Patent Literature

[NPL 1]
EN 302 755 V1.1.1 (September, 2009): Frame structure channel coding and modulation for a second generation digital terrestrial television broadcasting system (DVB-T2)
[NPL 2]
DVB BlueBook A133 (June, 2010): Implementation guidelines for a second generation digital terrestrial television broadcasting system (DVB-T2)(draft TR 102 831 V0.10.4)
[NPL 3]
EN 302 583 V1.1.2 (February, 2010): Framing structure channel coding and modulation for Satellite Services to Handheld devices (SH) below 3 GHz
[NPL 4]
DVB BlueBook A120 (June, 2010): Guidelines for Implementation for Satellite Services to Handheld devices (SH) below 3 GHz (dTS 102 584 V1.1.2)
[NPL 5]
DVB-NGH Call for Technologies (Nov. 25, 2009): http://www.dvb.org/technology/dvb-ngh/DVB-NGH-Call-for-Technologies.doc

SUMMARY OF INVENTION

Technical Problem

The DVB-SH standard defines the two receiver classes. However, the DVB-SH standard was determined before the DVB-T2 standard and, for this reason, the DVB-SH standard does not have a PLP structure.

On the other hand, although having the PLP structure, the DVB-T2 standard does not define plural receiver classes.

Therefore, the problem is that the PLP structure and the plural receiver classes cannot be implemented at the same time.

The present invention is conceived in view of the stated problem, and has an object to provide a transmitting apparatus capable of implementing both a transmission system having a PLP structure and a process according to a method defining a plurality of receiver classes.

It should be noted that other objects in the present invention include the following. That is, a particularly effective process can be implemented in the case where transmission is performed using a PLP different for each of the service components or where a transmission standard includes a plurality of versions or branches.

Solution to Problem

In order to achieve the aforementioned object, a transmitting apparatus in an aspect A1 according to the present invention is a transmitting apparatus including: a signaling information generation unit which generates signaling information including a transmission parameter for each of a plurality of physical layer pipes (PLPs); a PLP processing unit which performs a process based on the transmission parameter for each of the PLPs; and a transmitting unit which transmits data including (i) the generated signaling information and (ii) PLP data for each of the PLPs, wherein the PLP data is received by a receiving apparatus that is indicated by a flag of the PLP and is not received by an other receiving apparatus, the receiving apparatuses being included in a plurality of receiving apparatuses classified under a plurality of states, and the generated signaling information includes, as the transmission parameter for each of the PLPs, the flag of the PLP.

This can provide the transmitting apparatus capable of implementing both a transmission system having a PLP structure and a process according to a method defining a plurality of receiver classes.

A receiving apparatus in an aspect B1 according to the present invention sets, for a transmission signal on which a process is performed based on a transmission parameter for each PLP (physical layer pipe) where the transmission parameter can be independently set, a receiver class on the basis of the number of PLPs to be received from the transmission signal, and outputs information regarding the receiver class.

According to the receiving apparatus described in the aspect B1, a receiving apparatus in an aspect B2 according to the present invention outputs, as the information regarding the receiver class, information regarding the receiver class of its own.

According to the receiving apparatus described in the aspect B1, a receiving apparatus in an aspect B3 according to the present invention outputs, as the information regarding the receiver class, information regarding a receivable service component.

According to the receiving apparatus described in the aspect B3, a receiving apparatus in an aspect B4 according to the present invention selects audio or video as the receivable service component.

According to the receiving apparatus described in the aspect B3, a receiving apparatus in an aspect B5 according to the present invention selects among audio, first-type video, and second-type video as the receivable service component.

According to the receiving apparatus described in the aspect B1, a receiving apparatus in an aspect B6 according to the present invention outputs, as the information regarding the receiver class, information regarding a receivable program type.

According to the receiving apparatus described in the aspect B6, a receiving apparatus in an aspect B7 according to the present invention presents, as the information regarding the receivable program type, that all programs are receivable.

According to the receiving apparatus described in the aspect B6, a receiving apparatus in an aspect B8 according to the present invention presents, as the information regarding the receivable program type, that some of programs are receivable.

A receiving apparatus in an aspect B9 according to the present invention sets, for a transmission signal on which a process is performed based on a transmission parameter for each PLP (physical layer pipe) where the transmission parameter can be independently set, a receiver class on the basis of a branch of the standard to be received from the transmission signal, and outputs information as to whether or not to allow reception.

According to the receiving apparatus described in the aspect B9, a receiving apparatus in an aspect B10 according to the present invention outputs, as the information as to whether or not to allow reception, information indicating whether or not the selected program is receivable.

A receiving apparatus in an aspect B11 according to the present invention sets, for a transmission signal on which a process is performed based on a transmission parameter for each PLP (physical layer pipe) where the transmission parameter can be independently set, a receiver class on the basis of a version of the standard to be received from the transmission signal, and outputs information as to whether or not to allow reception.

According to the receiving apparatus described in the aspect B11, a receiving apparatus in an aspect B12 according to the present invention outputs, as the information as to whether or not to allow reception, information indicating whether or not the selected program is receivable.

A receiving method in an aspect B13 according to the present invention sets, for a transmission signal on which a process is performed based on a transmission parameter for each PLP (physical layer pipe) where the transmission parameter can be independently set, a receiver class on the basis of the number of PLPs to be received from the transmission signal, and outputs information regarding the receiver class.

A receiving method in an aspect B14 according to the present invention sets, for a transmission signal on which a process is performed based on a transmission parameter for each PLP (physical layer pipe) where the transmission parameter can be independently set, a receiver class on the basis of a branch of the standard to be received from the transmission signal, and outputs information as to whether or not to allow reception.

A receiving method in an aspect B15 according to the present invention sets, for a transmission signal on which a process is performed based on a transmission parameter for each PLP (physical layer pipe) where the transmission parameter can be independently set, a receiver class on the basis of a version of the standard to be received from the transmission signal, and outputs information as to whether or not to allow reception.

A program in an aspect B16 according to the present invention describes a signal processing procedure for executing the receiving method described in either one of the aspects B14 and B15.

An integrated circuit in an aspect B17 according to the present invention sets, for a transmission signal on which a process is performed based on a transmission parameter for each PLP (physical layer pipe) where the transmission parameter can be independently set, a receiver class on the basis of the number of PLPs to be received from the transmission signal, and outputs information regarding the receiver class.

An integrated circuit in an aspect B18 according to the present invention sets, for a transmission signal on which a process is performed based on a transmission parameter for each PLP (physical layer pipe) where the transmission parameter can be independently set, a receiver class on the basis of a branch of the standard to be received from the transmission signal, and outputs information as to whether or not to allow reception.

An integrated circuit in an aspect B19 according to the present invention sets, for a transmission signal on which a process is performed based on a transmission parameter for each PLP (physical layer pipe) where the transmission parameter can be independently set, a receiver class on the basis of a version of the standard to be received from the transmission signal, and outputs information as to whether or not to allow reception.

A transmitting apparatus in an aspect C1 according to the present invention includes: an L1 (Layer-1) signaling information generation unit which generates L1 signaling information storing a transmission parameter; and a PLP processing unit which performs a process based on the transmission parameter for each PLP (physical layer pipe) where the transmission parameter can be independently set. The L1 signaling information generation unit generates the transmission parameter based on the number of PLPs to be received by a receiver. The PLP processing unit performs the process using the transmission parameter based on the number of PLPs to be received by the receiver.

According to the transmitting apparatus described in the aspect C1, a transmitting apparatus in an aspect C2 according to the present invention includes: the L1 signaling information generation unit which generates a transmission parameter based on the number of all PLPs to be received by a receiver; and the PLP processing unit which performs a process using the transmission parameter based on the number of all PLPs to be received by the receiver.

According to the transmitting apparatus described in the aspect C1, a transmitting apparatus in an aspect C3 according to the present invention includes: the L1 signaling information generation unit which generates a transmission parameter based on the number of some of the PLPs to be received by a receiver; and the PLP processing unit which performs a process using the transmission parameter based on the number of some of the PLPs to be received by the receiver.

According to the transmitting apparatus described in the aspect C2, a transmitting apparatus in an aspect C4 according to the present invention includes: the L1 signaling information generation unit which generates an interleaved amount corresponding to the number of all the PLPs to be received by a receiver; and the PLP processing unit which performs an interleaving process based on the interleaved amount corresponding to the number of all the PLPs to be received by the receiver.

According to the transmitting apparatus described in the aspect C3, a transmitting apparatus in an aspect C5 according to the present invention includes: the L1 signaling information generation unit which generates an interleaved amount corresponding to the number of some of the PLPs to be received by a receiver; and the PLP processing unit which performs an interleaving process based on the interleaved amount corresponding to the number of some of the PLPs to be received by the receiver.

According to the transmitting apparatus described in the aspect C1, a transmitting apparatus in an aspect C6 according to the present invention includes the PLP processing unit which generates a de-jitter buffer (DJB) capacity corresponding to the number of all the PLPs to be received by the receiver.

According to the transmitting apparatus described in the aspect C1, a transmitting apparatus in an aspect C7 according to the present invention includes the PLP processing unit which generates a DJB capacity corresponding to the number of some of the PLPs to be received by the receiver.

According to the transmitting apparatus described in the aspect C1, a transmitting apparatus in an aspect C8 according to the present invention includes the L1 signaling information generation unit which generates a synchronization condition for an integration process performed by the receiver after the de-jitter buffering.

According to the transmitting apparatus described in the aspect C1, a transmitting apparatus in an aspect C9 according to the present invention includes the PLP processing unit which performs a process using, as an input, service component information or L2 (Layer-2) information.

According to the transmitting apparatus described in the aspect C9, a transmitting apparatus in an aspect C10 according to the present invention determines the number of the PLPs to be received by the receiver on the basis of the number of service components to be received and the number of pieces of L2 information to be received.

According to the transmitting apparatus described in the aspect C9, a transmitting apparatus in an aspect C11 according to the present invention includes the PLP processing unit which selects, when performing a transmission process, one of single-input single-output (SISO) transmission, multi-input single-output (MISO) transmission, and multi-input multi-output (MIMO) transmission. This selection is made on the basis of the type of the service component to be received or on whether or not the input is the L2 information.

According to the transmitting apparatus described in the aspect C9, a transmitting apparatus in an aspect C12 according to the present invention sets the receiver classes on the basis of the number of PLPs to be received by the receiver. Moreover, the L1 signaling information generation unit generates, for each of the PLPs, information indicating the receiver class that receives the PLP and information indicating one of SISO transmission, MISO transmission, and MIMO transmission.

According to the transmitting apparatus described in the aspect C1, a transmitting apparatus in an aspect C13 according to the present invention sets the receiver classes on the basis of the number of PLPs to be received by the receiver. Moreover, the L1 signaling information generation unit generates, for each of the PLPs, information indicating the receiver class that receives the PLP.

A transmitting apparatus in an aspect C14 according to the present invention includes: an L1 (Layer-1) signaling information generation unit which generates L1 signaling information storing a transmission parameter; and a PLP processing unit which performs a process based on a transmission parameter for each PLP (physical layer pipe) where the transmission parameter can be independently set. The L1 signaling information generation unit generates the transmission parameter based on a branch of the standard. The PLP processing unit performs the process using the transmission parameter based on the branch of the standard.

According to the transmitting apparatus described in the aspect C14, a transmitting apparatus in an aspect C15 according to the present invention employs the branch of the standard including a different error correction method.

According to the transmitting apparatus described in the aspect C14, a transmitting apparatus in an aspect C16 according to the present invention sets the receiver classes on the basis of a branch of the standard used by the receiver. Moreover, the L1 signaling information generation unit generates, for each of the PLPs, information indicating the receiver class that receives the PLP.

A transmitting apparatus in an aspect C17 according to the present invention includes: an L1 (Layer-1) signaling information generation unit which generates L1 signaling information storing a transmission parameter; and a PLP processing unit which performs a process based on a transmission parameter for each PLP (physical layer pipe) where the transmission parameter can be independently set. The L1 signaling information generation unit generates the transmission parameter based on a version of the standard. The PLP processing unit performs the process using the transmission parameter based on the version of the standard.

According to the transmitting apparatus as described in the aspect C17, a transmitting apparatus in an aspect C18 according to the present invention employs, for each version of the standard, a different one of SISO transmission, MISO transmission, and MIMO transmission.

A receiver buffer model in an aspect C19 according to the present invention is used for preventing a buffer overflow and/or a buffer underflow from occurring to the receiver when a transmitting side generates a transmission parameter. The receiver buffer model includes: deinterleaving units as many as the number of PLPs to be received; and DJBs (de-jitter buffers) as many as the number of PLPs to be received.

According to the receiver buffer model described in the aspect C19, a receiver buffer model in an aspect C20 according to the present invention determines the number of the PLPs to be received by the receiver on the basis of the number of service components to be received and the number of pieces of L2 information to be received.

According to the receiver buffer model described in the aspect C19, a receiver buffer model in an aspect C21 according to the present invention selects one of single-input single-output (SISO) transmission, multi-input single-output (MISO) transmission, and multi-input multi-output (MIMO) transmission for each of the PLPs. This selection is made on the basis of the type of the service component to be received or on whether or not the input is the L2 information.

According to the receiver buffer model as described in the aspect C19, a receiver buffer model in an aspect C22 according to the present invention sets the receiver classes on the basis of the number of PLPs to be received by the receiver and is defined for each of the receiver classes.

A receiver buffer model in an aspect C23 according to the present invention is used for preventing a buffer overflow and/or a buffer underflow from occurring to the receiver when a transmitting side generates a transmission parameter. The receiver buffer model sets the receiver classes on the basis of a branch of the standard to be used by the receiver and is defined for each of the receiver classes.

According to the receiver buffer model described in the aspect C23, a receiver buffer model in an aspect C24 according to the present invention employs the branch of the standard including a different error correction method.

A receiver buffer model in an aspect C25 according to the present invention is used for preventing a buffer overflow and/or a buffer underflow from occurring to the receiver when a transmitting side generates a transmission parameter. The receiver buffer model sets the receiver classes on the basis of a version of the standard to be used by the receiver and is defined for each of the receiver classes.

According to the transmitting apparatus as described in the aspect C17, a receiver buffer model in an aspect C26 according to the present invention employs, for each version of the standard, a different one of SISO transmission, MISO transmission, and MIMO transmission.

A receiving apparatus in an aspect C27 according to the present invention includes: deinterleaving units as many as the maximum number of PLPs to be received; and DJBs (de-jitter buffers) as many as the maximum number of PLPs to be received.

According to the receiving apparatus described in the aspect C27, a receiving apparatus in an aspect C28 according to the present invention determines the maximum number of the PLPs to be received on the basis of the number of service components to be received and the number of pieces of L2 information to be received.

According to the receiving apparatus described in the aspect C28, a receiving apparatus in an aspect C29 according to the present invention selects one of single-input single-output (SISO) transmission, multi-input single-output (MISO) transmission, and multi-input multi-output (MIMO) transmission for each of the PLPs. This selection is made on the basis of the type of the service component to be received or on whether or not the input is the L2 information.

A transmitting method in an aspect C30 according to the present invention includes: a step of generating L1 signaling information storing a transmission parameter; and a step of performing a process based on the transmission parameter for each PLP (physical layer pipe) where the transmission parameter can be independently set. In the step of generating the L1 signaling information, the transmission parameter is generated based on the number of PLPs to be received by a receiver. In the step of performing the process for each PLP, the process is performed using the transmission parameter based on the number of PLPs to be received by the receiver.

A transmitting method in an aspect C31 according to the present invention includes: a step of generating L1 signaling information storing a transmission parameter; and a step of performing a process based on the transmission parameter for each PLP (physical layer pipe) where the transmission parameter can be independently set. In the step of generating the L1 signaling information, the transmission parameter is generated based on a branch of the standard. In the step of performing the process for each PLP, the process is performed using the transmission parameter based on the branch of the standard.

A transmitting method in an aspect C32 according to the present invention includes: a step of generating L1 signaling information storing a transmission parameter; and a step of performing a process based on the transmission parameter for each PLP (physical layer pipe) where the transmission parameter can be independently set. In the step of generating the L1 signaling information, the transmission parameter is generated based on a version of the standard. In the step of performing the process for each PLP, the process is performed using the transmission parameter based on the version of the standard.

A receiving method in an aspect C33 according to the present invention includes: a step of performing interleaving processes as many as the maximum number of PLPs to be received; and a step of performing de-jitter buffering processes as many as the maximum number of PLPs to be received.

A program in an aspect C34 according to the present invention describes a signal processing procedure for executing the transmitting method described in any one of the aspects C30 to C33.

A program in an aspect C35 according to the present invention describes a signal processing procedure for executing the receiving method described in the aspect C34.

An integrated circuit in an aspect C36 according to the present invention includes: deinterleaving units as many as the maximum number of PLPs to be received; and DJBs (de-jitter buffers) as many as the maximum number of PLPs to be received.

Advantageous Effects of Invention

The transmitting apparatus in the aspect A1 is capable of implementing both a transmission system having a PLP structure and a process according to a method defining a plurality of receiver classes.

The receiving apparatus in the aspect B1 can provide a receiving apparatus capable of: setting, for a transmission signal on which a process is performed based on a transmission parameter for each PLP (physical layer pipe) where the transmission parameter can be independently set, a receiver class on the basis of the number of PLPs to be received from the transmission signal; and outputting information regarding the receiver class.

The receiving apparatus in the aspect B2 can provide a receiving apparatus capable of outputting, as the information regarding the receiver class, information regarding the receiver class of its own.

The receiving apparatus in the aspect B3 can provide a receiving apparatus capable of outputting, as the information regarding the receiver class, information regarding a receivable service component.

The receiving apparatus in the aspect B4 can provide a receiving apparatus capable of selecting the receivable service component between audio and video, as the information regarding the receiver class.

The receiving apparatus in the aspect B5 can provide a receiving apparatus capable of selecting the receivable service component from among audio, first-type video, and second-type video, as the information regarding the receiver class.

The receiving apparatus in the aspect B6 can provide a receiving apparatus capable of outputting information regarding a receivable program type, as the information regarding the receiver class.

The receiving apparatus in the aspect B7 can provide a receiving apparatus capable of presenting that all programs are receivable, as the information regarding the receiver class.

The receiving apparatus in the aspect B8 can provide a receiving apparatus capable of presenting that some of programs are receivable, as the information regarding the receiver class.

The receiving apparatus in the aspect B9 can provide a receiving apparatus capable of: setting, for a transmission signal on which a process is performed based on a transmission parameter for each PLP (physical layer pipe) where the transmission parameter can be independently set, a receiver class on the basis of a branch of the standard to be received from the transmission signal; and outputting information as to whether or not to allow reception.

The receiving apparatus in the aspect B10 can provide a receiving apparatus capable of outputting, when the receiver class is set based on the branch of the standard to be used, information indicating whether or not the selected program is receivable, as the information as to whether or not to allow reception.

The receiving apparatus in the aspect B11 can provide a receiving apparatus capable of: setting, for a transmission signal on which a process is performed based on a transmission parameter for each PLP (physical layer pipe) where the transmission parameter can be independently set, a receiver class on the basis of a version of the standard to be received from the transmission signal; and outputting information as to whether or not to allow reception.

The receiving apparatus in the aspect B12 can provide a receiving apparatus capable of outputting, when the receiver class is set based on the version of the standard to be used, information indicating whether or not the selected program is receivable, as the information as to whether or not to allow reception.

The receiving method in the aspect B13 can provide a receiving method capable of: setting, for a transmission signal on which a process is performed based on a transmission parameter for each PLP (physical layer pipe) where the transmission parameter can be independently set, a receiver class on the basis of the number of PLPs to be received from the transmission signal; and outputting information regarding the receiver class.

The receiving method in the aspect B14 can provide a receiving method capable of: setting, for a transmission signal on which a process is performed based on a transmission parameter for each PLP (physical layer pipe) where the transmission parameter can be independently set, a receiver class on the basis of a branch of the standard to be received from the transmission signal; and outputting information as to whether or not to allow reception.

The receiving method in the aspect B15 can provide a receiving method capable of: setting, for a transmission signal on which a process is performed based on a transmission parameter for each PLP (physical layer pipe) where the transmission parameter can be independently set, a receiver class on the basis of a version of the standard to be received from the transmission signal; and outputting information as to whether or not to allow reception.

The program in the aspect B16 is capable of implementing a program that describes a signal processing procedure for executing the receiving methods described in the aspects B14 and B15.

The integrated circuit in the aspect B17 can provide an integrated circuit capable of: setting, for a transmission signal on which a process is performed based on a transmission parameter for each PLP (physical layer pipe) where the transmission parameter can be independently set, a receiver class on the basis of the number of PLPs to be received from the transmission signal; and outputting information regarding the receiver class.

The integrated circuit in the aspect B18 can provide an integrated circuit capable of: setting, for a transmission signal on which a process is performed based on a transmission parameter for each PLP (physical layer pipe) where the transmission parameter can be independently set, a receiver class on the basis of a branch of the standard to be received from the transmission signal; and outputting information as to whether or not to allow reception.

The integrated circuit in the aspect B19 can provide an integrated circuit capable of: setting, for a transmission signal on which a process is performed based on a transmission parameter for each PLP (physical layer pipe) where the transmission parameter can be independently set, a receiver class on the basis of a version of the standard to be received from the transmission signal; and outputting information as to whether or not to allow reception.

The transmitting apparatus in the aspect C1 includes: the L1 signaling information generation unit which generates a transmission parameter based on the number of PLPs to be received by a receiver; and the PLP processing unit performs a process using the transmission parameter based on the number of PLPs to be received by the receiver. Thus, the transmitting apparatus in the aspect C1 can provide a transmitting apparatus capable of operating with recognition of the number of PLPs to be received by the receiver.

The transmitting apparatus in the aspect C2 includes: the L1 signaling information generation unit which generates a transmission parameter based on the number of all PLPs to be received by a receiver; and the PLP processing unit which performs a process using the transmission parameter based on the number of all PLPs to be received by the receiver. Thus, the transmitting apparatus in the aspect C2 can provide a transmitting apparatus capable of operating with recognition of the number of all PLPs to be received by the receiver.

The transmitting apparatus in the aspect C3 includes: the L1 signaling information generation unit which generates a transmission parameter based on the number of some of the PLPs to be received by a receiver; and the PLP processing unit which performs a process using the transmission parameter based on the number of some of the PLPs to be received by the receiver. Thus, the transmitting apparatus in the aspect C2 can provide a transmitting apparatus capable of operating with recognition of the number of some of the PLPs to be received by the receiver.

The transmitting apparatus in the aspect C4 includes: the L1 signaling information generation unit which generates an interleaved amount corresponding to the number of all PLPs to be received by a receiver; and the PLP processing unit which performs an interleaving process based on the interleaved amount corresponding to the number of all PLPs to be received by the receiver. Thus, the transmitting apparatus in the aspect C4 can provide a transmitting apparatus capable of operating with recognition of the interleaved amount corresponding to the number of all PLPs to be received by the receiver.

The transmitting apparatus in the aspect C4 includes: the L1 signaling information generation unit which generates an interleaved amount corresponding to the number of some of the PLPs to be received by a receiver; and the PLP processing unit which performs an interleaving process based on the interleaved amount corresponding to the number of some of the PLPs to be received by the receiver. Thus, the transmitting apparatus in the aspect C4 can provide a transmitting apparatus capable of operating with recognition of the interleaved amount corresponding to the number of some of the PLPs to be received by the receiver.

The transmitting apparatus in the aspect C6 includes the PLP processing unit which generates a DJB capacity corresponding to the number of all PLPs to be received by the receiver. Thus, the transmitting apparatus in the aspect C6 can provide a transmitting apparatus capable of operating with recognition of the DJB capacity corresponding to the number of all PLPs to be received by the receiver.

The transmitting apparatus in the aspect C7 includes the PLP processing unit which generates a DJB capacity corresponding to the number of some of the PLPs to be received by the receiver. Thus, the transmitting apparatus in the aspect C7 can provide a transmitting apparatus capable of operating with recognition of the DJB capacity corresponding to the number of some of the PLPs to be received by the receiver.

The transmitting apparatus described in the aspect C8 includes the L1 signaling information generation unit which generates a synchronization condition for an integration process performed by the receiver after the de-jitter buffering. Thus, the transmitting apparatus described in the aspect C8 can provide a transmitting apparatus capable of operating with recognition of the synchronization condition for the integration process performed by the receiver after the de-jitter buffering.

The transmitting apparatus in the aspect C9 performs transmission using a PLP different for each of the service components. Thus, the transmitting apparatus in the aspect C9 can provide a transmitting apparatus capable of implementing a transmission quality for each of the service components and operating with recognition of the number of PLPs to be received by the receiver.

The transmitting apparatus in the aspect C10 determines the number of PLPs to be received by the receiver on the basis of the number of service components to be received and the number of pieces of L2 information. Thus, the transmitting apparatus in the aspect C10 can provide a transmitting apparatus capable of operating with recognition of the number of PLPs to be received by the receiver.

The transmitting apparatus in the aspect C11 includes the PLP processing unit which selects, when performing a transmission process, one of single-input single-output (SISO) transmission, multi-input single-output (MISO) transmission, and multi-input multi-output (MIMO) transmission. This selection is made on the basis of the type of the service component to be received or on whether or not the input is the L2 information. Thus, the transmitting apparatus in the aspect C11 can provide a transmitting apparatus capable of implementing a transmission quality for each of the service components and operating with recognition of the number of PLPs to be received by the receiver.

The transmitting apparatus in the aspect C12 includes the L1 signaling information generation unit generates, for each of the PLPs, information indicating the receiver class that receives the PLP and information indicating one of SISO transmission, MISO transmission, and MIMO transmission. Thus, the transmitting apparatus in the aspect C12 can provide a transmitting apparatus capable of operating with recognition of the PLP to be received for each of the receiver classes.

The transmitting apparatus in the aspect C13 generates, for each of the PLPs, the information indicating the receiver class that receives the PLP. Thus, the transmitting apparatus in the aspect C13 can provide a transmitting apparatus capable of operating with recognition of the PLP to be received for each of the receiver classes.

The transmitting apparatus in the aspect C14 includes: the L1 signaling information generation unit which generates the transmission parameter based on a branch of the standard; and the PLP processing unit which performs the process using the transmission parameter based on the branch of the standard. Thus, the transmitting apparatus in the aspect C14 can provide a transmitting apparatus where a receiver is capable of operating with recognition of the branch of the standard.

The transmitting apparatus in the aspect C15 can provide a transmitting apparatus where the receiver is capable of operating with recognition of the branch of the standard when the branch of the standard employs a different error correction method.

The transmitting apparatus in the aspect C16 sets the receiver classes on the basis of a branch of the standard used by the receiver. Moreover, the L1 signaling information generation unit generates, for each of the PLPs, information indicating the receiver class that receives the PLP. Thus, the transmitting apparatus in the aspect C16 can provide a transmitting apparatus capable of operating with recognition of the PLP to be received for each receiver class.

The transmitting apparatus in the aspect C17 includes: the L1 signaling information generation unit which generates the transmission parameter based on a version of the standard; and the PLP processing unit which performs the process using the transmission parameter based on the version of the standard. Thus, the transmitting apparatus in the aspect C14 can provide a transmitting apparatus where a receiver is capable of operating with recognition of the version of the standard.

The transmitting apparatus in the aspect C18 can provide a transmitting apparatus where the receiver is capable of operating with recognition of the version of the standard when a different one of SISO transmission, MISO transmission, and MIMO transmission is employed in the version of the standard.

The receiver buffer model in the aspect C19 can provide a receiver buffer model including: deinterleaving units as many as the number of PLPs to be received; and DJBs as many as the number of PLPs to be received.

The receiver buffer model in the aspect C20 can provide a receiver buffer model including: deinterleaving units as many as the number of PLPs to be received; and DJBs as many as the number of PLPs to be received, when transmission is performed using a PLP different for each of the service components.

The receiver buffer model in the aspect C21 can provide a receiver buffer model when transmission is performed by selecting one of SISO transmission, MISO transmission, and MIMO transmission for each of the PLPs based on the type of the service component or based on whether or not the input is the L2 information.

The receiver buffer model in the aspect C22 can provide a receiver buffer model for each of the receiver classes set on the basis of the number of PLPs to be received.

The receiver buffer model in the aspect C23 can provide a receiver buffer model for each of the receiver classes set on the basis of the branch of the standard to be used.

The receiver buffer model in the aspect C24 can provide a receiver buffer model for each of the receiver classes set on the basis of the branch of the standard to be used, when the branch of the standard employs a different error correction method.

The receiver buffer model in the aspect C25 can provide a receiver buffer model for each of the receiver classes set on the basis of the version of the standard to be used.

The receiver buffer model in the aspect C26 can provide a receiver buffer model for each of the receiver classes set on the basis of the version of the standard to be used, when a different one of SISO transmission, MISO transmission, and MIMO transmission is employed in the version.

The receiver buffer model in the aspect C27 can provide a receiver buffer model including: deinterleaving units as many as the maximum number of PLPs to be received; and DJBs as many as the maximum number of PLPs to be received.

The receiving apparatus in the aspect C28 can provide a receiving apparatus including: deinterleaving units as many as the maximum number of PLPs to be received; and DJBs as many as the maximum number of PLPs to be received, when transmission is performed using a PLP different for each of the service components.

According to the receiving apparatus in the aspect C29, transmission is performed by selecting one of SISO transmission, MISO transmission, and MIMO transmission for each of the PLPs based on the type of the service component or based on whether or not the input is the L2 information.

The transmitting method in the aspect C30 includes: generating a transmission parameter based on the number of PLPs to be received by a receiver; and performing a process using the transmission parameter based on the number of PLPs to be received by the receiver. Thus, the transmitting method in the aspect C30 can provide a transmitting method by which the receiver is capable of operating with recognition of the number of PLPs to be received.

The transmitting method in the aspect C31 includes: generating a transmission parameter based on the branch of the standard; and performing a process for each PLP using the transmission parameter based on the branch of the standard. Thus, the transmitting method in the aspect C31 can provide a transmitting method by which the receiver is capable of operating with recognition of the branch of the standard.

The transmitting method in the aspect C32 includes: generating a transmission parameter based on the version of the standard; and performing a process for each PLP using the transmission parameter based on the version of the standard. Thus, the transmitting method in the aspect C32 can provide a transmitting method by which the receiver is capable of operating with recognition of the version of the standard.

The receiving method in the aspect C33 can provide a receiving method including: deinterleaving processes as many as the maximum number of PLPs to be received; and de-jitter buffering processes as many as the maximum number of PLPs to be received.

The program in the aspect C34 can implement a program describing a signal processing procedure for executing a transmitting method.

The program in the aspect C35 can implement a program describing a signal processing procedure for executing a receiving method.

The integrated circuit in the aspect C36 can provide an integrated circuit including: deinterleaving units as many as the maximum number of PLPs to be received; and DJBs as many as the maximum number of PLPs to be received.

BRIEF DESCRIPTION OF DRAWINGS

FIG. 1 is a diagram showing a transmission frame structure according to the DVB-T2 standard.
FIG. 2 is a diagram showing a configuration of a conventional transmitting apparatus according to the DVB-T2 standard.
FIG. 3 is a diagram showing a configuration of a conventional PLP processing unit according to the DVB-T2 standard.
FIG. 4 is a diagram showing a configuration of a conventional L1 information processing unit according to the DVB-T2 standard.
FIG. 5 is a diagram showing a configuration of a transmitting apparatus in Embodiment 1.
[FIG. 6A]
FIG. 6A is a diagram showing definitions of receiver classes in Embodiments 1 and 2.
[FIG. 6B]
FIG. 6B is a diagram showing a corresponding PLP group for each of programs included in a TS and a corresponding PLP group for each of receiver class-1 and -2, in Embodiment 1.
[FIG. 6C]
FIG. 6C is a diagram showing L1 information created in a PLP loop in L1-post (configurable), in Embodiments 1 and 2.
FIG. 7 is a diagram showing a configuration of a PLP processing unit in Embodiment 1.
FIG. 8 is a diagram showing a configuration of an L1 information processing unit in Embodiment 1.
FIG. 9 is a diagram showing a configuration of a receiver buffer model (in a receiver class-2) in Embodiments 1 and 2.
FIG. 10 is a diagram showing a configuration of a receiver buffer model (in a receiver class-1) in Embodiments 1 to 4.
FIG. 11 is a diagram showing a configuration of a transmitting apparatus in Embodiment 2.

[FIG. 12]

FIG. 12 is a diagram showing a corresponding PLP group for each of programs included in a TS and a corresponding PLP group for each of receiver class-1 and -2, in Embodiment 2.

FIG. 13 is a diagram showing a configuration of an L1 information processing unit in Embodiment 2.

FIG. 14 is a diagram showing a configuration of a transmitting apparatus in Embodiment 3.

FIG. 15 is a diagram showing a configuration of a TS generation unit in Embodiment 3.

[FIG. 16A]

FIG. 16A is a diagram showing definitions of receiver classes in Embodiment 3.

[FIG. 16B]

FIG. 16B is a diagram showing a corresponding PLP group for each of programs included in a TS and a corresponding PLP group for each of receiver class-1, -2, and -3, in Embodiments 3 and 4.

[FIG. 16C]

FIG. 16C is a diagram showing L1 information created in a PLP loop in L1-post (configurable), in Embodiment 3.

FIG. 17 is a diagram showing a configuration of an L1 information processing unit in Embodiment 3.

FIG. 18 is a diagram showing a configuration of a receiver buffer model (in a receiver class-3) in Embodiment 3.

FIG. 19 is a diagram showing a configuration of a receiver buffer model (in a receiver class-2) in Embodiment 3.

FIG. 20 is a diagram showing a configuration of a transmitting apparatus in Embodiment 4.

[FIG. 21A]

FIG. 21A is a diagram showing definitions of receiver classes in Embodiment 4.

[FIG. 21B]

FIG. 21B is a diagram showing L1 information created in a PLP loop in L1-post (configurable), in Embodiment 4.

FIG. 22 is a diagram showing a configuration of a MISO-PLP processing unit in Embodiment 4.

FIG. 23 is a diagram showing a configuration of a MIMO-PLP processing unit Embodiment 4

FIG. 24 is a diagram showing a configuration of an L1 information processing unit in Embodiment 4.

FIG. 25 is a diagram showing a configuration of a receiver buffer model (in a receiver class-3) in Embodiment 4.

FIG. 26 is a diagram showing a configuration of a receiver buffer model (in a receiver class-2) in Embodiment 4.

FIG. 27 is a diagram showing a configuration of a transmitting apparatus in Embodiment 5.

[FIG. 28A]

FIG. 28A is a diagram showing definitions of receiver classes in Embodiment 5.

[FIG. 28B]

FIG. 28B is a diagram showing: a corresponding PLP for each of programs included in a TS; a corresponding PLP for each of receiver class-1a, -1b, and -2; a corresponding FEC coding method; and a corresponding standard branch, in Embodiment 5.

[FIG. 28C]

FIG. 28C is a diagram showing L1 information created in a PLP loop in L1-post (configurable), in Embodiment 5.

[FIG. 28D]

FIG. 28D is a diagram showing PLP_BRANCH and so forth.

[FIG. 28E]

FIG. 28E is a diagram showing PLP_FEC_CODE and so forth.

FIG. 29 is a diagram showing a configuration of a PLP processing unit in Embodiment 5.

FIG. 30 is a diagram showing a configuration of an L1 information processing unit in Embodiment 5.

FIG. 31 is a diagram showing a configuration of a receiver buffer model (in a receiver class-2) in Embodiment 5.

FIG. 32 is a diagram showing a configuration of a receiver buffer model (in a receiver class-1a) in Embodiment 5.

FIG. 33 is a diagram showing a configuration of a receiver buffer model (in a receiver class-1b) in Embodiment 5.

FIG. 34 is a diagram showing a configuration of a transmitting apparatus in Embodiment 6.

[FIG. 35A]

FIG. 35A is a diagram showing definitions of receiver classes in Embodiment 6.

[FIG. 35B]

FIG. 35B is a diagram showing: a corresponding PLP for each of programs included in a TS; a corresponding PLP for each of receiver class-1 and -2; a corresponding one of SISO and MISO transmissions; and a corresponding standard version, in Embodiment 6.

[FIG. 35C]

FIG. 35C is a diagram showing L1 information created in a PLP loop in L1-post (configurable), in Embodiment 6.

[FIG. 35D]

FIG. 35D is a diagram showing another example of the L1 information created in a PLP loop in L1-post (configurable), in Embodiment 6.

[FIG. 35E]

FIG. 35E is a diagram showing another example of the L1 information created in a PLP loop in L1-post (configurable), in Embodiment 4.

FIG. 36 is a diagram showing a configuration of an L1 information processing unit in Embodiment 6.

FIG. 37 is a diagram showing a configuration of a receiver buffer model (in a receiver class-2) in Embodiment 6.

FIG. 38 is a diagram showing a configuration of a receiver buffer model (in a receiver class-1) in Embodiment 6.

FIG. 39 is a diagram showing a configuration of a receiving apparatus (in the receiver class-2) in Embodiment 7.

FIG. 40 is a diagram showing an example where output receiver class information is displayed in Embodiment 7.

FIG. 41 is a diagram showing a configuration of a receiving apparatus (in a receiver class-1) in Embodiment 8.
FIG. 42 is a diagram showing an example where output receiver class information is displayed in Embodiment 8.
FIG. 43 is a diagram showing a configuration of a receiving apparatus (in a receiver class-3) in Embodiment 9.
FIG. 44 is a diagram showing an example where output receiver class information is displayed in Embodiments 9 and 11.
FIG. 45 is a diagram showing a configuration of a receiving apparatus (in a receiver class-2) in Embodiment 10.
[FIG. 46]
FIG. 46 is a diagram showing an example where output receiver class information is displayed in Embodiments 10 and 12.
FIG. 47 is a diagram showing a configuration of a receiving apparatus (in a receiver class-3) in Embodiment 11.
FIG. 48 is a diagram showing a configuration of a receiving apparatus (in a receiver class-2) in Embodiment 12.
FIG. 49 is a diagram showing a configuration of a receiving apparatus (in a receiver class-2) in Embodiment 13.
FIG. 50 is a diagram showing an example where output receiver class information is displayed in Embodiments 13 and 16.
FIG. 51 is a diagram showing a configuration of a receiving apparatus (in a receiver class-1a) in Embodiment 14.
FIG. 52 is a diagram showing an example where output receiver class information is displayed in Embodiment 14.
FIG. 53 is a diagram showing a configuration of a receiving apparatus (in a receiver class-1b) in Embodiment 15.
[FIG. 54]
FIG. 54 is a diagram showing an example where output receiver class information is displayed in Embodiment 15.
FIG. 55 is a diagram showing a configuration of a receiving apparatus (in a receiver class-2) in Embodiment 16.
FIG. 56 is a diagram showing a configuration of a receiving apparatus (in a receiver class-1) in Embodiment 17.
[FIG. 57]
FIG. 57 is a diagram showing an example where output receiver class information is displayed in Embodiment 17.
FIG. 58 is a diagram showing a configuration of a receiving apparatus (in a receiver class-1a) in Embodiment 18.
FIG. 59 is a diagram showing an example where output reception capability information is displayed in Embodiment 18.
FIG. 60 is a diagram showing a configuration of a receiving apparatus (in a receiver class-1b) in Embodiment 19.
[FIG. 61]
FIG. 61 is a diagram showing an example where output reception capability information is displayed in Embodiment 19.
FIG. 62 is a diagram showing a configuration of a receiving apparatus (in a receiver class-1a) in Embodiment 20.
FIG. 63 is a diagram showing an example where output reception capability information is displayed in Embodiment 20.
FIG. 64 is a diagram showing a transmitting apparatus and a receiving apparatus in Modification.
FIG. 65 is a diagram showing data to be transmitted and so forth in Modification.
FIG. 66 is a diagram showing a flow of an operation performed by a system in Modification.

DESCRIPTION OF EMBODIMENTS

Figure 1:
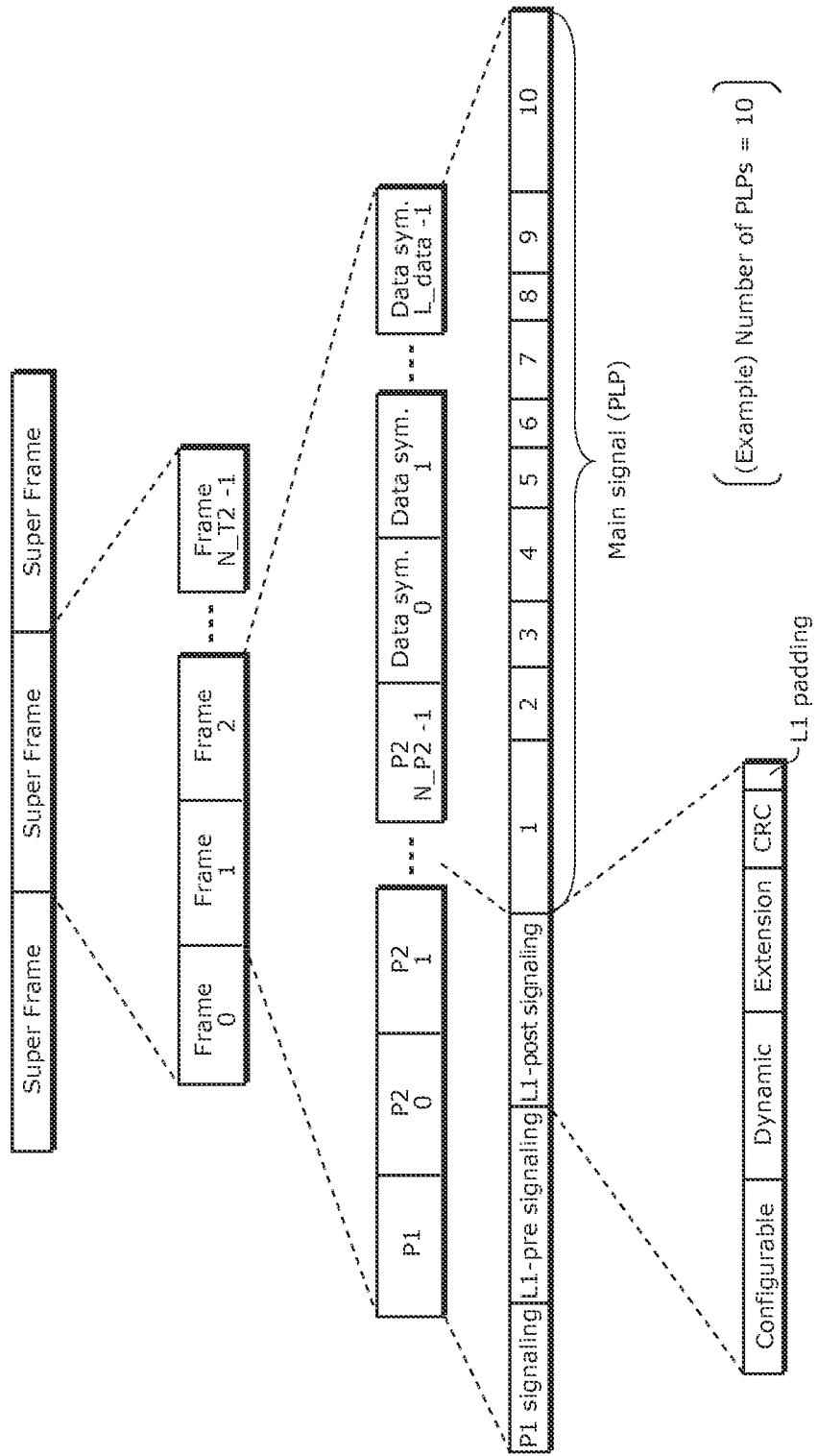
[FIG. 1]

The following is a description of Embodiments according to the present invention, with reference to the drawings. It should be noted that each of Embodiments below describes only a preferred specific example. Note that components, connection states of the components, steps, a sequence of the steps, and so forth described in each of Embodiments below are only examples, and are not intended to limit the present invention. The present invention is determined only by the scope of the claims. Thus, among the components described in each of Embodiments below, the components that are not described in independent claims indicating top concepts in the present invention are not necessarily required to achieve the object in the present invention. However, these components are described to implement a more preferred embodiment.

The following describes a transmitting apparatus 100 (shown in FIG. 64) including: a signaling information generation unit 2*b*2 (shown in FIG. 64) which generates signaling information 2*e*2 including a transmission parameter for each of a plurality of PLPs (physical layer pipes) (see data 2*f*1 and 2*f*2 in FIG. 65 and data 2*a*2 in FIG. 1, for example); a PLP processing unit group 2*b*3 which performs processes based on the transmission parameters of the PLPs; and a transmitting unit 2*b*4 which transmits data 2*e* including the generated signaling information 2*e*2 and the PLP data (i.e., the data 2*f*1, 2*f*2, . . . ).

Each piece of the PLP data (such as the data 2*f*1, 2*f*2, . . . ) is received by a corresponding receiving apparatus among receiving apparatuses (a first receiving apparatus 2*d*1 and a second receiving apparatus 2*d*2) classified under a plurality of states (see class-1 and class-2 in FIG. 6B, for example). This corresponding receiving apparatus is indicated by a flag of the current PLP (data 1*b* in FIG. 6C). Thus, the current PLP data is not received by any other receiving apparatus.

The generated signaling information 2*e*2 includes the flag of the current PLP (i.e., the data 1*b*) as a transmission parameter of the PLP.

For example, the transmitting apparatus 100 is provided in a transmission facility 2*b*7 (shown in FIG. 64) that transmits a wireless signal of a TV program. Data 2*d* to be transmitted includes information, such as audio and video of the TV program.

A receiving apparatus (a receiving apparatus 2*c*1) is, for example, a home-use TV set which reproduces information, such as audio and video of a TV program of the aforementioned transmitted wireless signal.

The aforementioned processes performed by the PLP processing unit group 2b3 may be processes for generating the data of the PLPs (such as the data 2f1 and 2f2).

In this way, the data 2e including the data of the PLPs (i.e., the data 2f1, 2f2, . . . ) is transmitted, and a merit in using the PLPs is thus obtained.

Moreover, the signaling information 2e2 included in the transmitted data 2e includes the flag (i.e., the data 1b) for each of the PLPs. Thus, the PLP data is received by the receiving apparatus indicated by the flag of the PLP data, and is not received by any other receiving apparatus that is not indicated by the flag. With this, whether or not the data is received is switched according to a state (i.e., a class) of the receiving apparatus and, therefore, a merit in using classes is also obtained.

Accordingly, the merits in using the PLPs and the classes are both obtained.

With this, it is sufficient for the signaling information 2e2 of the transmitted data 2e to simply include the flag (i.e., the data 1b). More specifically, the receiving apparatus does not need to perform, for example, a process of determining whether or not to execute the aforementioned switching. This can further reduce the amount of processing to be performed.

Furthermore, it is sufficient for the transmitting apparatus 100 to simply transmit the data 2e as described above. Thus, regardless of whether or not the receiving apparatus (such as the TV) performs the aforementioned determination process, the above-described appropriate operation is performed. Moreover, the appropriate operation can be performed with relative reliability.

Figure 65:
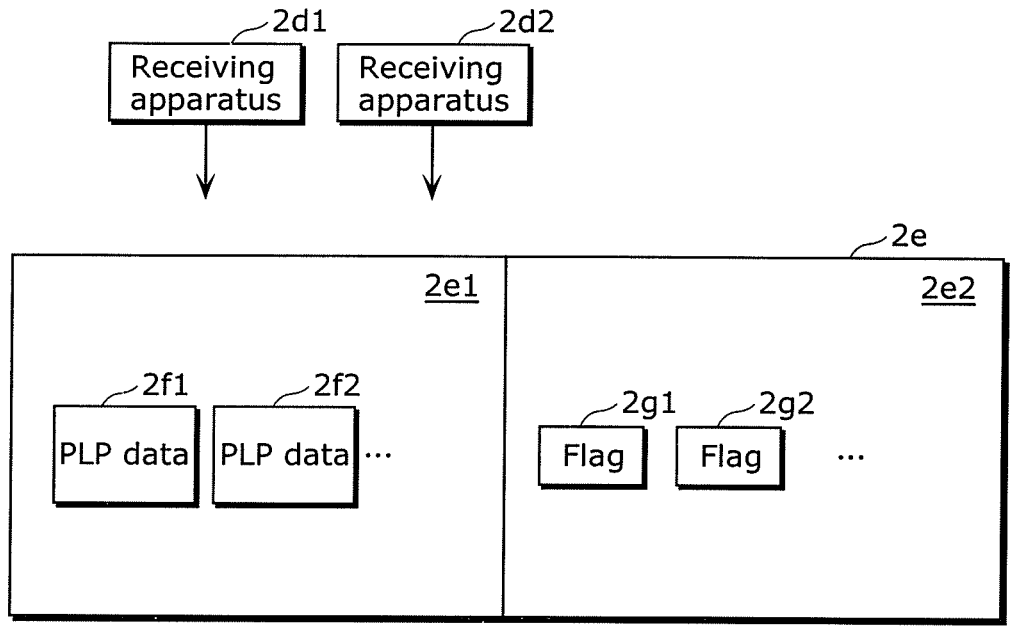
[FIG. 65]

The receiving apparatuses classified under the plurality of states may include the first receiving apparatus 2d1 and the second receiving apparatus 2d2 (shown in FIG. 65).

The state of the second receiving apparatus 2d2 may be one of the state of the first receiving apparatus 2d1 and the state different from the state of the first receiving apparatus 2d1.

The second receiving apparatus 2d2 may receive each piece of PLP data received by the first receiving apparatus 2d1.

The plurality of pieces of PLP data (such as the data 2f1 and 2f2) corresponding to the PLPs may include first PLP data representing audio (see the data 2f1 and "audio" in a second column in FIG. 6A, for example) and second PLP data representing video (see the data 2f2 and "video" in the second column).

The flag of the first PLP data (i.e., the data 1b) may indicate both the first receiving apparatus 2d1 and the second receiving apparatus 2d2 (see the second column in FIG. 6A).

The flag of the second PLP data (i.e., the data 1b) may indicate only the second receiving apparatus 2f2 (see the second column).

The first receiving apparatus 2d1 may: receive only the first PLP data (i.e., the data 2f1); not receive the second PLP data (i.e., the data 2f2); reproduce only the audio; and not reproduce the video (see the second column in FIG. 6A).

The second receiving apparatus 2d2 may receive both the first PLP data (i.e., the data 2f1) and the second PLP data (i.e., the data 2f2), and may reproduce both the audio and the video represented respectively by the received first PLP data and the received second PLP data (see a third column).

The receiving apparatus (for example, the receiving apparatus 2c1 shown in FIG. 64) includes: a receiving unit 2c2 which receives the signaling information 2e2 included in the data 2e including the transmitted PLP data (i.e., the data 2f1, 2f2, . . . ); and a selection unit 2c3 which selects at least one of the pieces of PLP data as the PLP data to be received by the current receiving apparatus.

The signaling information to be received includes a flag (such as the data 1b shown in FIG. 6C) for each of the pieces of PLP data (such as the data 2f1, 2f2, . . . ).

The flag identifies, from among the receiving apparatuses (the first receiving apparatus 2d1 and the second receiving apparatus 2d2) classified under the plurality of states (see second and third rows in FIG. 6A), at least one of the receiving apparatuses that receives the PLP data corresponding to the flag.

The selection unit 2c3 selects, as the PLP data to be received by the receiving apparatus including the selection unit 2c3, the PLP data (such as "video" data in the second column in FIG. 6A) corresponding to the flag (i.e., the data 1b) identifying the aforementioned receiving apparatus that is classified under the state of the receiving apparatus 2c1 (such as the "class-2" shown in FIG. 6A).

Accordingly, a receiving apparatus particularly suited to be used together with the aforementioned transmitting apparatus can be provided.

[Embodiment 1]

Figure 5:
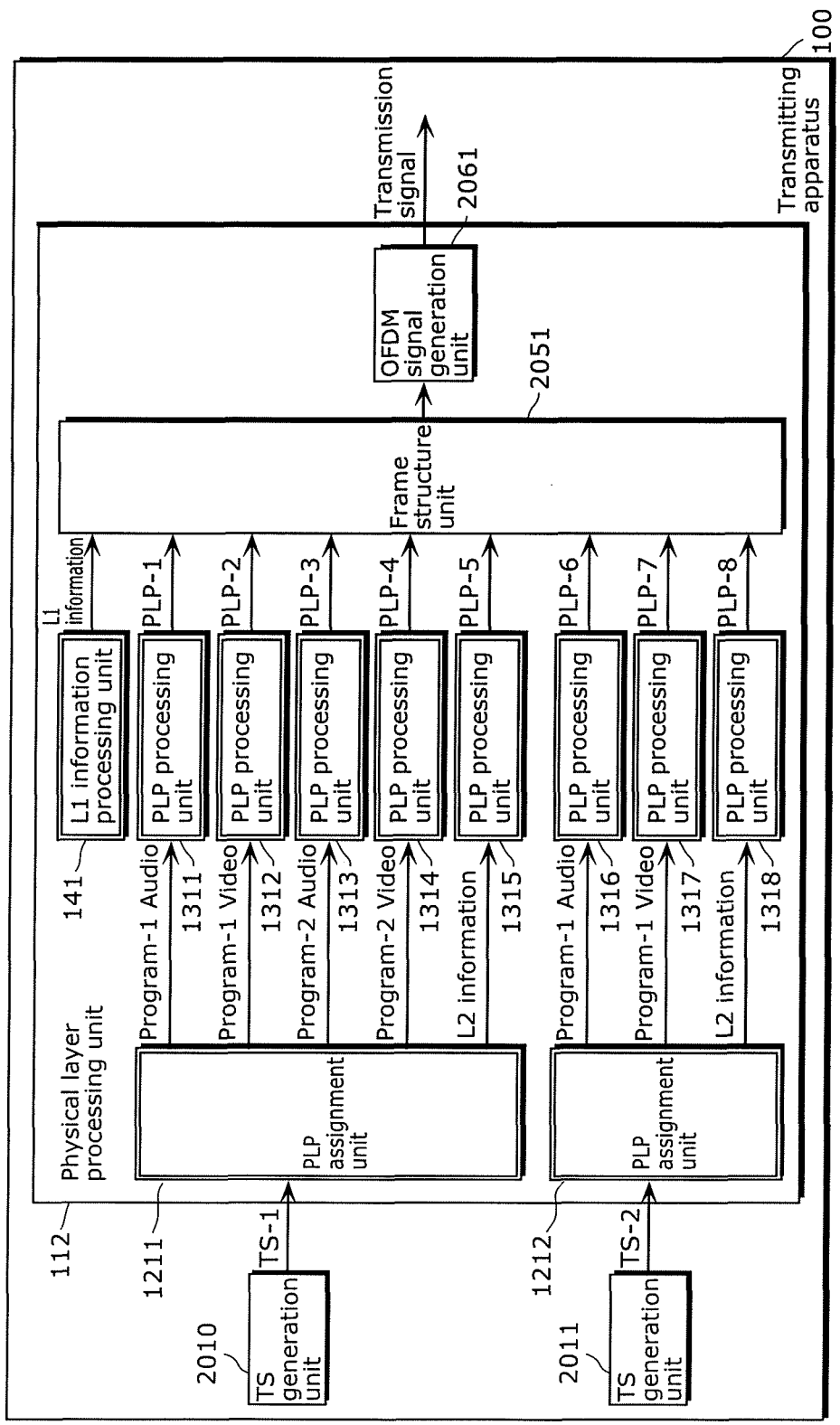
[FIG. 5]

FIG. 5 is a diagram showing a configuration of the transmitting apparatus 100 in Embodiment 1 according to the present invention.

In the present specification, components identical to those of the conventional transmitting apparatus 2000 (shown in FIG. 2) are assigned, when deemed appropriate, the same reference signs as used in the transmitting apparatus 2000. Thus, detailed explanations regarding these components are not repeated.

As compared with the conventional transmitting apparatus 2000 described above, the transmitting apparatus 100 shown in FIG. 5 has the following configuration.

In the transmitting apparatus 100, PLP assignment units 1211 and 1212 corresponding to respective TSs are added to a physical layer processing unit 112.

Moreover, the PLP processing units 20311 to 20312 and the L1 information processing unit 2041 in the conventional transmitting apparatus 2000 are replaced respectively by PLP processing units 1311 to 1318 and an L1 information processing unit 141 in the transmitting apparatus 100.

It should be noted that each of the PLP processing units 1311 to 1318 of the transmitting apparatus 100 is provided for a corresponding PLP to be transmitted.

In the transmitting apparatus 100 shown in FIG. 5, each of the PLP assignment units 1211 and 1212 included in the physical layer processing unit 112 assigns a PLP for each of service components of audio and video of a program included in a TS outputted from a corresponding TS generation unit 2010 or 2011, and also assigns a PLP to L2 information of the current TS.

FIG. 6A is a diagram showing definitions of receiver classes.

It should be noted that each receiver in a class (the receiver class-1, for example) offers corresponding technological items (described in the second to fifth columns of the second row in a table shown in FIG. 6A) according to the definition of the current receiver class.

A receiver in the receiver class-2 (described in the third row) receives audio and video service components and L2 information (as described in the second column of the third row). Moreover, the maximum number of PLPs to be received is 3 (as described in the third column of the third row).

Furthermore, in the case of the receiver class-2, the maximum interleaved total amount is defined as $(2^{19}+2^{15})$ cells (as described in the fourth column) and the maximum DJB (De-Jitter Buffer) total capacity is defined as 2 Mbits (as described in the fifth column).

On the other hand, the receiver class-1 (as in the second row) is defined as not receiving a video component (as in the second column of the second row). Thus, the maximum number of PLPs to be received can be reduced to 2 (as in the third column of the second row).

Accordingly, the maximum interleaved total amount is defined as (2^17+2^15) cells (as in the fourth column of the second row) and the maximum DJB total capacity is defined as 1 Mbit (as in the fifth column of the second row).

FIG. 6B is a diagram showing: a corresponding PLP group (as in a third column of a third row) for each program (such as a Program-2 in the third row) included in a TS (such as a TS-1 in second and third rows); and a corresponding PLP group (as in fourth and fifth columns of the third row) included in the aforementioned PLP group, for each of the receiver class-1 and -2.

FIG. 6C is a diagram showing L1 information (see the information 2a1 in FIG. 1) that is created in a PLP loop in L1-post (configurable).

It should be noted that FIG. 6C schematically shows representations indicating a structure in a programming language.

To be more specific, there is data pair (i.e., data in a pair) including, for example, "PLP_ID" and "PLP_TYPE". The L1 information includes this data pair for each of PLPs numbered 0 through "NUM_PLP-1".

For each of the PLPs, "PLP_RX_CLASS" (i.e., data 1b) of the current PLP is created in the L1 information.

Here, PLP_RX_CLASS indicates a receiver class that receives the PLP of the PLP_RX_CLASS (or more specifically, receives data such as video of the current PLP).

When a value of this PLP_RX_CLASS is "0", this represents only the receiver class-2 (corresponding to the video, in the present example). A value "1" represents the receiver class-1 and -2 (corresponding to the L2 information and the audio, in the present example).

More specifically, for each of the programs (such as the Program-1 in the TS-1 described in the second row), a PLP group (as in the fifth column of the second row) is used corresponding to the class (for example, the class-2).

A PLP group includes one or more PLPs (such as PLP-1, -2, and -5).

Each PLP_RX_CLASS (the data 1b) of the PLPs included in the group indicates the current class (such as the class-2).

This identifies the PLP group including one or more PLPs (the PLP-1, -2, and -5) corresponding to the program (such as Program-1 in TS-1) selected by the receiver (in the class-2) on the basis of a plurality of pieces of PLP_RX_CLASS (the data 1b) of the PLPs.

With this, whether or not the receiver class-1 and the receiver class-2 (for example, the aforementioned receiver in the class-2) are to receive the data can be determined for each of the PLPs included in the PLP group.

Moreover, "PLP_SYNC_COND" (i.e., data 1c) may be created for each of the PLPs, as shown in FIG. 6C.

A signal of this PLP_SYNC_COND indicates a synchronization condition in a PLP integration process performed in a later phase of the DJB unit in the receiver. More specifically, "0" represents "strict" and "1" represents "not strict".

For example, when a PLP has the synchronization condition that is "not strict", PLP_SYNC_COND of this PLP indicates "1". With this, the receiver relaxes the synchronization condition for this PLP. As a result, the PLP integration process can be performed with relative ease.

Figure 7:
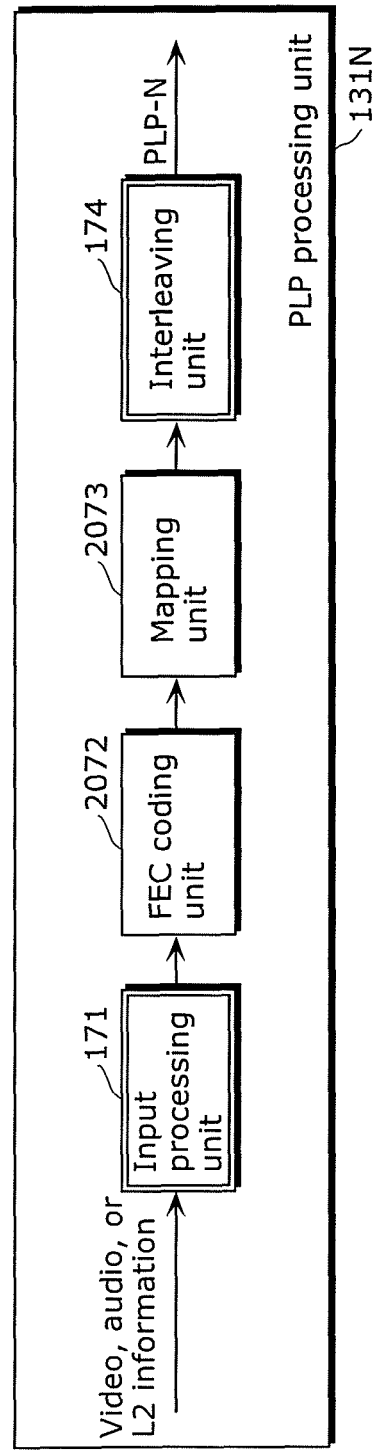
[FIG. 7]

FIG. 7 is a diagram showing a configuration of a PLP processing unit 131N.

Each of the configurations of the PLP processing units 1311 to 1318 shown in FIG. 5 is the same as, for example, the configuration of the PLP processing unit 131N.

Figure 3:
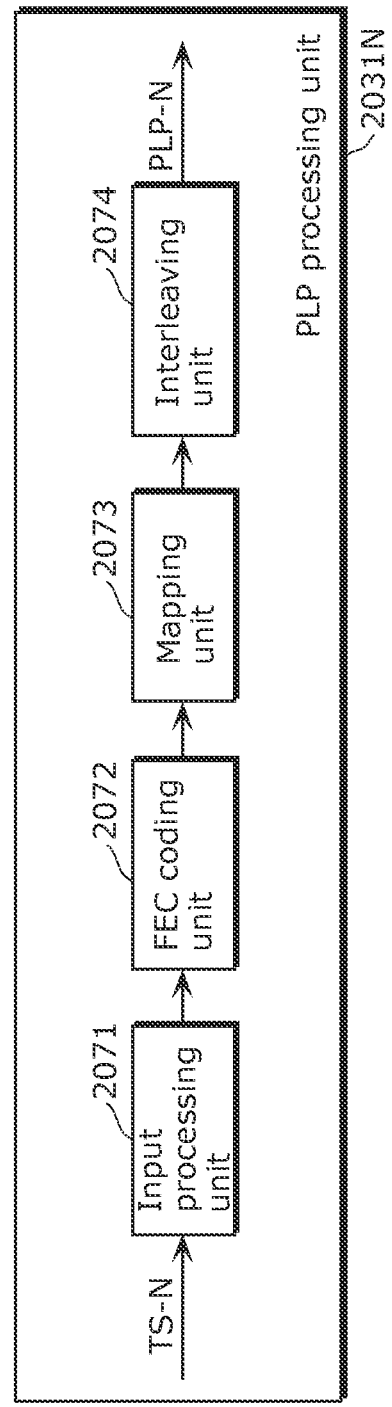
[FIG. 3]

As compared with the conventional PLP processing unit 2031N shown in FIG. 3, the PLP processing unit 131N has the following configuration.

That is, the input processing unit and the interleaving unit are replaced by an input processing unit 171 and an interleaving unit 174, respectively, as shown in the present configuration.

The input processing unit 171 of the PLP processing unit 131N shown in FIG. 7 generates input stream synchronizer (ISSY) information such that each total of BUFS (DJB capacities) of the PLPs included in the corresponding PLP groups of the receiver class-1 and -2 shown in FIG. 6B (as in the fourth and fifth columns in FIG. 6B) is smaller than or equal to the maximum DJB total capacity shown in FIG. 6A (as in the fifth column).

The input processing unit 171 adds the generated ISSY information to a baseband header or an end part of a TS packet. Then, the input processing unit 171 transforms the TS packet into a baseband frame and outputs the baseband frame.

The baseband frame is processed by the FEC coding unit 2072 and the mapping unit 2073.

After the completion of this process, the interleaving unit 174 sorts mapping data (cell) within a TI block including an integer number of FEC frames, under a condition that each interleaved total amount of the corresponding PLP groups of the receiver class-1 and -2 shown in FIG. 6B is smaller than or equal to the maximum interleaved total amount (as in the fourth column).

Figure 8:
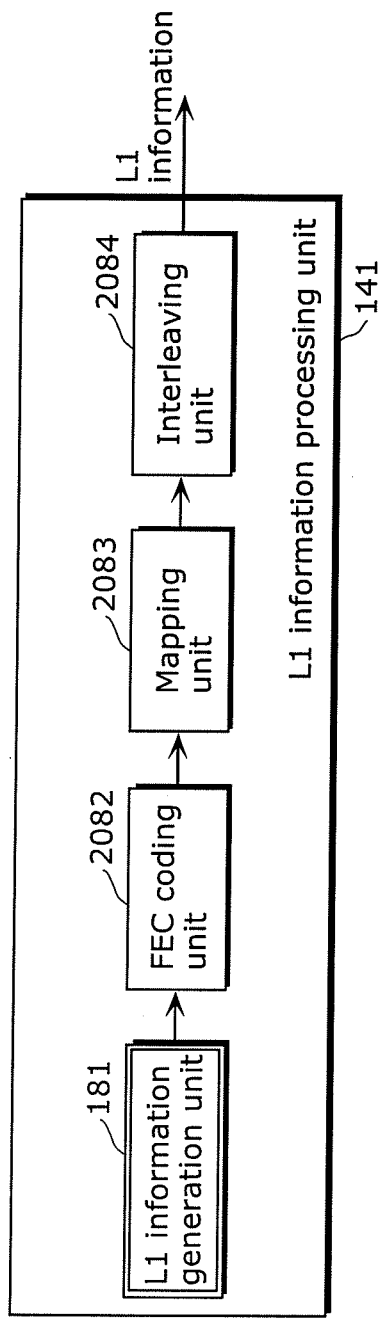
[FIG. 8]

FIG. 8 is a diagram showing a configuration of the L1 information processing unit 141 (shown in FIG. 5).

Figure 4:
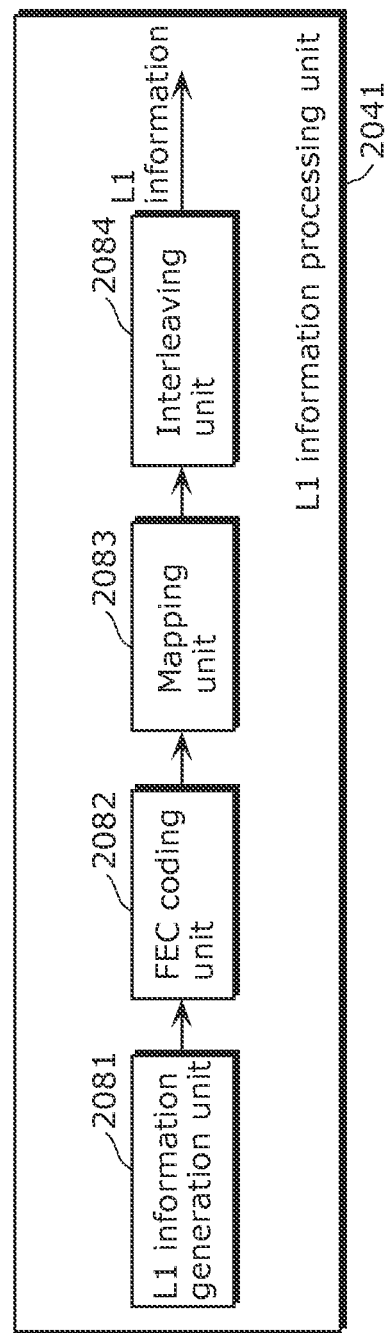
[FIG. 4]

As compared with the conventional L1 information processing unit 2041 shown in FIG. 4, the L1 information processing unit 141 has the following configuration.

That is, the L1 information generation unit 2081 is replaced by an L1 information generation unit 181 as shown in the present configuration.

The L1 information generation unit 181 of the L1 information processing unit 141 shown in FIG. 8 generates L1-pre information and L1-post information (see the information 2a1 shown in FIG. 1) such that PLP_RX_CLASS (the data 1b) shown in FIG. 6C is included.

It should be noted that the L1-pre information and the L1-post information may be generated such that PLP_SYNC_COND shown in FIG. 6C is further included.

When the L1-pre information and the L1-post information is generated, the transmission parameter related to interleaving satisfies that each interleaved total amount of the corresponding PLP groups of the receiver class-1 and -2 shown in FIG. 6B is smaller than or equal to the maximum interleaved total amount shown in FIG. 6A, as described above. For calculating the interleaved total amount of the corresponding PLP group, "PLP_NUM_BLOCKS_MAX" of the current PLP in the L1-post (configurable) is used.

Suppose that all the PLPs included in the corresponding PLP group includes the maximum number of FEC frames defined using PLP_NUM_BLOCKS_MAX. Even in this case, when the receiver includes a memory having the maximum interleaved total amount shown in FIG. 6A, deinterleaving can be performed on all the PLPs included in the corresponding PLP group using a one-bank memory.

Note that when the receiver includes a two-bank memory used for interleaving, "PLP_NUM_BLOCKS" of the current PLP in L1-post (dynamic) may be used.

With this, interleaving can be performed with the least wasted space in the memory used for interleaving.

Figure 2:
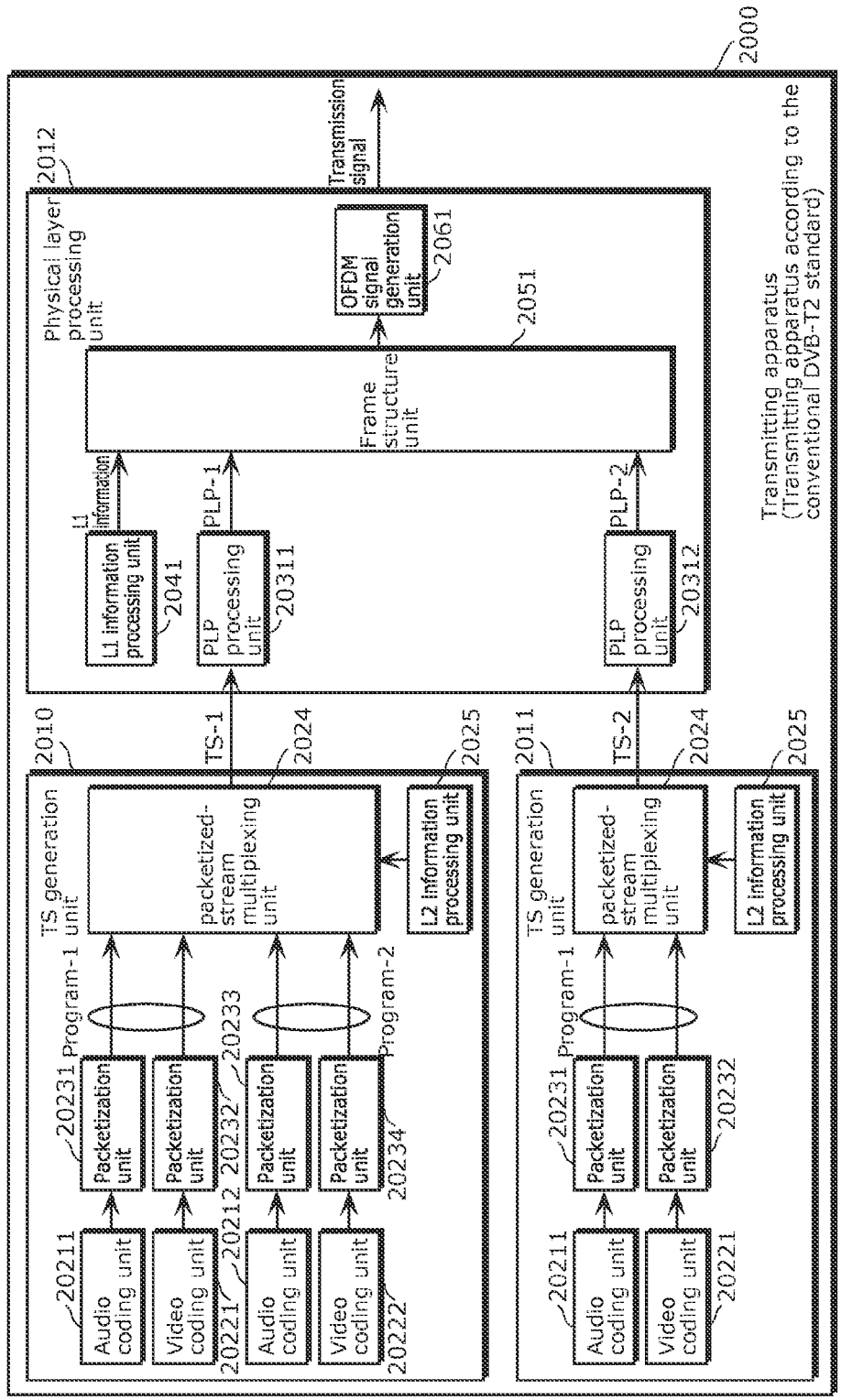
[FIG. 2]

Other operations performed by the transmitting apparatus 100 shown in FIG. 5 are the same as performed by the conventional transmitting apparatus 2000 shown in FIG. 2.

Figure 9:
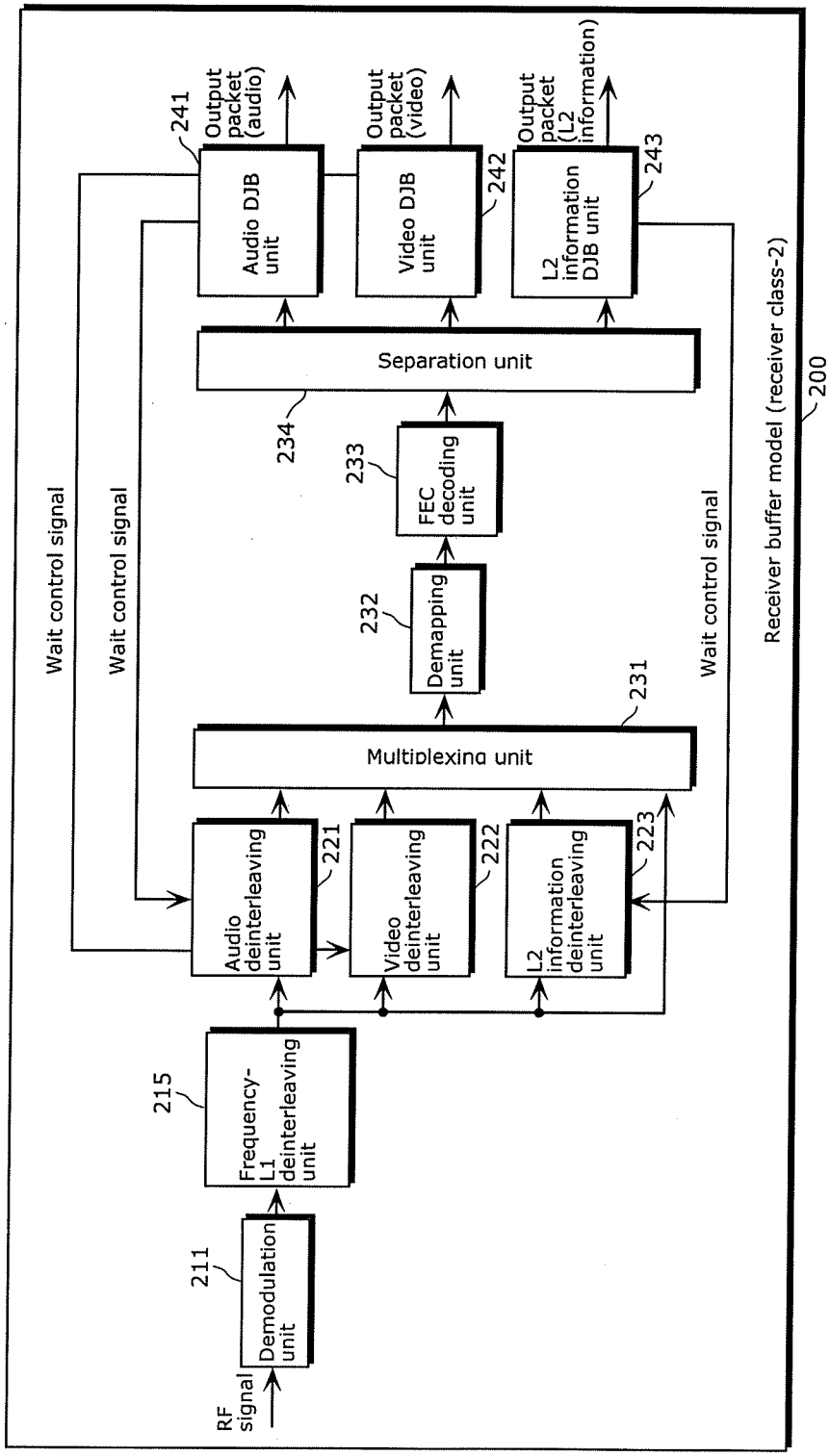
[FIG. 9]
Figure 10:
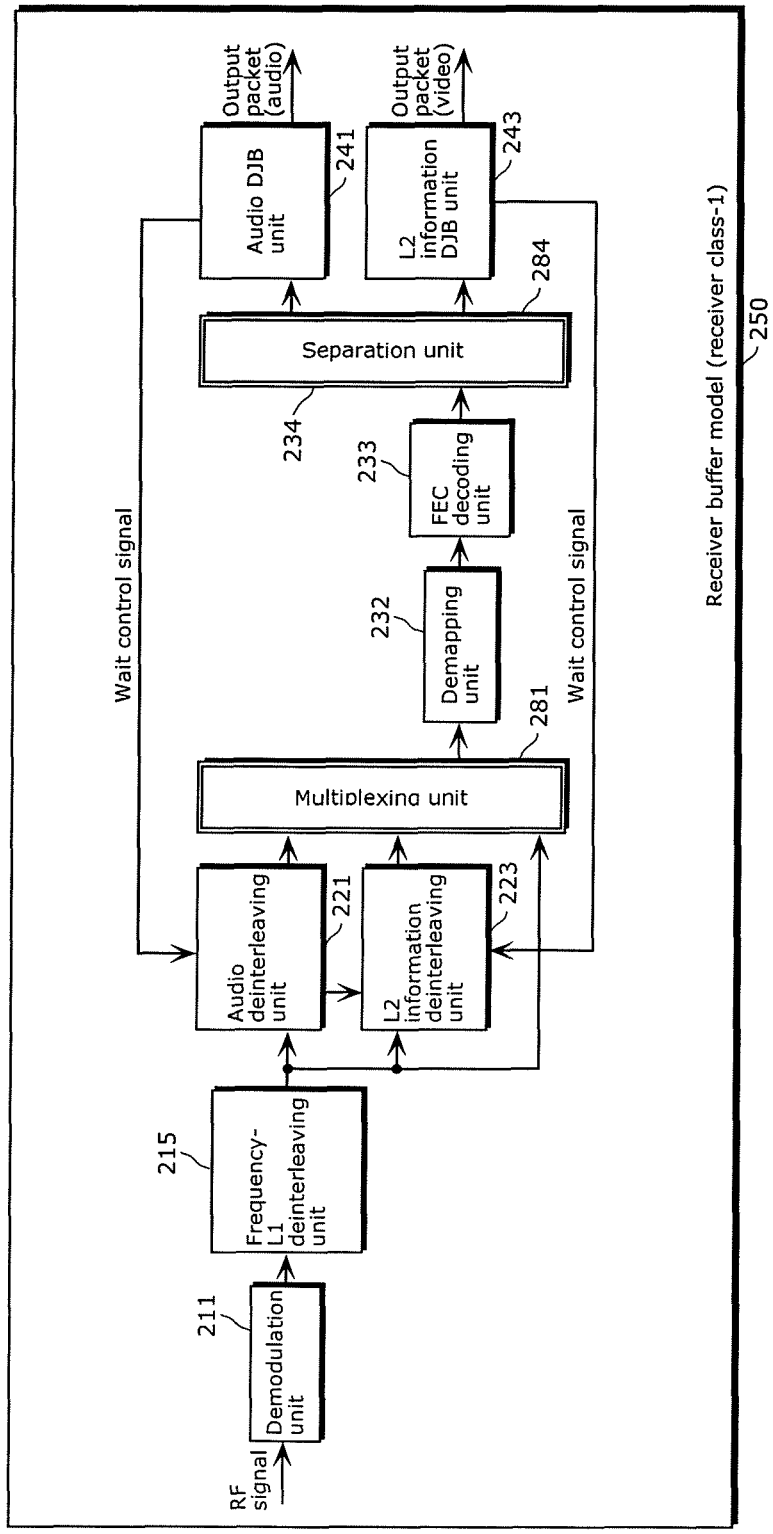
[FIG. 10]

FIG. 9 and FIG. 10 are diagrams showing configurations of a receiver buffer model (in the receiver class-2) 200 and a receiver buffer model (in the receiver class-1) 250, respectively.

Note that the receiver buffer model in the receiver class-2 has the same configuration as the receiver buffer model 200 and that the receiver buffer model in the receiver class-1 has the same configuration as the receiver buffer model 250. For example, the receiver buffer model 200 can be considered to have the same configuration as the aforementioned receiver buffer, instead of the receiver buffer model in the receiver class-2. Similarly, the receiver buffer model 250 can be considered to have the same configuration as the aforementioned receiver buffer, instead of the receiver buffer model of the receiver class-1.

When inputting a transmission signal to these receiver buffer models, the transmitting apparatus 100 shown in FIG. 5 generates the transmission parameter related to interleaving and the ISSY information including BUFS such that a buffer overflow is prevented from occurring to the deinterleaving unit and that a buffer underflow is prevented from occurring to the DJB unit.

For this purpose, these receiver buffer models are defined.

The receiver buffer model (in the receiver class-2) 200 shown in FIG. 9 includes a demodulation unit 211, a frequency-L1deinterleaving unit 215, an audio deinterleaving unit 221, a video deinterleaving unit 222, an L2 information deinterleaving unit 223, a multiplexing unit 231, a demapping unit 232, an FEC decoding unit 233, a separation unit 234, an audio DJB unit 241, a video DJB unit 242, and an L2 information DJB unit 243.

The receiver buffer model (in the receiver class-2) 200 shown in FIG. 9 is defined as follows.

The demodulation unit 211 receives an RF signal, performs OFDM demodulation, and outputs cell data regarding I-Q coordinates.

The frequency-L1 deinterleaving unit 215 performs frequency-deinterleaving on the cell data and also performs deinterleaving on the L1 information.

The deinterleaved L1 information passes through the multiplexing unit 231. Then, the demapping unit 232 performs demapping, and the FEC decoding unit 233 performs LDPC decoding and BCH decoding.

As a result of this, the L1 information is decoded.

When the PLP group (i.e., the PLP-1, -2, and -5) corresponding to the selected program (such as the Program-1 of the TS-1) is identified, the PLP-1, -2, and -5 are recognized, based on PLP_RX_CLASS shown in FIG. 6C, as the corresponding PLP group to be received by the receiver class-2.

The audio deinterleaving unit 221 extracts the cell of the PLP-1 that transmits audio and sorts the data in the reverse of the order in which sorting is performed in the interleaving at the transmitting side, on the basis of the decoded L1 information.

The video deinterleaving unit 222 extracts the cell of the PLP-2 that transmits video and sorts the data in the reverse of the order in which sorting is performed in the interleaving at the transmitting side, on the basis of the obtained L1 information.

The L2 information deinterleaving unit 223 extracts the cell of the PLP-5 that transmits the L2 information and sorts the data in the reverse of the order in which sorting is performed in the interleaving at the transmitting side, on the basis of the obtained L1 information.

The maximum total amount of memory in these three deinterleaving units is $(2^{19}+2^{15})$ cells.

The L1 information related to deinterleaving is indicated by, for example, "PLP_NUM_BLOCKS" and "PLP_NUM_BLOCKS_MAX" of the PLP-1, -2, and -5.

The multiplexing unit 231 multiplexes the outputs from these three deinterleaving units for each of the FEC frames.

The demapping unit 232 performs demapping, and the FEC decoding unit 233 performs LDPC decoding and BCH decoding.

As a result, these three pieces of PLP data are decoded.

The separation unit 234 separates the decoded PLP data into pieces of data corresponding to the PLPs (that is, into three pieces of data).

Each of the audio DJB unit 241, the video DJB unit 242, and the L2 information DJB unit 243 eliminates jitter using a buffer for de-jitter buffering on the basis of the ISSY information included in the baseband frame storing the decoded PLP data. Then, the audio DJB unit 241, the video DJB unit 242, and the L2 information DJB unit 243 output the audio packet, the video packet, and the L2 information packet, respectively.

The outputted packets are integrated in the PLP integration process performed by a functional block that is not shown. Then, a TS including the audio, the video, and the L2 information is generated.

The total buffer capacities used in these three processes for de-jitter buffering is 2 Mbits, as shown in FIG. 6A.

Each buffer capacity of the PLP-1, -2, and -5 is specified by a value of BUFS included in the ISSY information.

Moreover, in the three processes for de-jitter buffering, while the remaining buffer capacity is smaller than one baseband frame, a "Wait" control signal to be transmitted to the corresponding PLP interleaving unit is set active so that output from the corresponding deinterleaving unit is stopped.

As compared with the receiver buffer model (in the receiver class-2) 200 shown in FIG. 9, the receiver buffer model (in the receiver class-1) 250 shown in FIG. 10 has the following configuration. That is, the video deinterleaving unit 222 and the video DJB unit 242 are deleted, and the multiplexing unit and the separation unit in FIG. 9 are replaced respectively by the multiplexing unit 281 and the separation unit 284 as shown in FIG. 10.

When the PLP group (i.e., the PLP-1, -2, and -5) corresponding to the selected program (such as the Program-1 of the TS-1) is identified, the PLP-1 and -5 are recognized, based on PLP_RX_CLASS shown in FIG. 6C, as the corresponding PLP group to be received by the receiver class-1.

The audio deinterleaving unit 221 and the L2 information deinterleaving unit 223 extract the cell of the PLP-1 that transmits audio and the cell of the PLP-5 that transmits the L2 information, respectively, and sort the data in the reverse of the order in which sorting is performed in the interleaving at the transmitting side.

The maximum total amount of memory in these two deinterleaving units is $(2^{17}+2^{15})$ cells, as shown in FIG. 6A.

The L1 information related to deinterleaving is indicated by, for example, PLP_NUM_BLOCKS and PLP_NUM_BLOCKS_MAX of the PLP-1 and -5.

The multiplexing unit 281 multiplexes the outputs from these two deinterleaving unit for each of the FEC frames.

The separation unit 284 separates the decoded PLP data into pieces of data corresponding to the PLPs (that is, into two pieces of data).

Each of the audio DJB unit 241 and the L2 information DJB unit 243 eliminates jitter using a buffer for de-jitter buffering on the basis of the ISSY information included in the baseband frame storing the decoded PLP data. Then, the audio DJB unit 241 and the L2 information DJB unit 243 output the audio packet and the L2 information packet, respectively.

The outputted packets are integrated in the PLP integration process performed by a functional block that is not shown. Then, a TS including the audio and the L2 information is generated.

The total buffer capacities used in these two processes for de-jitter buffering is 1 Mbit, as shown in FIG. 6A.

Each buffer capacity of the PLP-1 and -5 is specified by a value of BUFS included in the ISSY information.

Moreover, in the two processes for de-jitter buffering, while the remaining buffer capacity is smaller than one baseband frame, a "Wait" control signal to be transmitted to the corresponding PLP interleaving unit is set active so that output from the corresponding deinterleaving unit is stopped.

Other operations are the same as performed by the receiver buffer model (in the receiver class-2) 200 shown in FIG. 9.

A receiving apparatus (in the receiver class-2) in Embodiment 1 is configured based on the receiver buffer model (in the receiver class-2) 200 shown in FIG. 9.

According to the definition of the receiver class-2 shown in FIG. 6A, the receiving apparatus (in the receiver class-2) previously includes the three deinterleaving units 221 to 223 and the three DJB units 241 to 243 to allow up to three PLPs to be processed.

Moreover, a capacity corresponding to $(2^{19}+2^{15})$ cells or more is prepared as the total amount of memory in the deinterleaving units, and a capacity corresponding to 2 Mbits or more is prepared as the total buffer capacity of the DJB units.

It should be noted that an integrated circuit may be configured, as one chip, to include a part or whole of the receiving apparatus.

A receiving apparatus (in the receiver class-1) in Embodiment 1 is configured based on the receiver buffer model (in the receiver class-1) 250 shown in FIG. 10.

According to the definition of the receiver class-1 shown in FIG. 6A, the receiving apparatus (in the receiver class-1) previously includes the two deinterleaving units 221 and 223 and the two DJB units 241 and 243 to allow up to two PLPs to be processed.

Moreover, a capacity corresponding to $(2^{17}+2^{15})$ cells or more is prepared as the total amount of memory in the deinterleaving units, and a capacity corresponding to 1 Mbit or more is prepared as the total buffer capacity of the DJB units.

It should be noted that an integrated circuit may be configured, as one chip, to include a part or whole of the receiving apparatus.

Accordingly, the configuration described thus far provides, in a transmission system having a PLP structure: a transmitting apparatus which performs an operation according to definitions of a plurality of receiver classes; and a receiver buffer model which controls such a transmitting apparatus, a receiving apparatus, an integrated circuit, and a program.

In particular, characteristics of the present technology include that: the maximum total amounts of memory for interleaving and deinterleaving and the maximum total DJB capacity are defined based on the number of PLPs to be received; and a parameter related to the capacity of the current PLP is sent using the L1 information and the ISSY information.

[Embodiment 2]

Figure 11:
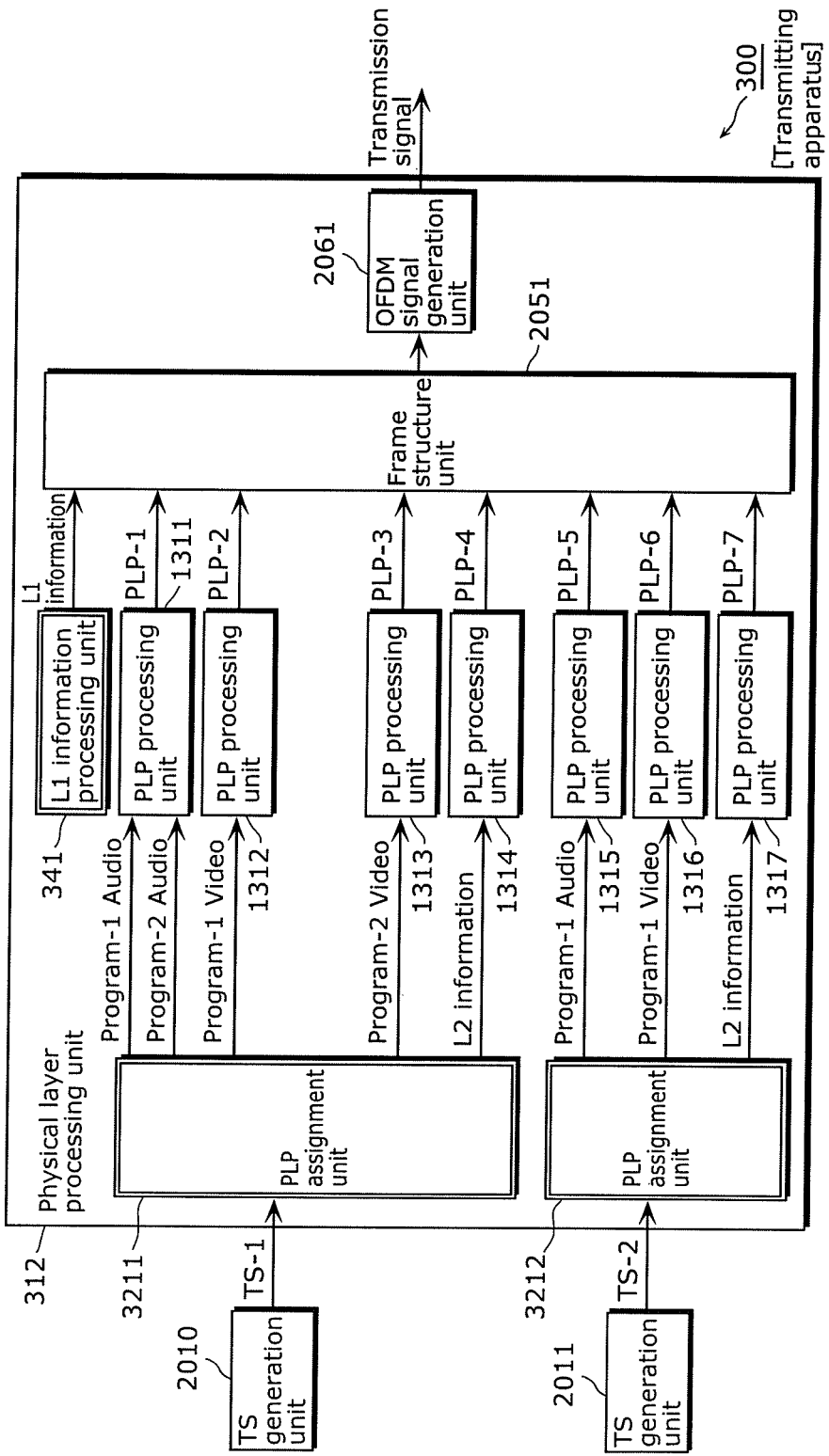
[FIG. 11]

FIG. 11 is a diagram showing a configuration of a transmitting apparatus 300 in Embodiment 2 according to the present invention.

Components identical to those of the conventional transmitting apparatus 2000 (shown in FIG. 2) and the transmitting apparatus 100 in Embodiment 1 are assigned, when deemed appropriate, the same reference signs as used in the transmitting apparatuses 2000 and 100. Thus, detailed explanations regarding these components are not repeated.

In Embodiment 2, a component of a program and a component of another program are assigned to the same PLP.

The diagram shows, as an example, that the components to be assigned to the same PLP are audio components.

A bit rate of an audio component is low as compared with that of a video component. On account of this, by assigning components of different programs to the same PLP, the interleaving effect can be increased and a delay in interleaving can be reduced.

As compared with the configuration of the transmitting apparatus 100 in Embodiment 1, the transmitting apparatus 300 shown in FIG. 11 has the following configuration. That is, the PLP assignment units and the L1 information processing unit in the physical layer processing unit of the transmitting apparatus 100 are replaced respectively by PLP assignment units 3211 and 3212 and an L1 information processing unit 341 in a physical layer processing unit 312.

Each of the PLP processing units (1311 to 1317) is provided for a corresponding PLP to be transmitted.

In the transmitting apparatus 300 shown in FIG. 11, each of the PLP assignment units 3211 and 3212 assigns, to the same PLP, audio components included in the same TS outputted from a corresponding TS generation unit 2010 or 2011.

As in Embodiment 1, each of the video component and the L2 information is assigned to a corresponding different PLP.

As in Embodiment 1, FIG. 6A is the diagram showing the definitions of the receiver classes.

FIG. 12 is a diagram showing: a corresponding PLP group for each of programs included in a TS; and a corresponding PLP group for each of the receiver class-1 and -2.

As in Embodiment 1, the L1 information created in the PLP loop in L1-post (configurable) shown in FIG. 6C is used.

Figure 13:
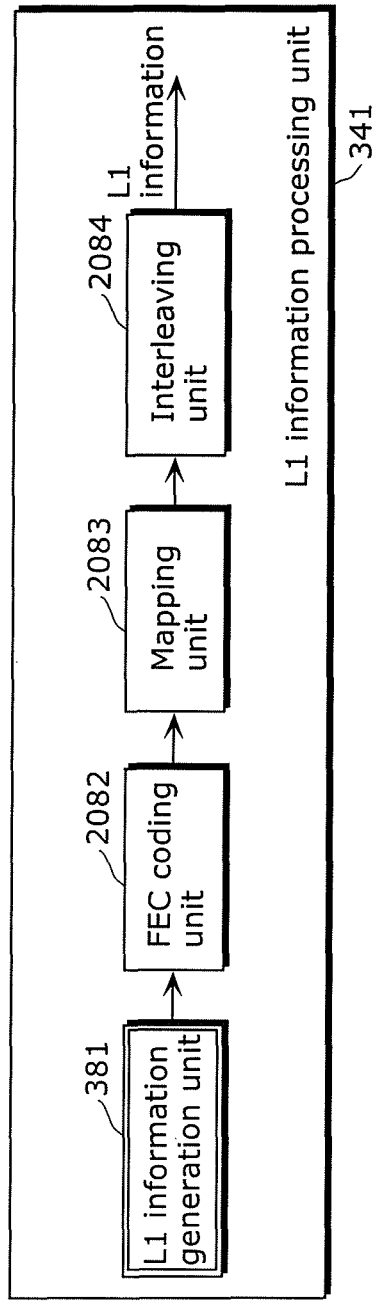
[FIG. 13]

FIG. 13 is a diagram showing a configuration of the L1 information processing unit 341.

As compared with the L1 information processing unit 141 shown in FIG. 8 in Embodiment, the L1 information processing unit 341 has the following configuration. That is, the L1 information generation unit in FIG. 8 is replaced by an L1 information generation unit 381.

The L1 information generation unit 381 of the L1 information processing unit 341 shown in FIG. 13 generates L1-pre information and L1-post information on the basis of the PLP groups of the receiver class-1 and -2shown in FIG. 12 such that PLP_RX_CLASS shown in FIG. 6C is included.

It should be noted that the L1-pre information and the L1-post information may be generated such that PLP_SYNC_COND shown in FIG. 6C is further included.

Other operations are the same as performed by the transmitting apparatus 100 in Embodiment 1.

A receiver buffer model (in the receiver class-2) in Embodiment 2 is the same as the receiver buffer model (in the receiver class-2) shown in FIG. 9 in Embodiment 1.

A receiving apparatus (in the receiver class-2) in Embodiment 2 is configured based on this receiver buffer model (in the receiver class-2).

A receiver buffer model (in the receiver class-1) in Embodiment 2 is the same as the receiver buffer model (in the receiver class-1) shown in FIG. 10 in Embodiment 1.

A receiving apparatus (in the receiver class-1) in Embodiment 2 is configured based on this receiver buffer model (in the receiver class-1).

As compared with Embodiment 1, a difference concerning the receiver buffer model and the receiving apparatus in Embodiment 2 is that the audio DJB unit 241 outputs the two audio components of the respective programs when the programs of the TS1 are selected.

Accordingly, the configuration described thus far provides, in a transmission system having a PLP structure: a transmitting apparatus used when a plurality of receiver classes are defined; and a receiver buffer model which controls such a transmitting apparatus, a receiving apparatus, an integrated circuit, and a program. In particular, a component of a program and a component of another program are assigned to the same PLP.

[Embodiment 3]

Figure 14:
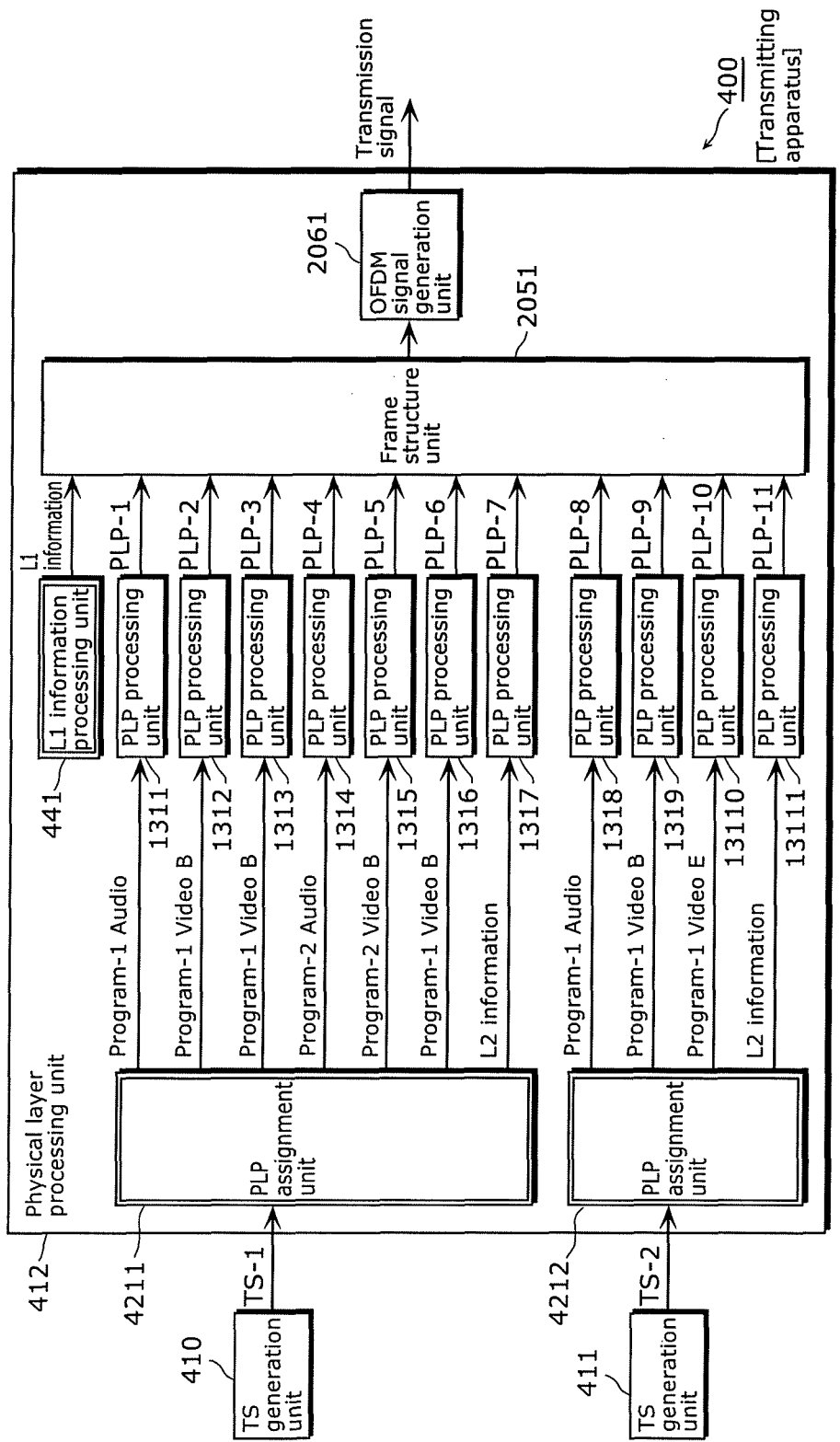
[FIG. 14]

FIG. 14 is a diagram showing a configuration of a transmitting apparatus 400 in Embodiment 3 according to the present invention.

Components identical to those of the conventional transmitting apparatus and the transmitting apparatuses in Embodiments 1 and 2 are assigned the same reference signs as used in the conventional transmitting apparatus and the transmitting apparatuses in Embodiments 1 and 2. Thus, detailed explanations regarding these components are not repeated.

In Embodiment 3, the TS generation unit generates, as two video components, a video B (Base layer) and a video E (Enhancement layer) according to scalable video coding (SVC).

With this, a transmission quality is implemented for each of the audio component, the video B component, and the video E component.

As compared with the transmitting apparatus 100 shown in FIG. 5 in Embodiment 1, the transmitting apparatus 400 shown in FIG. 14 has the following configuration. That is, the TS generation units and the PLP assignment units and the L1 information processing unit in the physical layer processing unit of the transmitting apparatus 100 are replaced respectively by TS generation units 410 and 411, PLP assignment units 4211 and 4212, and an L1 information processing unit 441 in a physical layer processing unit 412.

Each of the PLP processing units 1311 to 1319, 13110, and 13111 is provided for a corresponding PLP to be transmitted.

Figure 15:
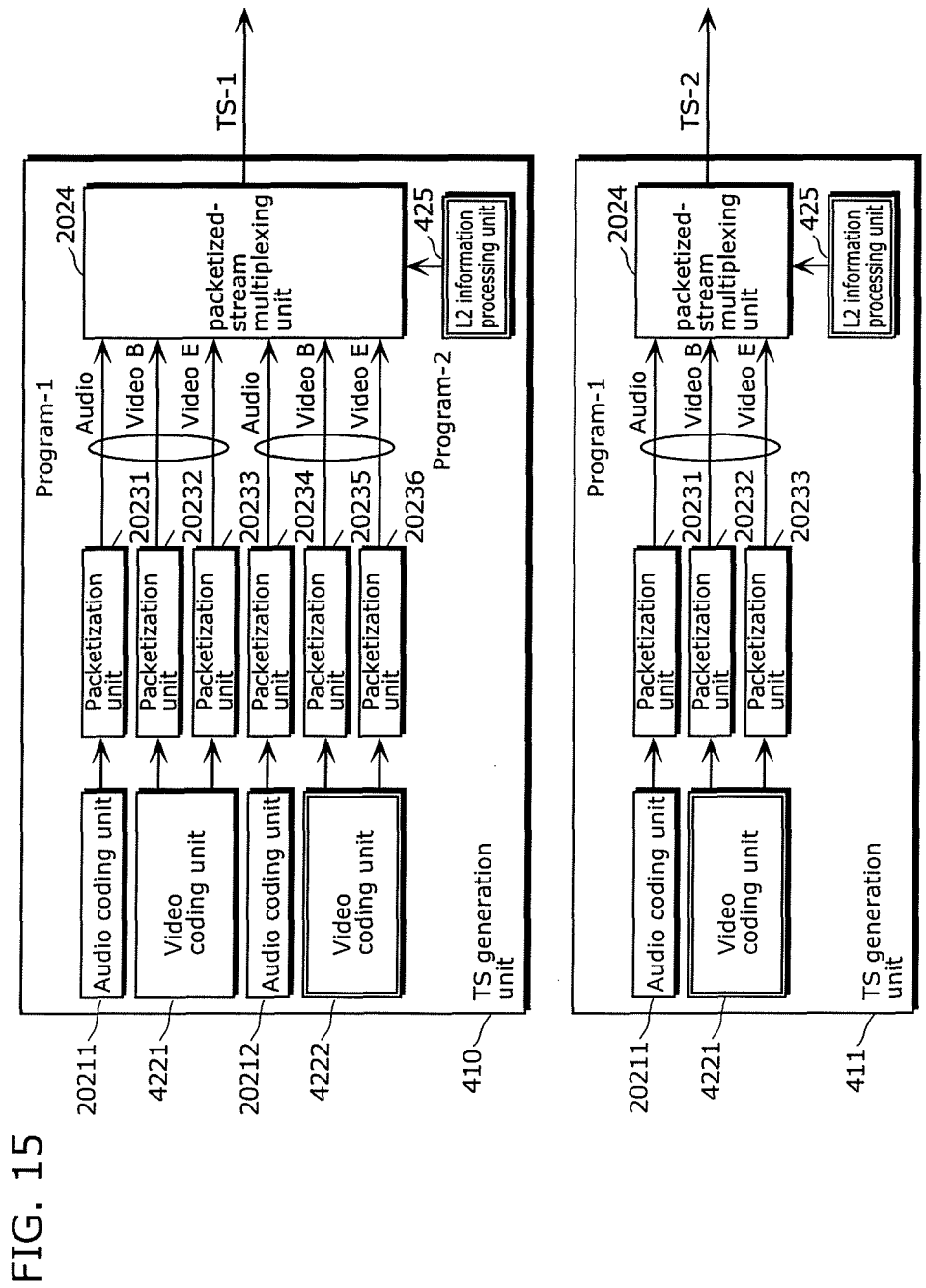
[FIG. 15]

FIG. 15 is a diagram showing configurations of the TS generation units 410 and 411.

As compared with the conventional TS generation units 2010 and 2011 shown in FIG. 2, the TS generations units 410 and 411 shown in FIG. 15 have the following configurations. That is, the video coding units and the L2 information processing unit in FIG. 2 are replaced by video coding units 4221 and 4222 and L2 information processing unit 425, respectively.

The video coding units 4221 and 4222 included in the TS generation units 410 and 411 as shown in FIG. 11 generate the two video components, i.e., the video B and the video E, according to source coding based on SVC.

The L2 information processing unit 425 generates L2 information, such as PSI and SI.

In the transmitting apparatus 400 shown in FIG. 14, each of the PLP assignment units 4211 and 4212 included in the physical layer processing unit 412 assigns a PLP for each of service components of the audio, video B, and video E included in a program included in a TS outputted from a corresponding TS generation unit 410 or 411, and also assigns a PLP to L2 information.

FIG. 16A is a diagram showing definitions of receiver classes.

A receiver in a receiver class-3 receives the service components of the audio, video B, and video E and the L2 information. Moreover, the maximum number of PLPs to be received is 4.

The maximum interleaved total amount is defined as (2^19+2^15) cells and the maximum DJB total capacity is defined as 2 Mbits.

On the other hand, the receiver class-2 is defined as not receiving the video E component. Thus, the maximum number of PLPs to be received can be reduced to 3.

Accordingly, the maximum interleaved total amount is defined as (2^18+2^15) cells and the maximum DJB total capacity is defined as 1.5 Mbits.

The receiver class-1 is defined as not receiving the video E and B components. Thus, the maximum number of PLPs to be received can be reduced to 2.

Accordingly, the maximum interleaved total amount is defined as (2^17+2^15) cells and the maximum DJB total capacity is defined as 1 Mbit.

FIG. 16B is a diagram showing a corresponding PLP group for each of programs included in a TS and a corresponding PLP group for each of the receiver class-1, -2, and -3.

FIG. 16C is a diagram showing L1 information that is created in a PLP loop in L1-post (configurable).

For each of the PLPs, PLP_RX_CLASS is created.

Here, PLP_RX_CLASS indicates a receiver class that receives the PLP including the data of the PLP_RX_CLASS (or more specifically, receives data such as the video B of the current PLP). When a value of the PLP_RX_CLASS is "0", this represents only the receiver class-3 (corresponding to the video E, in the present example). A value "1" represents the receiver class-2 and -3 (corresponding to the video B in the present example). A value "2" represents the receiver class-1, -2, and -3 (corresponding to the L2 information and the audio in the present example).

This identifies the PLP group (i.e., the PLP-1, -2, -3, and -7) corresponding to the program (such as the Program-1 in the TS-1) selected by the receiver. Thus, whether or not the receiver class-1, -2, and -3 are to receive the data can be determined for each of the PLPs.

Figure 17:
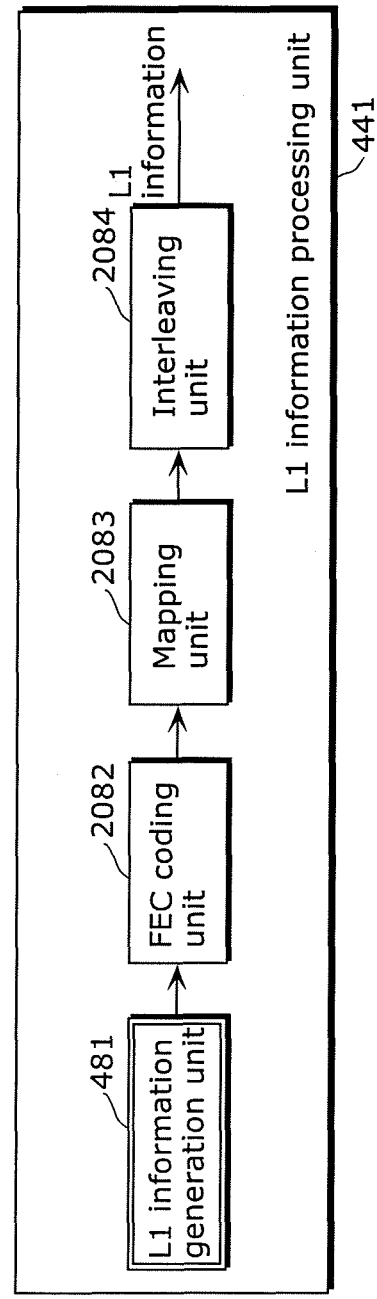
[FIG. 17]

FIG. 17 is a diagram showing a configuration of the L1 information processing unit 441.

As compared with the L1 information processing unit 141 shown in FIG. 8 in Embodiment 1, the L1 information processing unit 441 has the following configuration. That is, the L1 information generation unit in FIG. 8 is replaced by an L1 information generation unit 481.

The L1 information generation unit 481 of the L1 information processing unit 441 shown in FIG. 17 generates L1-pre information and L1-post information on the basis of the PLP groups of the receiver class-1, -2, and -3 shown in FIG. 16B such that PLP_RX_CLASS shown in FIG. 16C is included.

It should be noted that the L1-pre information and the L1-post information may be generated such that PLP_SYNC_COND shown in FIG. 16C is further included.

Other operations are the same as performed by the transmitting apparatus 100 in Embodiment 1.

Figure 18:
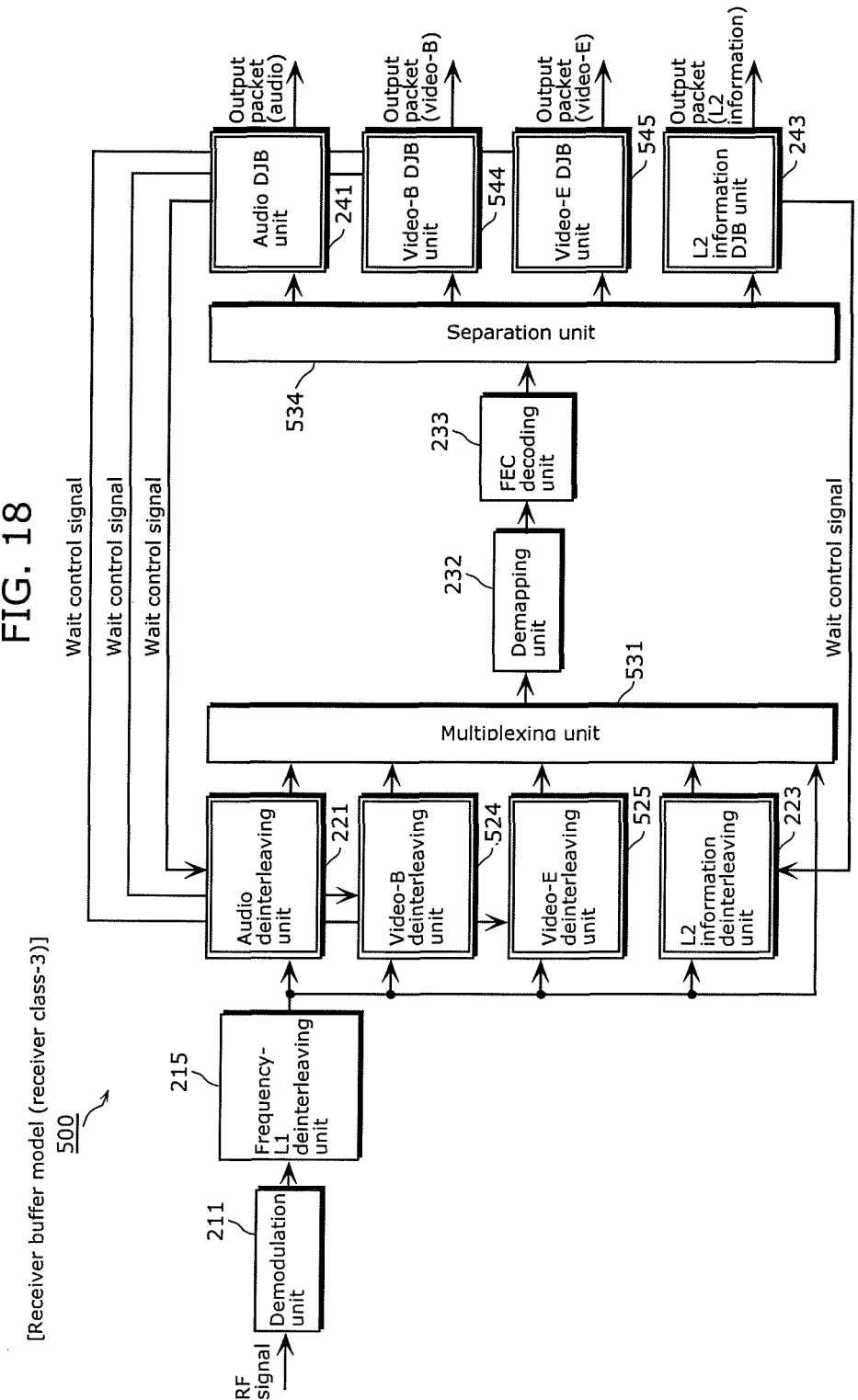
[FIG. 18]
Figure 19:
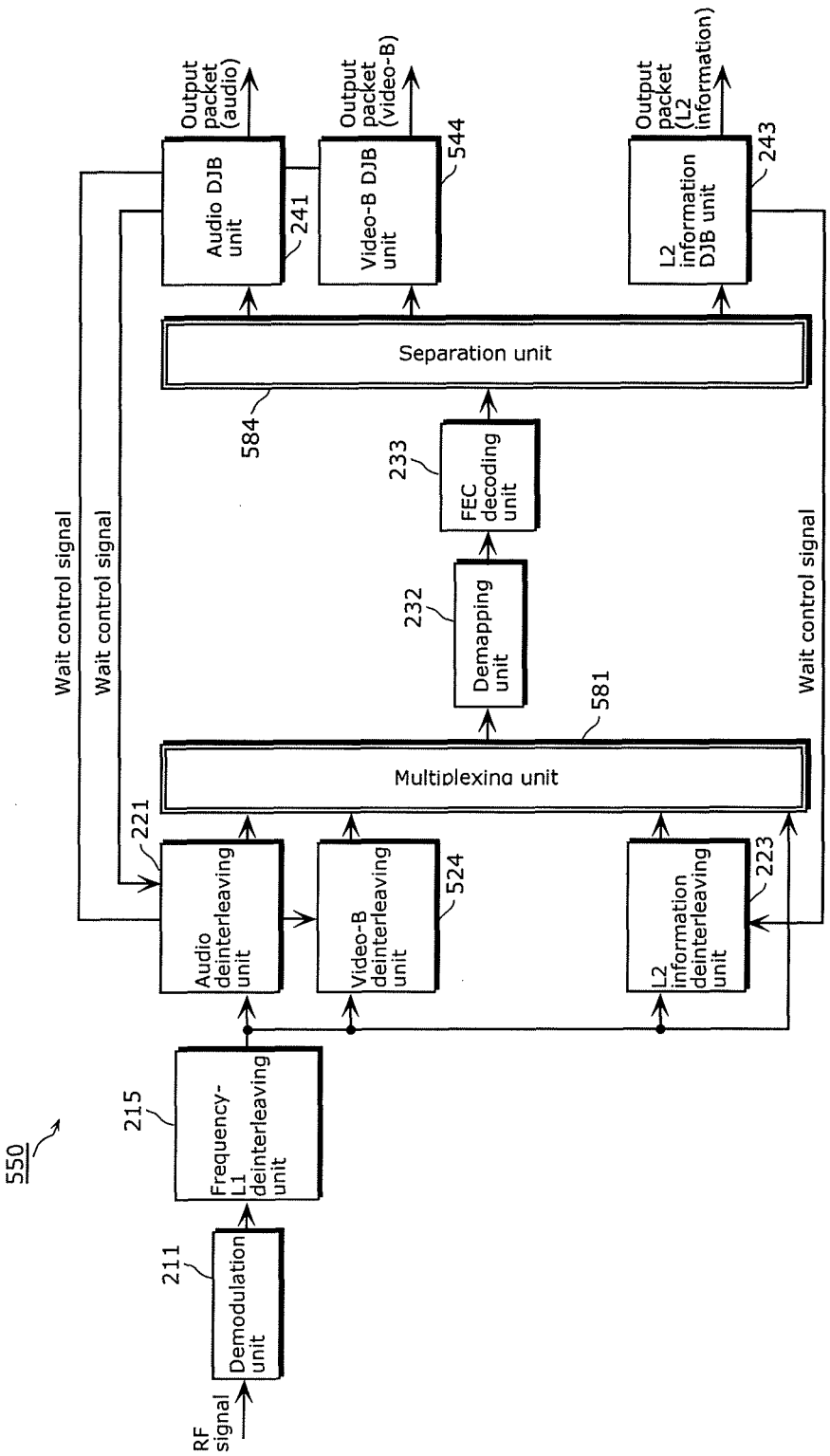
[FIG. 19]

FIG. 18 and FIG. 19 are diagrams showing configurations of a receiver buffer model (in the receiver class-3) 500 and a receiver buffer model (in the receiver class-2) 550, respectively.

The receiver buffer model in the receiver class-1 has the same configuration as the receiver buffer model (in the receiver class-1) 250 shown in FIG. 10 in Embodiments 1 and 2.

When inputting a transmission signal to these receiver buffer models, the transmitting apparatus 400 shown in FIG. 14 generates the transmission parameter related to interleaving and the ISSY information including BUFS such that a buffer overflow is prevented from occurring to the deinterleaving unit and that a buffer underflow is prevented from occurring to the DJB unit.

For this purpose, these receiver buffer models are defined.

The receiver buffer model (in the receiver class-3) 500 shown in FIG. 18 is different from the receiver buffer model (in the receiver class-2) 200 shown in FIG. 9 in Embodiment 1 in that four deinterleaving units 221, 524, 525, and 223 and four DJB units 241, 243, 544, and 545 are included.

Moreover, the multiplexing unit and the separation unit in FIG. 9 are replaced by a multiplexing unit 531 and a separation unit 534, respectively, as shown in the present configuration.

In the receiver buffer model (in the receiver class-3) 500 shown in FIG. 18, the deinterleaved L1 information passes through the multiplexing unit 531. Then, the demapping unit 232 and the FEC decoding unit 233 decode the L1 information.

When the PLP group (i.e., the PLP-1, -2, -3, and -7) corresponding to the selected program (such as the Program-1 of the TS-1) is identified, the PLP-1, -2, -3, and -7 are recognized, based on PLP_RX_CLASS shown in FIG. 16C, as the corresponding PLP group to be received by the receiver class-3.

The audio deinterleaving unit 221 extracts the cell of the PLP-1 that transmits audio and sorts the data in the reverse of the order in which sorting is performed in the interleaving at the transmitting side, on the basis of the decoded L1 information.

The L2 information deinterleaving unit 223 extracts the cell of the PLP-7 that transmits the L2 information and sorts the data in the reverse of the order in which sorting is performed in the interleaving at the transmitting side, on the basis of the obtained L1 information.

The video-B deinterleaving unit 524 extracts the cell of the PLP-2 that transmits the video B and sorts the data in the reverse of the order in which sorting is performed in the interleaving at the transmitting side, on the basis of the obtained L1 information.

The video-E deinterleaving unit 525 extracts the cell of the PLP-3 that transmits the video E and sorts the data in the reverse of the order in which sorting is performed in the interleaving at the transmitting side, on the basis of the obtained L1 information.

The maximum total amount of memory in these four deinterleaving units is $(2^{19}+2^{15})$ cells.

The L1 information related to deinterleaving is indicated by, for example, PLP_NUM_BLOCKS and PLP_NUM_BLOCKS_MAX of the PLP-1, -2, -3, and -7.

The multiplexing unit 531 multiplexes the outputs from these four deinterleaving units for each of the FEC frames.

The separation unit 534 separates the decoded PLP data into pieces of data corresponding to the PLPs (that is, into four pieces of data).

Each of the audio DJB unit 241, the L2 information DJB unit 243, the video-B DJB unit 544, and the video-E DJB unit 545 eliminates jitter using a buffer for de-jitter buffering on the basis of the ISSY information included in the baseband frame storing the decoded PLP data. Then, the audio DJB unit 241, the L2 information DJB unit 243, the video-B DJB unit 544, and the video-E DJB unit 545 output the audio packet, the L2 information packet, the video B packet, and the video E packet, respectively.

The outputted packets are integrated in the PLP integration process performed by a functional block that is not shown. Then, a TS including the audio, the L2 information, the video B, and the video E is generated.

The total buffer capacities used in these four processes for de-jitter buffering is 2 Mbits, as shown in FIG. 16A.

Each buffer capacity of the PLP-1, -2, -3, and -7 is specified by a value of BUFS included in the ISSY information.

Moreover, in the four processes for de-jitter buffering, while the remaining buffer capacity is smaller than one baseband frame, a "Wait" control signal to be transmitted to the corresponding PLP interleaving unit is set active so that output from the corresponding deinterleaving unit is stopped.

Other operations are the same as performed by the receiver buffer model (in the receiver class-2) 200 shown in FIG. 9.

As compared with the receiver buffer model (in the receiver class-3) 500 shown in FIG. 18, the receiver buffer model (in the receiver class-2) 550 shown in FIG. 19 has the following configuration. That is, the video-E deinterleaving unit 525 and the video-B DJB unit 554 are deleted, and the multiplexing unit and the separation unit in FIG. 18 are replaced respectively by a multiplexing unit 581 and a separation unit 584 as shown in FIG. 10.

When the PLP group (i.e., the PLP-1, -2, -3, and -7) corresponding to the selected program (such as the Program-1 of the TS-1) is identified, the PLP-1, -2, and -7 are recognized, based on PLP_RX_CLASS shown in FIG. 16C, as the corresponding PLP group to be received by the receiver class-2.

The audio deinterleaving unit 221, the L2 information deinterleaving unit 223, and the video-B deinterleaving unit 524 extract the cell of the PLP-1 that transmits audio, the cell of the PLP-7 that transmits the L2 information, and the cell of the PLP-2 that transmits the video B, respectively, and sort the data in the reverse of the order in which sorting is performed in the interleaving at the transmitting side.

The maximum total amount of memory in these three deinterleaving units is $(2^{18}+2^{15})$ cells, as shown in FIG. 16A.

The L1 information related to deinterleaving is indicated by, for example, PLP_NUM_BLOCKS and PLP_NUM_BLOCKS_MAX of the PLP-1, -2, and -7.

The multiplexing unit 581 multiplexes the outputs from these three deinterleaving units for each of the FEC frames.

The separation unit 584 separates the decoded PLP data into pieces of data corresponding to the PLPs (that is, into three pieces of data).

Each of the audio DJB unit 241, the L2 information DJB unit 243, and the video-B DJB unit 544 eliminates jitter using a buffer for de-jitter buffering on the basis of the ISSY information included in the baseband frame storing the decoded PLP data. Then, the audio DJB unit 241, the L2 information DJB unit 243, and the video-B DJB unit 544 output the audio packet, the L2 information packet, and the video B packet, respectively.

The outputted packets are integrated in the PLP integration process performed by a functional block that is not shown. Then, a TS including the audio, the L2 information, and the video B is generated.

The total buffer capacities used in these three processes for de-jitter buffering is 1.5 Mbits, as shown in FIG. 16A.

Each buffer capacity of the PLP-1, -2, and -7 is specified by a value of BUFS included in the ISSY information.

Moreover, in the three processes for de-jitter buffering, while the remaining buffer capacity is smaller than one baseband frame, a "Wait" control signal to be transmitted to the corresponding PLP interleaving unit is set active so that output from the corresponding deinterleaving unit is stopped.

Other operations are the same as performed by the receiver buffer model (in the receiver class-3) 500 shown in FIG. 18.

When the receiver buffer model (in the receiver class-1) 250 shown in FIG. 10 identifies the PLP group (i.e., the PLP-1, -2, -3, and -7) corresponding to the selected program (such as the Program-1 of the TS-1), the PLP-1 and -7 are recognized, based on PLP_RX_CLASS shown in FIG. 16C, as the corresponding PLP group to be received by the receiver class-1.

The audio deinterleaving unit 221 and the L2 information deinterleaving unit 223 extract the cell of the PLP-1 that transmits audio and the cell of the PLP-7 that transmits the L2 information, respectively, and sort the data in the reverse of the order in which sorting is performed in the interleaving at the transmitting side.

The maximum total amount of memory in these two deinterleaving units is $(2^{17}+2^{15})$ cells.

The L1 information related to deinterleaving is indicated by, for example, PLP_NUM_BLOCKS and PLP_NUM_BLOCKS_MAX of the PLP-1, and -7.

Each of the audio DJB unit 241 and the L2 information DJB unit 243 eliminates jitter using a buffer for de-jitter buffering on the basis of the ISSY information included in the baseband frame storing the decoded PLP data. Then, the audio DJB unit 241 and the L2information DJB unit 243 output the audio packet and the L2information packet, respectively.

The outputted packets are integrated in the PLP integration process performed by a functional block that is not shown. Then, a TS including the audio and the L2 information is generated.

The total buffer capacities used in these two processes for de-jitter buffering is 1 Mbit, as shown in FIG. 16A.

Each buffer capacity of the PLP-1, and -7 is specified by a value of BUFS included in the ISSY information.

Moreover, in the two processes for de-jitter buffering, while the remaining buffer capacity is smaller than one baseband frame, a "Wait" control signal to be transmitted to the corresponding PLP interleaving unit is set active so that output from the corresponding deinterleaving unit is stopped.

Other operations are the same as performed by the receiver buffer model (in the receiver class-2) 200 shown in FIG. 9.

A receiving apparatus (in the receiver class-3) in Embodiment 3 is configured based on the receiver buffer model (in the receiver class-3) 500 shown in FIG. 18.

According to the definition of the receiver class-3 shown in FIG. 16A, the receiving apparatus (in the receiver class-3) previously includes the four deinterleaving units 221, 223, 524, and 525 and the four DJB units 241, 243, 544, and 545 to allow up to four PLPs to be processed.

Moreover, a capacity corresponding to $(2^{19}+2^{15})$ cells or more is prepared as the total amount of memory in the deinterleaving units, and a capacity corresponding to 2 Mbits or more is prepared as the total buffer capacity of the DJB units.

It should be noted that an integrated circuit may be configured, as one chip, to include a part or whole of the receiving apparatus.

A receiving apparatus (in the receiver class-2) in Embodiment 3 is configured based on the receiver buffer model (in the receiver class-2) 550 shown in FIG. 19.

According to the definition of the receiver class-2 shown in FIG. 16A, the receiving apparatus (in the receiver class-2) previously includes the three deinterleaving units 221, 223, and 524 and the three DJB units 241, 243, and 544 to allow up to three PLPs to be processed.

Moreover, a capacity corresponding to $(2^{18}+2^{15})$ cells or more is prepared as the total amount of memory in the deinterleaving units, and a capacity corresponding to 1.5 Mbits or more is prepared as the total buffer capacity of the DJB units.

It should be noted that an integrated circuit may be configured, as one chip, to include a part or whole of the receiving apparatus.

A receiving apparatus (in the receiver class-1) in Embodiment 3 is configured based on the receiver buffer model (in the receiver class-1) 250 shown in FIG. 10.

According to the definition of the receiver class-1 shown in FIG. 16A, the receiving apparatus (in the receiver class-1) previously includes the two deinterleaving units 221 and 223 and the two DJB units 241 and 243 to allow up two PLPs to be processed.

Moreover, a capacity corresponding to $(2^{17}+2^{15})$ cells or more is prepared as the total amount of memory in the deinterleaving units, and a capacity corresponding to 1 Mbit or more is prepared as the total buffer capacity of the DJB units.

It should be noted that an integrated circuit may be configured, as one chip, to include a part or whole of the receiving apparatus.

Accordingly, the configuration described thus far provides, in a transmission system having a PLP structure: a transmitting apparatus configured to define a plurality of receiver classes; and a receiver buffer model which controls such a transmitting apparatus, a receiving apparatus, an integrated circuit, and a program. In particular, the characteristics include that: the video B and the video E are generated, as two video components, according to SVC; and a transmission quality is implemented for each of the audio component, the video B component, and the video E component.

[Embodiment 4]

Figure 20:
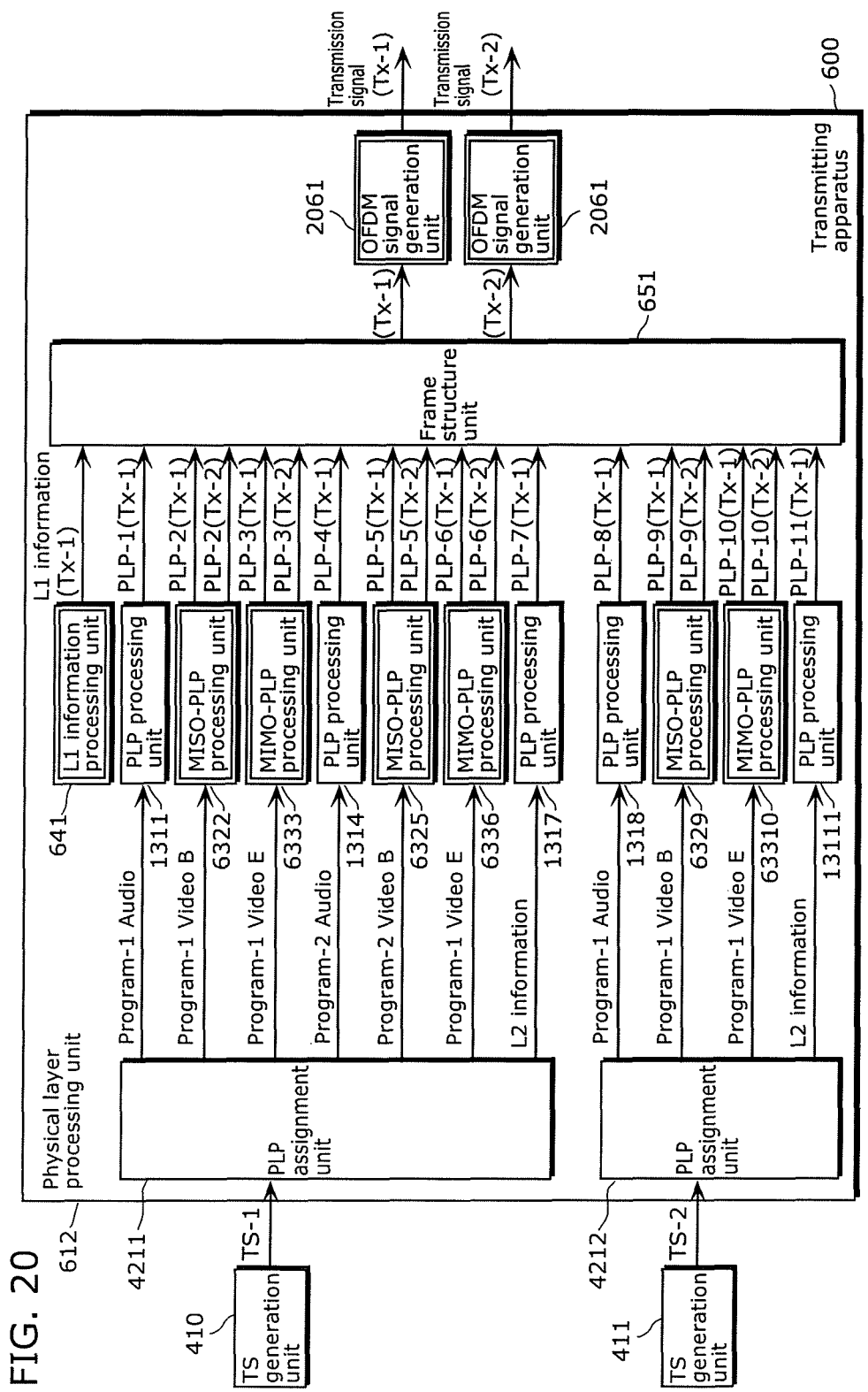
[FIG. 20]

FIG. 20 is a diagram showing a configuration of a transmitting apparatus 600 in Embodiment 4 according to the present invention.

Components identical to those of the conventional transmitting apparatus and the transmitting apparatuses in Embodiments 1 to 3 are assigned, when deemed appropriate, the same reference signs as used in the conventional transmitting apparatus and the transmitting apparatuses in Embodiments 1 to 3. Thus, detailed explanations regarding these components are not repeated.

In Embodiment 4, the TS generation unit generates, as two video components, a video B and a video E according to SVC, as in Embodiment 3.

Moreover, MISO (multi-input single-output) transmission is applied to the PLP transmitting the video B and MIMO (multi-input multi-output) transmission is applied to the PLP transmitting the video E, so that a transmission quality is implemented for each of the audio, video B, and video E components. Furthermore, a plurality of receiver classes are defined together with the number of receiving antennas.

As compared with the transmitting apparatus 400 shown in FIG. 14 in Embodiment 3, the transmitting apparatus 600 shown in FIG. 20 has the following configuration. That is, the L1 information processing unit and the frame structure unit in the physical layer processing unit of the transmitting apparatus 400 are replaced respectively by an L1 information processing unit 641 and a frame structure unit 651 in a physical layer processing unit 612. Moreover, the OFDM, signal generation unit 2061 is provided for each of two transmitting antennas.

Moreover, the PLP processing units for the PLPs transmitting the video B are replaced by MISO-PLP processing units (6322, 6325, and 6329), and the PLP processing units for the PLPs transmitting the video E are replaced by MIMO-PLP processing units (6333, 6336, and 63310).

The PLP processing units (1311, 1314, 1317, 1318, and 13111) are provided corresponding to the PLPs transmitting the audio and the MISO-PLP processing units (6322, 6325, and 6329) are provided corresponding to the PLPs transmitting the video B. The MIMO-PLP processing units (6333, 6336, and 63310) are provided corresponding to the PLPs transmitting the video E.

FIG. 21A is a diagram showing definitions of receiver classes.

As compared with the definitions of the receiver classes shown in FIG. 16A in Embodiment 3, the minimum number of receiving antennas and the necessity of MISO-MIMO decoding are added. Moreover, the maximum interleaved total amounts of the receiver class-2 and -3 are increased to (2^19+2^15) cells and (2^20+2^15) cells, respectively.

As in Embodiment 3, FIG. 16B shows a corresponding PLP group for each of programs included in a TS and a corresponding PLP group for each of the receiver class-1, -2, and -3.

FIG. 21B is a diagram showing L1 information that is created in a PLP loop in L1-post (configurable).

As compared with the L1 information shown in FIG. 16C in Embodiment 3, "PLP_MIMO_MISO_SISO" is created for each of the PLPs. As definitions of values of PLP_MIMO_MISO_SISO, "0" represents the MIMO transmission (that corresponds to the video E in the present example), "1" represents the MISO transmission (that corresponds to the video B in the present example), and "2" represents the SISO transmission (that corresponds to the L2information and the audio in the present example).

This identifies the PLP group (i.e., the PLP-1, -2, -3, and -7) corresponding to the program (such as the Program-1 in the TS-1) selected by the receiver. Thus, which one of the MIMO transmission, the MISO transmission, and the SISO transmission is applied can be determined for each of the PLPs.

Figure 22:
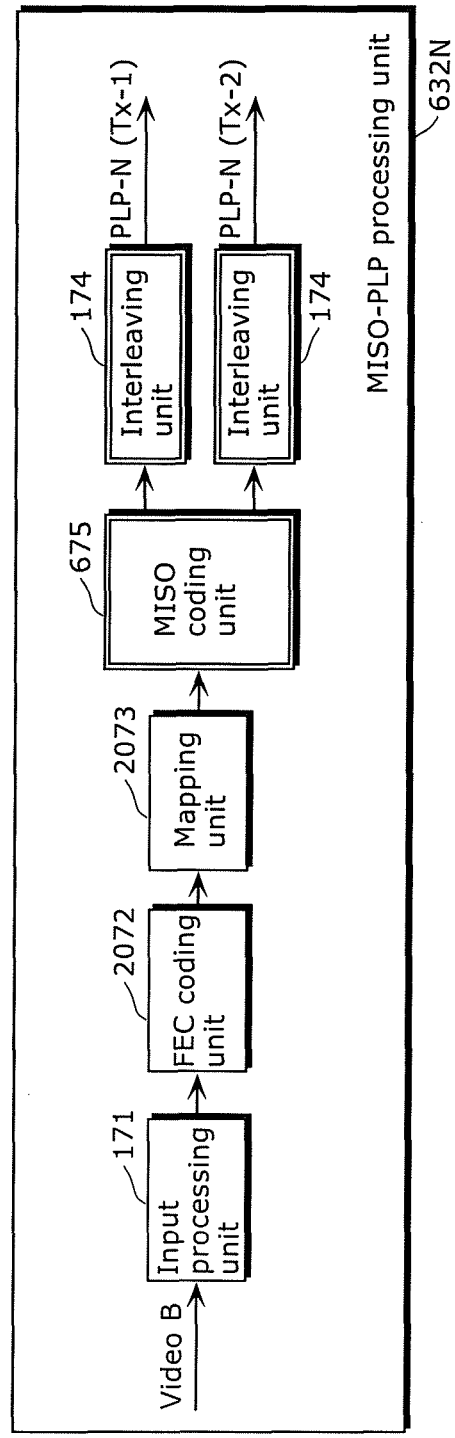
[FIG. 22]

FIG. 22 is a diagram showing a configuration of a MISO-PLP processing unit 632N.

Each of the MISO-PLP processing units shown in FIG. 20 has the same configuration as the MISO-PLP processing unit 632N.

As compared with the PLP processing unit 131N shown in FIG. 7 in Embodiments 1 to 3, a MISO coding unit 675 is added and the interleaving unit 174 is provided for each of the transmitting antennas as shown in this configuration.

The MISO coding unit 675 of the MISO-PLP processing unit 632N shown in FIG. 22 performs MISO coding. Each of the interleaving units 174 provided for the two transmitting antennas performs the same interleaving as performed in Embodiments 1 to 3.

Figure 23:
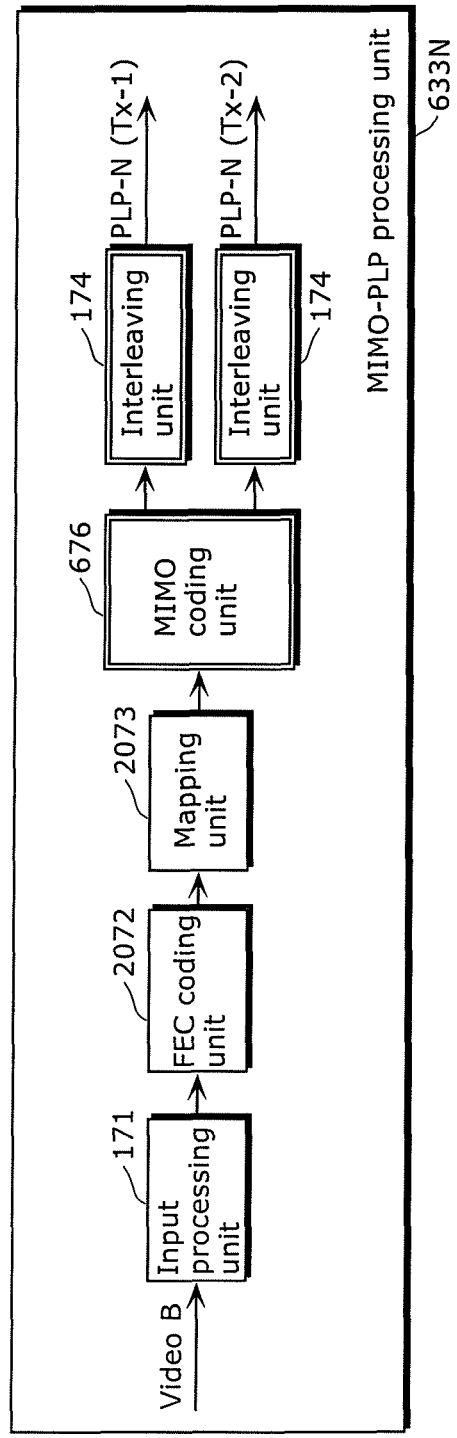
[FIG. 23]

FIG. 23 is a diagram showing a configuration of a MIMO-PLP processing unit 633N.

Each of the MIMO-PLP processing units shown in FIG. 20 has the same configuration as the MIMO-PLP processing unit 633N.

As compared with the PLP processing unit 131N shown in FIG. 7 in Embodiments 1 to 3, a MIMO coding unit 676 is added and the interleaving unit 174 is provided for each of the two transmitting antennas as shown in this configuration.

The MIMO coding unit 676 in the MIMO-PLP processing unit 633N shown in FIG. 23 performs MIMO coding.

Each of the interleaving units 174 provided for the two transmitting antennas performs the same interleaving as performed in Embodiments 1 to 3.

Figure 24:
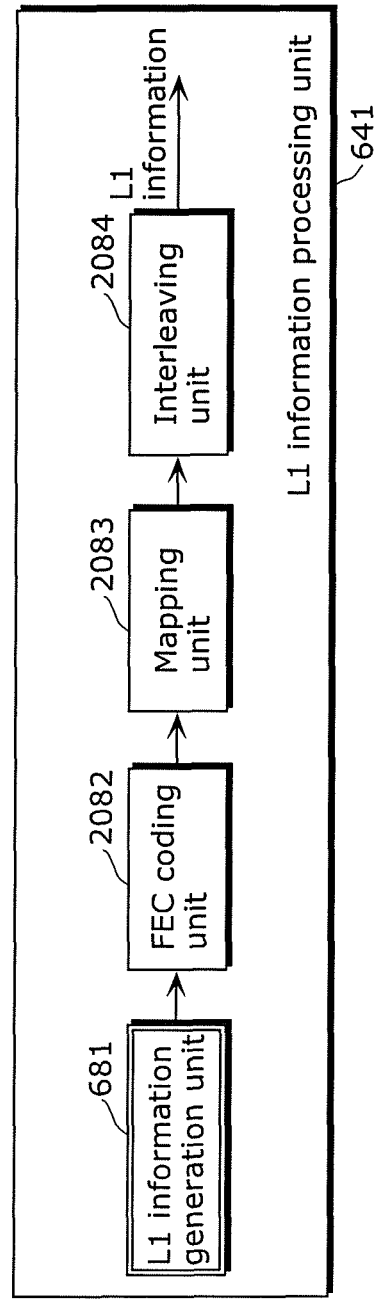
[FIG. 24]

FIG. 24 is a diagram showing a configuration of the L1information processing unit 641.

This configuration includes an L1 information generation unit 681 in place of the L1 information generation unit included in the conventional L1 information processing unit 2041 shown in FIG. 4.

The L1 information generation unit 681 of the L1 information processing unit 641 shown in FIG. 24 generates L1-pre information and L1-post information such that PLP_RX_CLASS and PLP_MIMO_MISO_SISO shown in FIG. 21B are included.

It should be noted that the L1-pre information and the L1-post information may be generated such that PLP_SYNC_COND shown in FIG. 6C is further included.

The frame structure unit 651 of the transmitting apparatus 600 shown in FIG. 20 generates transmission frames using: the mapping data for each of the PLPs outputted from the PLP processing units (1311, 1314, 1317, 1318, and 13111), the MISO-PLP processing units (6322, 6325, and 6329), and the MIMO-PLP processing units (6333, 6336, and 63310); and the mapping data of the L1 information outputted from the L1 information processing unit 641. Then, the frame structure unit 651 outputs the generated transmission frames.

The following data is allocated to the transmission frame for the transmitting antenna 1 (i.e., Tx-1): the mapping data of the PLPs outputted from the PLP processing units (1311, 1314, 1317, 1318, and 13111) applying the SISO transmission; the mapping data of the PLPs outputted from the MISO-PLP processing units (6322, 6325, and 6329) applying the MISO transmission; the mapping data of the PLPs outputted from the MIMO-PLP processing units (6333, 6336, and 63310) applying the MIMO transmission; and the mapping data of the L1 information outputted from the L1 information processing unit 641.

To the transmission frame for the transmitting antenna 2 (i.e., a Tx-2), the mapping data of the PLPs outputted from the MIMO-PLP processing units (6333, 6336, and 63310) applying the MIMO transmission is allocated.

As in Embodiments 1 to 3, the OFDM signal generation unit 2061 provided for each of the two transmitting antennas performs pilot signal insertion, IFFT, GI insertion, and P1 symbol insertion on the transmission frame structure outputted from the frame structure unit 651, and then outputs the transmission signal.

Other operations are the same as performed by the transmitting apparatus 400 shown in FIG. 14 in Embodiment 3.

Figure 25:
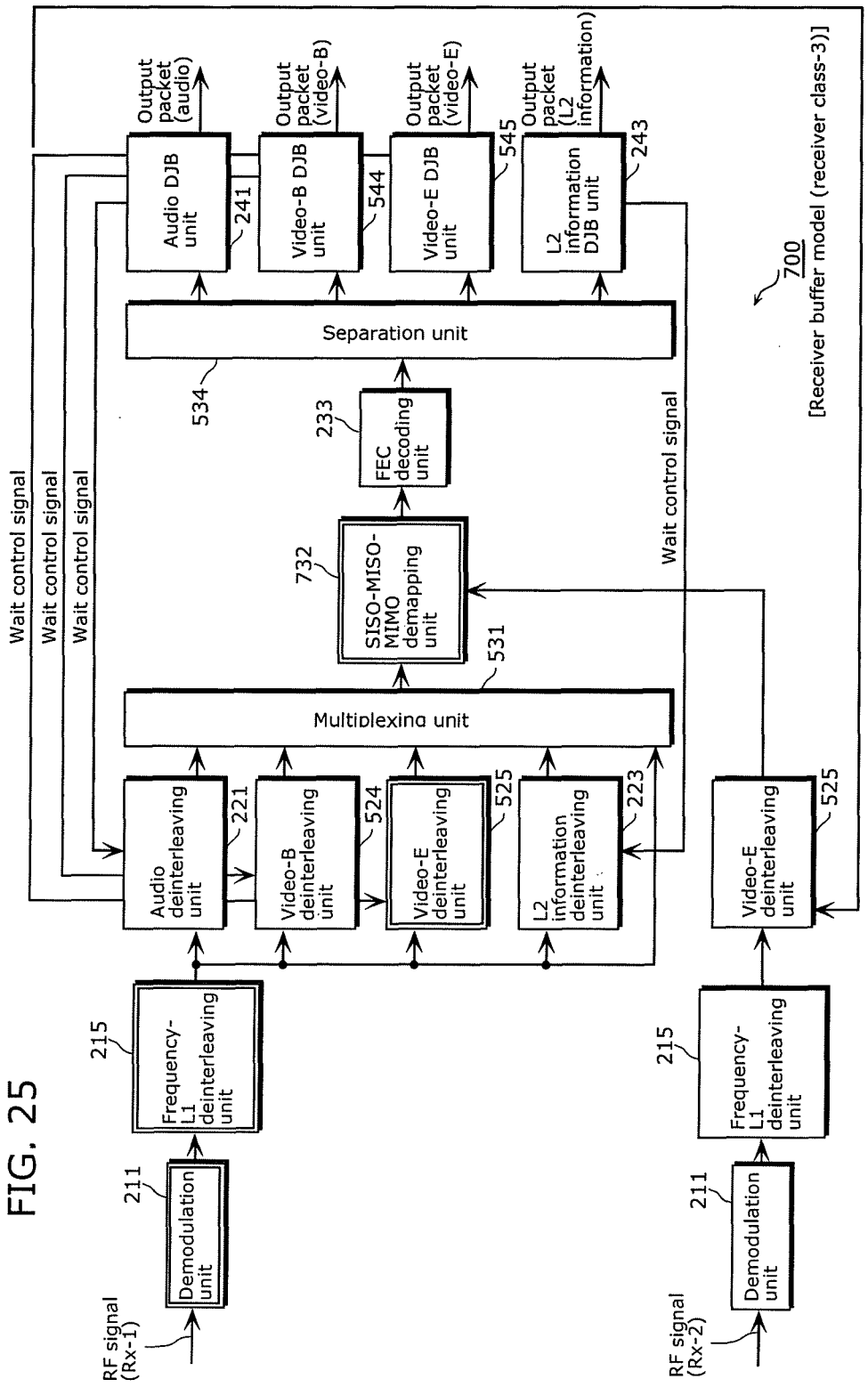
[FIG. 25]
Figure 26:
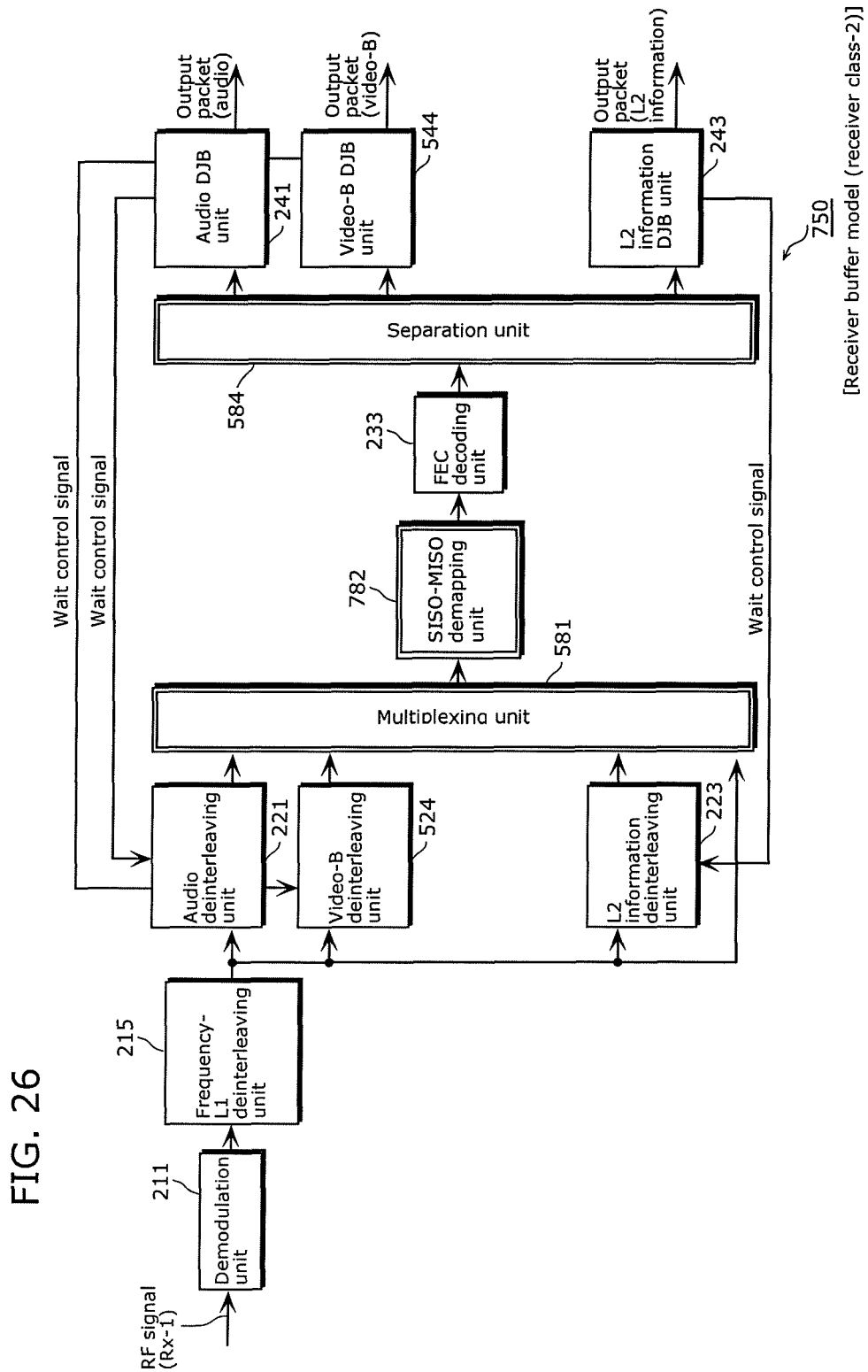
[FIG. 26]

FIG. 25 and FIG. 26 are diagrams showing configurations of a receiver buffer model (in the receiver class-3) 700 and a receiver buffer model (in the receiver class-2) 750, respectively.

The receiver buffer model in the receiver class-1 has the same configuration as the receiver buffer model (in the receiver class-1) 250 shown in FIG. 10 in Embodiments 1 to 3.

When inputting a transmission signal to these receiver buffer models, the transmitting apparatus 600 shown in FIG. 20 generates the transmission parameter related to interleaving and the ISSY information including BUFS such that a buffer overflow is prevented from occurring to the deinterleaving unit and that a buffer underflow is prevented from occurring to the DJB unit.

For this purpose, these receiver buffer models are defined.

As compared with the receiver buffer model (in the receiver class-3) 500 shown in FIG. 18 in Embodiment 3, the receiver buffer model (in the receiver class-3) 700 shown in FIG. 25 has the following configuration. That is, the demodulation unit 211 corresponding to a receiving antenna (i.e., an Rx-2), the frequency-L1 deinterleaving unit 215, and the video-E deinterleaving unit 525 are added, and the demapping unit in FIG. 18 is replaced by a SISO-MISO-MIMO demapping unit 732.

The receiver buffer model (in the receiver class-3) 700 shown in FIG. 25 is defined as follows.

The demodulation unit 211 and the frequency-L1deinterleaving unit 215 both corresponding to an Rx-1 perform the same operation as performed by the receiver buffer model (in the receiver class-3) 500 shown in FIG. 18 in Embodiment 3.

The deinterleaved L1 information passes through the multiplexing unit 531. Then, the SISO-MISO-MIMO demapping unit 732 and the FEC decoding unit 233 perform the same operation as performed by the receiver buffer model (in the receiver class-3) 500 in Embodiment 3. As a result, the L1 information is decoded.

When the PLP group (i.e., the PLP-1, -2, -3, -7) corresponding to the selected program (such as the Program-1 of the TS-1) is identified, the PLP-1, -2, -3, and -7 are recognized, based on PLP_RX_CLASS shown in FIG. 21C, as the corresponding PLP group to be received by the receiver class-3.

The audio deinterleaving unit 221 corresponding to the Rx-1 extracts the cell of the PLP-1 that transmits the audio and sorts the data in the reverse of the order in which sorting is performed in the interleaving at the transmitting side, on the basis of the decoded L1information.

The L2 information deinterleaving unit 223 corresponding to the Rx-1 extracts the cell of the PLP-7 that transmits the L2information and sorts the data in the reverse of the order in which sorting is performed in the interleaving at the transmitting side, on the basis of the decoded L1 information.

The video-B deinterleaving unit 524 corresponding to the Rx-1 extracts the cell of the PLP-2 that transmits the video B and sorts the data in the reverse of the order in which sorting is performed in the interleaving at the transmitting side, on the basis of the decoded L1information.

The video-E deinterleaving unit 525 corresponding to the Rx-1 extracts the cell of the PLP-3 that transmits the video E and sorts the data in the reverse of the order in which sorting is performed in the interleaving at the transmitting side, on the basis of the decoded L1information.

The multiplexing unit 531 multiplexes the outputs from these four deinterleaving units for each of the FEC frames.

Moreover, by PLP_MIMO_MISO_SISO shown in FIG. 21B, the PLP-1 and -7 are recognized as applying the SISO transmission, and the PLP-2 and the PLP-3 are recognized as applying the MISO transmission and the MIMO transmission, respectively. The demodulation unit 211 and the frequency-L1 deinterleaving unit 215 both corresponding to the RX-2 perform the same operation as the Rx-1.

The video-E deinterleaving unit 525 corresponding to the Rx-2 extracts the cell of the PLP-3 that transmits the video E and sorts the data in the reverse of the order in which sorting is performed in the interleaving at the transmitting side, on the basis of the decoded L1information.

The maximum total amount of memory in these five deinterleaving units is (2^20+2^15) cells, as shown in FIG. 21A.

The SISO-MISO-MIMO demapping unit 732 performs demapping on the PLP-1 (i.e., the audio) and the PLP-7 (i.e., the L2 information) transmitted according to the SISO transmission, as in Embodiment 3.

The SISO-MISO-MIMO demapping unit 732 performs MISO demapping on the PLP-2 (i.e., the video B) transmitted according to the MISO transmission.

The SISO-MISO-MIMO demapping unit 732 performs MIMO demapping on the PLP-3 (i.e., the video E) transmitted according to the MIMO transmission.

The separation unit 234 separates the decoded PLP data into pieces of data corresponding to the PLPs (that is, into four pieces of data).

The total buffer capacities used in these four processes for de-jitter buffering is 2 Mbits, as shown in FIG. 21A. Each buffer capacity of the PLP-1, -2, -3, and -7 is specified by a value of BUFS included in the ISSY information.

Moreover, in the four processes for de-jitter buffering, while the remaining buffer capacity is smaller than one baseband frame, a "Wait" control signal to be transmitted to the corresponding PLP interleaving unit is set active so that output from the corresponding deinterleaving unit is stopped.

In particular, the video-E DJB unit 545 outputs the Wait control signal to each of the video-E deinterleaving units 525 corresponding to the Rx-1 and -2.

Other operations are the same as performed by the receiver buffer model (in the receiver class-3) 500 shown in FIG. 18 in Embodiment 3.

As compared with the receiver buffer model (in the receiver class-3) 700 shown in FIG. 25, the receiver buffer model (in the receiver class-2) shown in FIG. 26 has the following configuration. That is, the video-E deinterleaving unit 525 and the video-E DJB unit 545 both corresponding to the Rx-1 are deleted, and the Rx-2 is also deleted. Furthermore, the multiplexing unit, the separation unit, and the SISO-MISO-MIMO demapping unit in FIG. 25 are replaced respectively by a multiplexing unit 581, a separation unit 584, and a SISO-MISO demapping unit 782.

The configuration shown in FIG. 26 includes the SISO-MISO demapping unit 782 in place of the demapping unit included in the receiver buffer model (in the receiver class-3) 550 shown in FIG. 19 in Embodiment 3.

When the PLP group (i.e., the PLP-1, -2, -3, -7) corresponding to the selected program (such as the Program-1 of the TS-1) is identified, the PLP-1, -2, and -7 are recognized, based on PLP_RX_CLASS shown in FIG. 21C, as the corresponding PLP group to be received by the receiver class-2.

The audio deinterleaving unit 221, the L2 information deinterleaving unit 223, and the video-B deinterleaving unit 524 extract the cell of the PLP-1 that transmits audio, the cell of the PLP-7 that transmits the L2 information, and the cell of the PLP-2 that transmits the video B, respectively, and sort the data in the reverse of the order in which sorting is performed in the interleaving at the transmitting side.

The maximum total amount of memory in these three deinterleaving units is (2^19+2^15) cells, as shown in FIG. 21A.

The L1 information related to deinterleaving is indicated by, for example, PLP_NUM_BLOCKS and PLP_NUM_BLOCKS_MAX of the PLP-1, -2, and -7.

The multiplexing unit 581 multiplexes the outputs from these three deinterleaving units for each of the FEC frames.

The SISO-MISO demapping unit 732 performs demapping on the PLP-1 (i.e., the audio) and the PLP-7 (i.e., the L2 information) transmitted according to the SISO transmission, as in Embodiment 3.

The SISO-MISO demapping unit 732 performs MISO demapping on the PLP-2 (i.e., the video B) transmitted according to the MISO transmission.

The separation unit 584 separates the decoded PLP data into pieces of data corresponding to the PLPs (that is, into three pieces of data).

The total buffer capacities used in these three processes for de-jitter buffering is 1.5 Mbits, as shown in FIG. 21A.

Each buffer capacity of the PLP-1, -2, and -7 is specified by a value of BUFS included in the ISSY information.

Moreover, in the three processes for de-jitter buffering, while the remaining buffer capacity is smaller than one baseband frame, a "Wait" control signal to be transmitted to the corresponding PLP interleaving unit is set active so that output from the corresponding deinterleaving unit is stopped.

Other operations are the same as performed by the receiver buffer model (in the receiver class-3) 550 shown in FIG. 19 in Embodiment 3.

When the receiver buffer model (in the receiver class-1) 250 shown in FIG. 10 identifies the PLP group (i.e., the PLP-1, -2, -3, and -7) corresponding to the selected program (such as the Program-1 of the TS-1), the PLP-1 and -7 are recognized, based on PLP_RX_CLASS shown in FIG. 21C, as the corresponding PLP group to be received by the receiver class-1.

The audio deinterleaving unit 221 and the L2 information deinterleaving unit 223 extract the cell of the PLP-1 that transmits the audio and the cell of the PLP-7 that transmits the L2 information, respectively, and sort the data in the reverse of the order in which sorting is performed in the interleaving at the transmitting side.

The maximum total amount of memory in these two deinterleaving units is $(2^{17}+2^{15})$ cells, as shown in FIG. 21A.

The L1 information related to deinterleaving is indicated by, for example, PLP_NUM_BLOCKS and PLP_NUM_BLOCKS_MAX of the PLP-1, and -7.

The multiplexing unit 281 multiplexes the outputs from these two deinterleaving units for each of the FEC frames.

The separation unit 284 separates the decoded PLP data into pieces of data corresponding to the PLPs (that is, into two pieces of data).

Each of the audio DJB unit 241 and the L2 information DJB unit 243 eliminates jitter using a buffer for de-jitter buffering on the basis of the ISSY information included in the baseband frame storing the decoded PLP data. Then, the audio DJB unit 241 and the L2information DJB unit 243 output the audio packet and the L2information packet, respectively.

The outputted packets are integrated in the PLP integration process performed by a functional block that is not shown. Then, a TS including the audio and the L2 information is generated.

The total buffer capacities used in these two processes for de-jitter buffering is 1 Mbit, as shown in FIG. 21A.

Each buffer capacity of the PLP-1, and -7 is specified by a value of BUFS included in the ISSY information.

Moreover, in the two processes for de-jitter buffering, while the remaining buffer capacity is smaller than one baseband frame, a "Wait" control signal to be transmitted to the corresponding PLP interleaving unit is set active so that output from the corresponding deinterleaving unit is stopped.

A receiving apparatus (in the receiver class-3) in Embodiment 4 is configured based on the receiver buffer model (in the receiver class-3) 700 shown in FIG. 25.

According to the definition of the receiver class-3 shown in FIG. 21A, the receiving apparatus (in the receiver class-3) previously includes the two antennas.

Moreover, the receiving apparatus (in the receiver class-3) previously includes the four deinterleaving units 221, 223, 524, and 525 and the four DJB units 241, 243, 544, and 545 both corresponding to the Rx-1 to allow up to four PLPs to be processed.

Furthermore, the deinterleaving unit 525 is previously included corresponding to the Rx-2.

Moreover, a capacity corresponding to $(2^{20}+2^{15})$ cells or more is prepared as the total amount of memory in the deinterleaving units, and a capacity corresponding to 2 Mbits or more is prepared as the total buffer capacity of the DJB units.

Moreover, MISO decoding and MIMO decoding are enabled beforehand.

It should be noted that an integrated circuit may be configured, as one chip, to include a part or whole of the receiving apparatus.

A receiving apparatus (in the receiver class-2) in Embodiment 3 is configured based on the receiver buffer model (in the receiver class-2) 750 shown in FIG. 26.

According to the definition of the receiver class-2 shown in FIG. 21A, the receiving apparatus (in the receiver class-2) previously includes the three deinterleaving units 221, 223, and 524 and the three DJB units 241, 243, 544 to allow up to three PLPs to be processed.

Moreover, a capacity corresponding to $(2^{19}+2^{15})$ cells or more is prepared as the total amount of memory in the deinterleaving units, and a capacity corresponding to 1.5 Mbits or more is prepared as the total buffer capacity of the DJB units.

Moreover, MISO decoding is enabled beforehand.

It should be noted that an integrated circuit may be configured, as one chip, to include a part or whole of the receiving apparatus.

A receiving apparatus (in the receiver class-1) in Embodiment 3 is configured based on the receiver buffer model (in the receiver class-1) 250 shown in FIG. 10.

According to the definition of the receiver class-1 shown in FIG. 21A, the receiving apparatus (in the receiver class-1) previously includes the two deinterleaving units 221 and 223 and the two DJB units 241 and 243 to allow up to two PLPs to be processed.

Moreover, a capacity corresponding to $(2^{17}+2^{15})$ cells or more is prepared as the total amount of memory in the deinterleaving units, and a capacity corresponding to 1 Mbit or more is prepared as the total buffer capacity of the DM units.

It should be noted that an integrated circuit may be configured, as one chip, to include a part or whole of the receiving apparatus.

Accordingly, the configuration described thus far provides, in a transmission system having a PLP structure: a transmitting apparatus which defines a plurality of receiver classes; and a receiver buffer model which controls such a transmitting apparatus, a receiving apparatus, an integrated circuit, and a program. In particular, MISO transmission is applied to the PLP transmitting the video B and MIMO transmission is applied to the PLP transmitting the video E, so that a transmission quality is implemented for each of the audio, video B, and video E components. Furthermore, the plurality of receiver classes are defined together with the number of receiving antennas.

[Embodiment 5]

Figure 27:
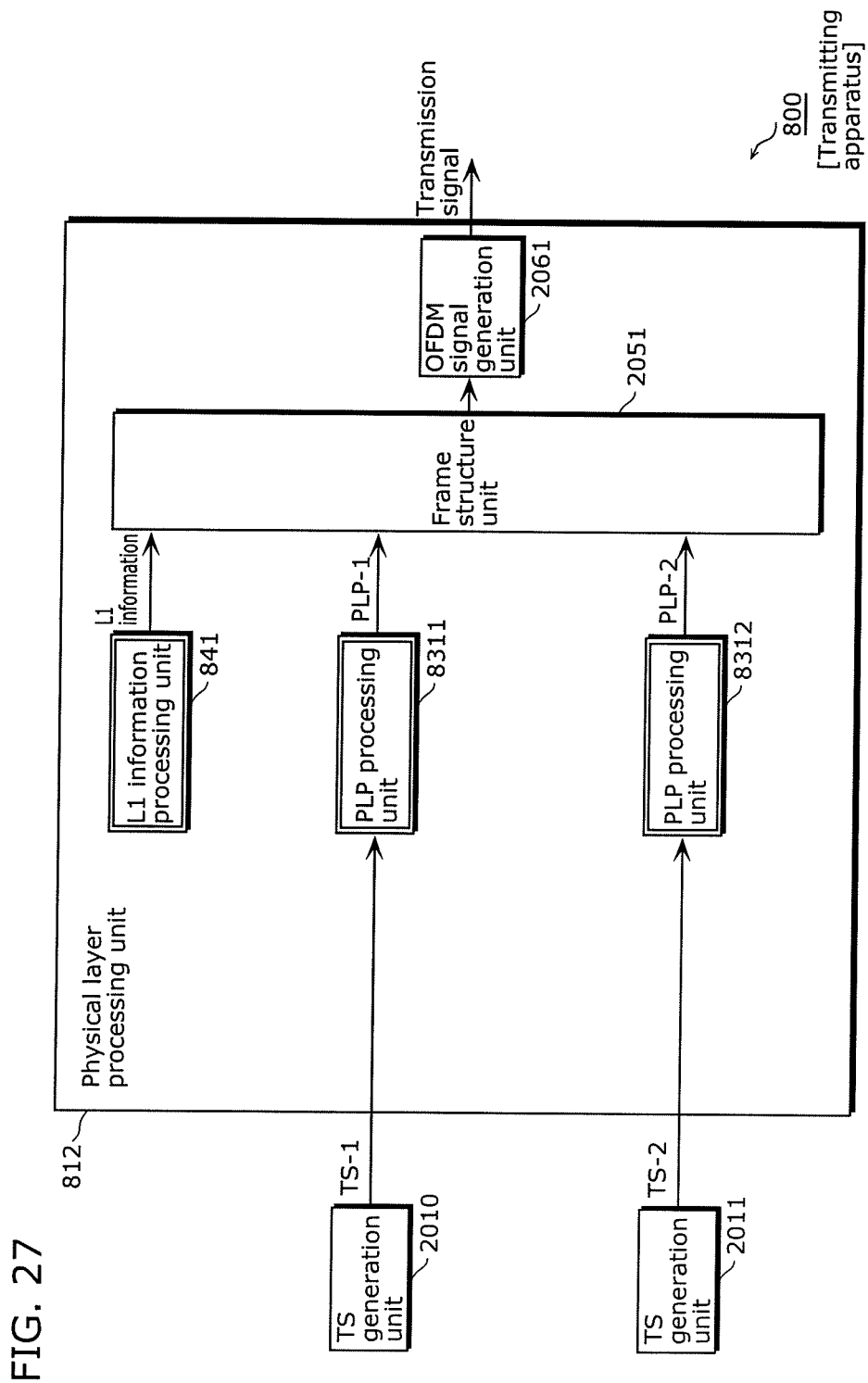
[FIG. 27]

FIG. 27 is a diagram showing a configuration of a transmitting apparatus 800 in Embodiment 5 according to the present invention.

Components identical to those of the conventional transmitting apparatus and the transmitting apparatuses in Embodiments 1 to 4 are assigned the same reference signs as used in the conventional transmitting apparatus and the transmitting apparatuses in Embodiments 1 to 4. Thus, detailed explanations regarding these components are not repeated.

Embodiment 5 describes the case where the standard has branches and the FEC coding method is different for each of the branches.

As one example, the following describes the case where a branch 1 adopts an LDPC coding method and a branch 2 adopts a turbo coding method.

As compared with the conventional transmitting apparatus 2000 shown in FIG. 2, the transmitting apparatus 800 shown in FIG. 27 has the following configuration. That is, the PLP processing units and the L1 information processing unit in the physical layer processing unit in FIG. 2 are replaced respectively by PLP processing units 8311 and 8312 and an L1 information processing unit 841 in a physical layer processing unit 812 in FIG. 27.

Each of the PLP processing units 8311 and 8312 is provided for a corresponding PLP to be transmitted.

FIG. 28A is a diagram showing definitions of receiver classes.

The receiver class-2 corresponds to both the branches 1 and 2, and implements both the LDPC and turbo coding methods for FEC decoding.

The maximum interleaved total amount is defined as 2^19 cells, and the maximum DJB total capacity is defined as 2 Mbits On the other hand, a receiver class-1a is defined as corresponding only to the branch 1, and may thus implement only the LDPC coding method for FEC decoding.

A receiver class-1b is defined as corresponding only to the branch 2, and may thus implement only the turbo coding method for FEC decoding.

FIG. 28B is a diagram showing: a corresponding PLP for each of programs included in a TS; a corresponding PLP for each of the receiver class-1a, -1b, and -2; a corresponding FEC coding method; and a corresponding standard branch.

FIG. 28C is a diagram showing L1 information created in a PLP loop in L1-post (configurable).

For each of the PLPs, PLP_RX_CLASS is created.

Here, PLP_RX_CLASS indicates a receiver class that receives the current PLP. A value "0" represents the receiver class-1a and -2 (corresponding to the standard branch 1 and the LDPC coding method in the present example). A value "1" represents the receiver class-1b and -2(corresponding to the standard branch 2 and the turbo coding method in the present example).

This identifies the PLP (i.e., the PLP-1) corresponding to the program (such as the Program-1 in the TS-1) selected by the receiver. Thus, whether or not the receiver class-1a, -1b, and -2are to receive this PLP can be determined.

Moreover, "PLP_BRANCH" may be created for each of the PLPs as shown in FIG. 28D.

Here, PLP_BRANCH indicates a standard branch of the current PLP. A value "0" represents the branch 1 (corresponding to the LDPC coding method in the present example). A value "1" represents the branch 2 (corresponding to the turbo coding method in the present example).

This identifies the PLP (i.e., the PLP-1) corresponding to the program (such as the Program-1 in the TS-1) selected by the receiver. Thus, whether or not the receiver class-1a, -1b, and -2are to receive this PLP can be determined.

Moreover, "PLP_FEC_CODE" may be created for each of the PLPs as shown in FIG. 28E.

Here, PLP_FEC_CODE indicates an FEC coding method of the current PLP. A value "0" represents the LDPC coding method (corresponding to the standard branch 1 in the present example). A value "1" represents the turbo coding method (corresponding to the standard branch 2 in the present example).

This identifies the PLP (i.e., the PLP-1) corresponding to the program (such as the Program-1 in the TS-1) selected by the receiver. Thus, whether or not the receiver class-1a, -1b, and -2are to receive this PLP can be determined.

Figure 29:
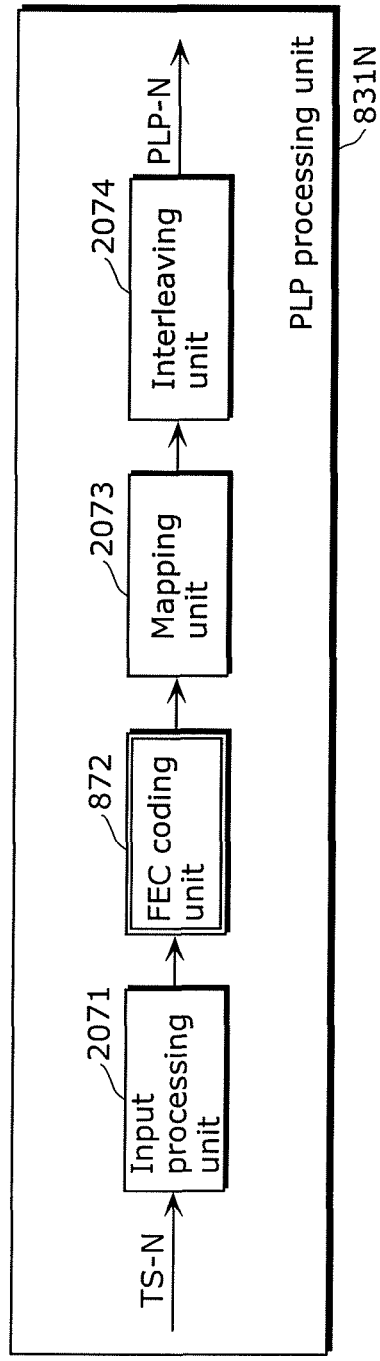
[FIG. 29]

FIG. 29 is a diagram showing a configuration of a PLP processing unit 831N.

Each of the PLP processing units shown in FIG. 27 has the same configuration as the PLP processing unit 831N.

As compared with the conventional PLP processing unit 2031 shown in FIG. 3, the FEC coding unit in FIG. 3 is replaced by an FEC coding unit 872.

The FEC coding unit 872 of the PLP processing unit 831N shown in FIG. 29 performs BCH coding, LDPC coding, or turbo coding, on the basis of the standard branch of the current PLP.

Figure 30:
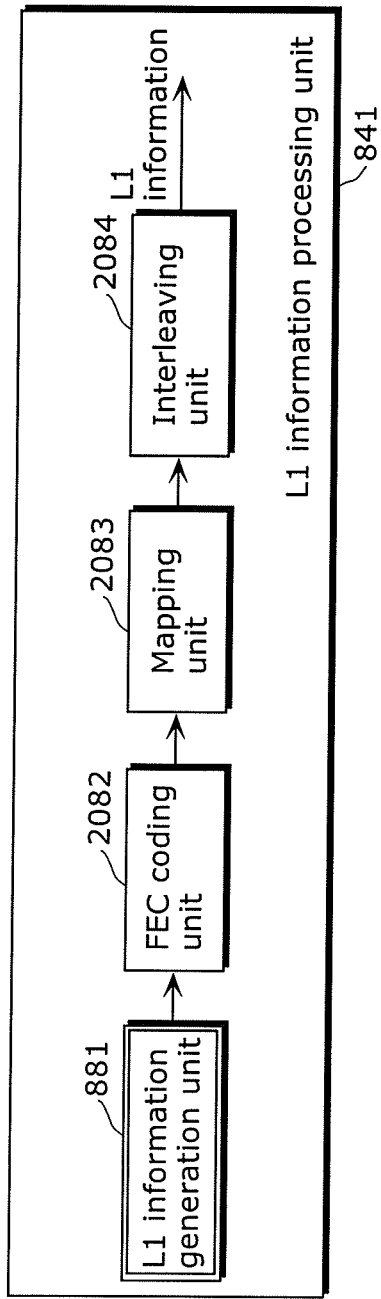
[FIG. 30]

FIG. 30 is a diagram showing a configuration of the L1information processing unit 841.

As compared with the conventional L1 information processing unit 2041 shown in FIG. 4, the L1 information generation unit in FIG. 4 is replaced by an L1 information generation unit 881.

The L1 information generation unit 881 of the L1 information processing unit 841 shown in FIG. 30 generates L1-pre information and L1-post information (see the information 2a1 shown in FIG. 1) such that PLP_RX_CLASS shown in FIG. 28C is included.

Alternatively, the L1-pre information and the L1-post information may be generated such that PLP_BRANCH shown in FIG. 28D is included.

Or, the L1-pre information and the L1-post information may be generated such that PLP_FEC_CODE shown in FIG. 28E is included.

When the L1-pre information and the L1-post information is generated, the transmission parameter related to the interleaving satisfies that the interleaved amount of each corresponding PLP of the receiver class-1a, -1b, and -2shown in FIG. 28B is smaller than or equal to the maximum interleaved amount shown in FIG. 28A.

For calculating the interleaved amount of the corresponding PLP, "PLP_NUM_BLOCKS_MAX" of the current PLP in L1-post (configurable) is used.

Other operations are the same as performed by the conventional transmitting apparatus 2000 shown in FIG. 2.

Figure 31:
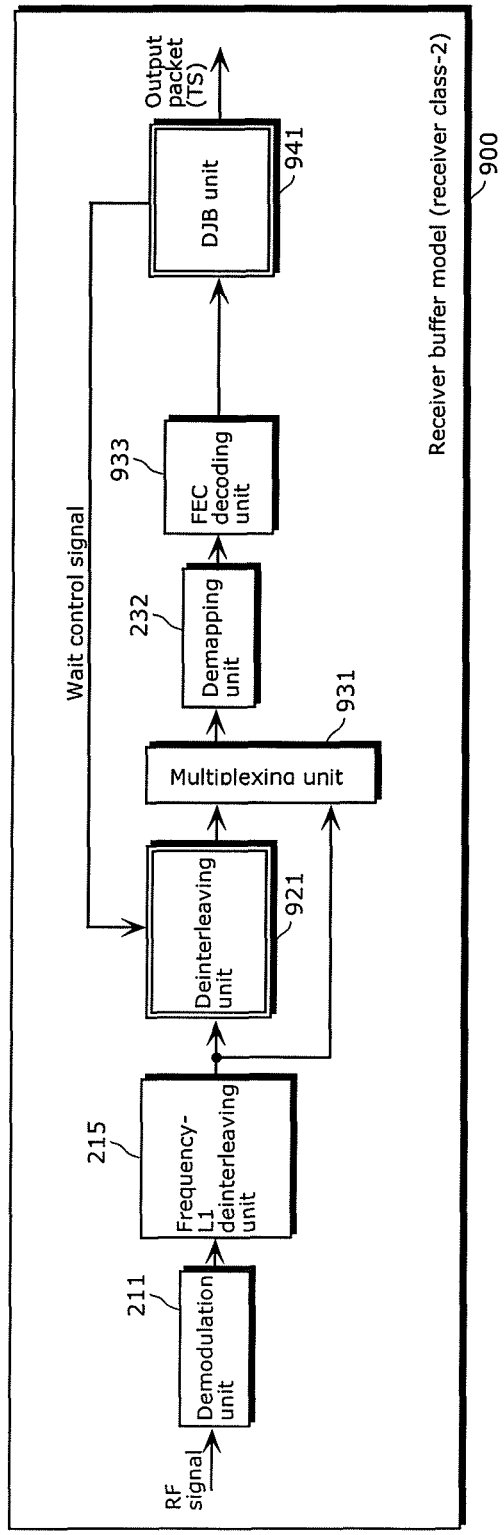
[FIG. 31]
Figure 32:
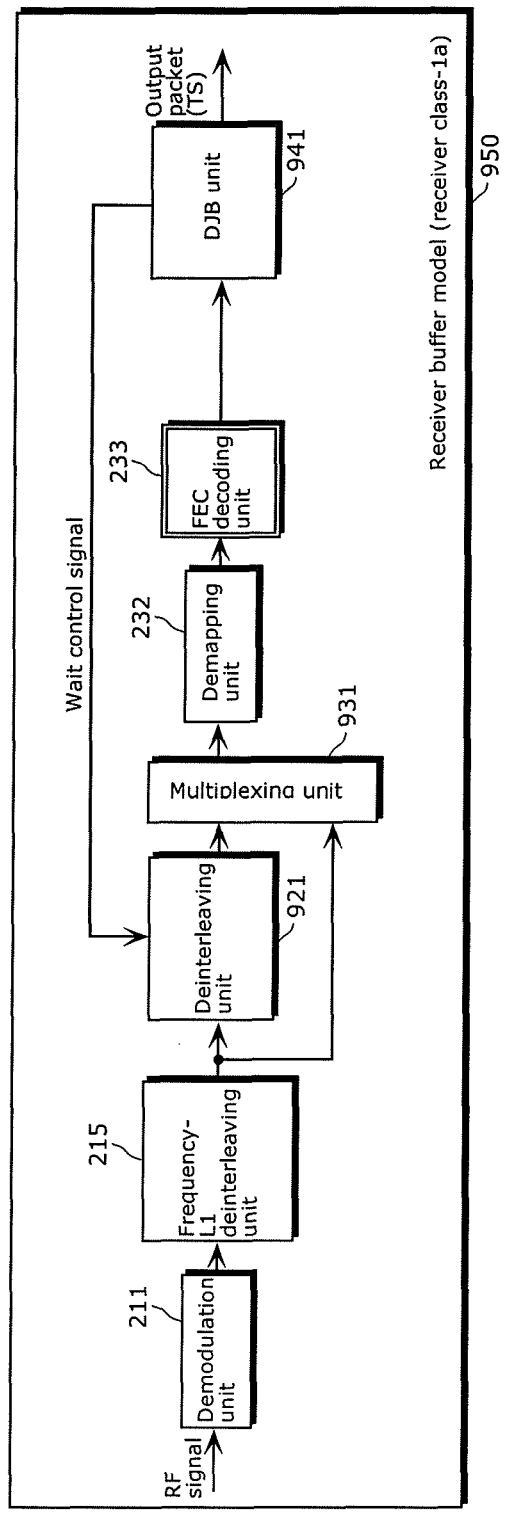
[FIG. 32]
Figure 33:
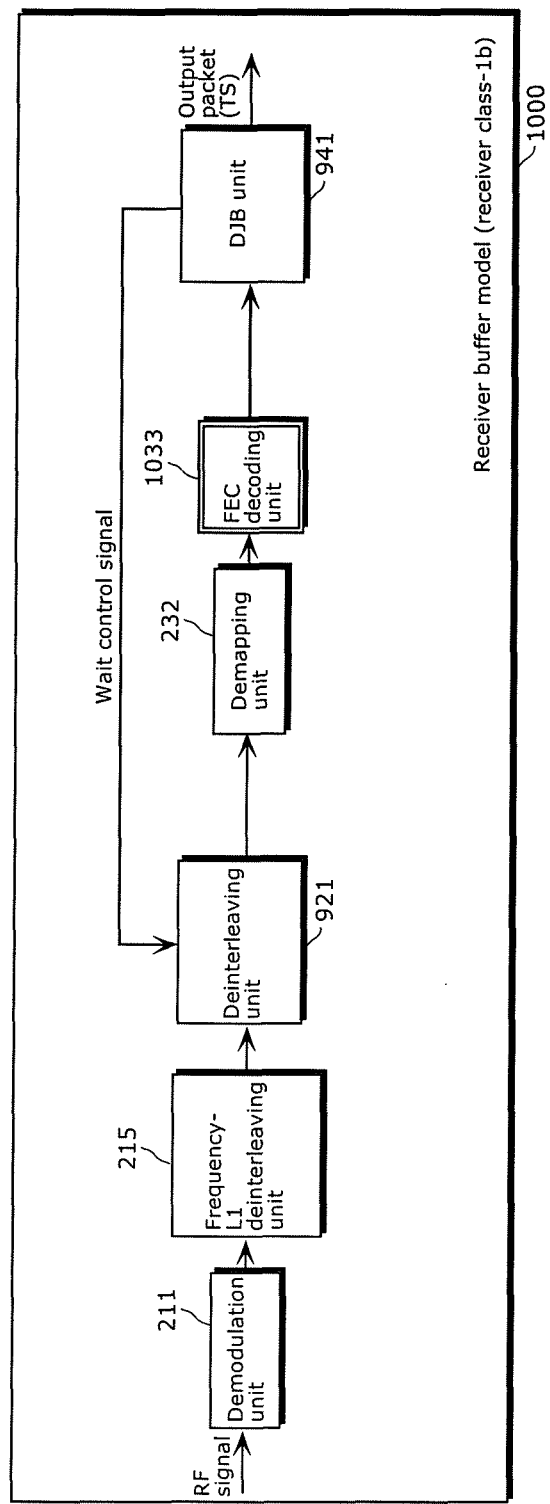
[FIG. 33]

FIGS. 31 to 33 are diagrams showing configurations of a receiver buffer model (in the receiver class-2) 900, a receiver buffer model (in the receiver class-1a) 950, and a receiver buffer model (in the receiver class-1b) 1000, respectively.

When inputting a transmission signal to these receiver buffer models, the transmitting apparatus 800 shown in FIG. 27 generates the transmission parameter related to interleaving and the ISSY information including BUFS such that a buffer overflow is prevented from occurring to the deinterleaving unit and that a buffer underflow is prevented from occurring to the MB unit.

For this purpose, these receiver buffer models are defined.

The receiver buffer model (in the receiver class-2) 900 shown in FIG. 31 is different from the receiver buffer model (in the receiver class-2) 200 shown in FIG. 9 in Embodiment 1 in that one deinterleaving unit 921 and one DM unit 941 are included.

Moreover, the multiplexing unit and the FEC decoding unit in FIG. 9 are replaced respectively by a multiplexing unit 931 and an FEC decoding unit 933 and the separation unit 234 is deleted, as shown in the present configuration.

In the receiver buffer model (in the receiver class-2) 900 shown in FIG. 31, the deinterleaved L1 information passes through the multiplexing unit 931. Then, the demapping unit 232 and the FEC decoding unit 933 decode the L1 information.

It should be noted that the FEC decoding unit 933 is capable of LDPC-BCH decoding and turbo decoding.

When the PLP (i.e., the PLP-1) of the selected program (i.e., the Program-1 of the TS-1) is identified, the PLP-1 is recognized as being received by the receiver class-2, based on PLP_RX_CLASS shown in FIG. 28C, PLP_BRANCH shown in FIG. 28D, or PLP_FEC_CODE shown in FIG. 28E.

The deinterleaving unit 921 extracts the cell of the PLP-1 and sorts the data in the reverse of the order in which sorting is performed in the interleaving at the transmitting side, on the basis of the decoded L1 information.

The maximum total amount of memory in the deinterleaving unit is $2^{19}$ cells as shown in FIG. 28A. The L1 information related to deinterleaving is indicated by, for example, PLP_NUM_BLOCKS and PLP_NUM_BLOCKS_MAX of the PLP-1.

The output from the deinterleaving unit passes through the multiplexing unit 931.

The FEC decoding unit 933 performs turbo decoding.

The DJB unit eliminates jitter on the basis of the ISSY information included in the baseband frame storing the decoded PLP data, and then outputs the TS.

The amount of the buffer capacity used in the de-jitter buffering process is 2 Mbits, as shown in FIG. 28A.

The buffer capacity of the PLP-1 is specified by a value of BUFS included in the ISSY information.

Moreover, in the de-jitter buffering process, while the remaining buffer capacity is smaller than one baseband frame, a "Wait" control signal to be transmitted to the deinterleaving unit 921 is set active so that output from the deinterleaving unit 921 is stopped.

Other operations are the same as performed by the receiver buffer model (in the receiver class-2) 200 shown in FIG. 9.

When the selected program is the Program-1 of the TS-2 and the corresponding PLP (i.e., the PLP-2) is identified, the PLP-2 is recognized as being received by the receiver class-2, based on PLP_RX_CLASS shown in FIG. 28C, PLP_BRANCH shown in FIG. 28D, or PLP_FEC_CODE shown in FIG. 28E.

A difference between the aforementioned case where the Program-1 of the TS-1 is selected and the process performed hereafter is that the FEC decoding unit 933 for the PLP-2 performs LDPC-BCH decoding.

As compared with the receiver buffer model (in the receiver class-2) 900 shown in FIG. 31, the receiver buffer model (in the receiver class-1a) 950 shown in FIG. 32 has the following configuration. That is, the FEC decoding unit in FIG. 31 is replaced by the FEC decoding unit 233 as shown in the present configuration.

It should be noted that the FEC decoding unit 233 is capable of only LDPC-BCH decoding.

When the PLP (i.e., the PLP-2) of the selected program (such as the Program-1 of the TS-2) is identified, the same operations as performed by the receiver buffer model (in the receiver class-2) 900 are performed.

Although the FEC decoding unit is replaced by the FEC decoding unit 233, the PLP-2 can be decoded by the FEC decoding unit 233 since BCH-LDPC coding has been performed on the PLP-2.

When the selected program is the Program-1 of the TS-1 and the corresponding PLP (i.e., the PLP-1) is identified, the PLP-1 is recognized as not being received by the receiver class-1a, based on PLP_RX_CLASS shown in FIG. 28C, PLP_BRANCH shown in FIG. 28D, or PLP_FEC_CODE shown in FIG. 28E.

As compared with the receiver buffer model (in the receiver class-2) 900 shown in FIG. 31, the receiver buffer model (in the receiver class-1b) 1000 shown in FIG. 33 has the following configuration. That is, the FEC decoding unit in FIG. 31 is replaced by an FEC decoding unit 1033 as shown in the present configuration.

It should be noted that the FEC decoding unit 1033 is capable of only LDPC-BCH decoding.

When the PLP (i.e., the PLP-1) of the selected program (such as the Program-1 of the TS-1) is identified, the same operations as performed by the receiver buffer model (in the receiver class-2) 900 are performed.

Although the FEC decoding unit is replaced by the FEC decoding unit 1033, the PLP-1 can be decoded by the FEC decoding unit 1033 since turbo coding has been performed on the PLP-1.

When the selected program is the Program-1 of the TS-2 and the corresponding PLP (i.e., the PLP-2) is identified, the PLP-2 is recognized as not being received by the receiver class-1b, based on PLP_RX_CLASS shown in FIG. 28C, PLP_BRANCH shown in FIG. 28D, or PLP_FEC_CODE shown in FIG. 28E.

A receiving apparatus (in the receiver class-2) in Embodiment 5 is configured based on the receiver buffer model (in the receiver class-3) 900 shown in FIG. 31.

According to the definition of the receiver class-2 shown in FIG. 28A, the receiving apparatus (in the receiver class-2) previously includes, in order to allow LDPC-BCH decoding and turbo decoding to be performed, the FEC decoding unit 933 capable of both LDPC-BCH decoding and turbo decoding.

Moreover, a capacity corresponding to $2^{19}$ cells or more is prepared as the amount of memory in the deinterleaving unit, and a capacity corresponding to 2 Mbits or more is prepared as the buffer capacity of the DJB unit.

It should be noted that an integrated circuit may be configured, as one chip, to include a part or whole of the receiving apparatus.

The receiving apparatus (in the receiver class-1a) in Embodiment 5 is configured based on the receiver buffer model (in the receiver class-1a) 950 shown in FIG. 32.

According to the definition of the receiver class-1a shown in FIG. 28A, the receiving apparatus (in the receiver class-1a) previously includes, in order to allow LDPC-BCH decoding to be performed, the FEC decoding unit 233 capable of LDPC-BCH decoding.

Moreover, a capacity corresponding to $2^{19}$ cells or more is prepared as the amount of memory in the deinterleaving unit, and a capacity corresponding to 2 Mbits or more is prepared as the buffer capacity of the DJB unit.

It should be noted that an integrated circuit may be configured, as one chip, to include a part or whole of the receiving apparatus.

The receiving apparatus (in the receiver class-1b) in Embodiment 5 is configured based on the receiver buffer model (in the receiver class-1b) 1000 shown in FIG. 33.

According to the definition of the receiver class-1b shown in FIG. 28A, the receiving apparatus (in the receiver class-1b) previously includes, in order to allow turbo decoding to be performed, the FEC decoding unit 1033 capable of turbo decoding.

Moreover, a capacity corresponding to $2^{19}$ cells or more is prepared as the amount of memory in the deinterleaving unit, and a capacity corresponding to 2 Mbits or more is prepared as the buffer capacity of the DJB unit.

It should be noted that an integrated circuit may be configured, as one chip, to include a part or whole of the receiving apparatus.

Accordingly, the configuration described thus far provides, in the case where the standard has branches and the FEC coding method is different for each of the branches in a transmission system having a PLP structure: a transmitting apparatus which defines a plurality of receiver classes; and a receiver buffer model which controls such a transmitting apparatus, a receiving apparatus, an integrated circuit, and a program.

[Embodiment 6]

Figure 34:
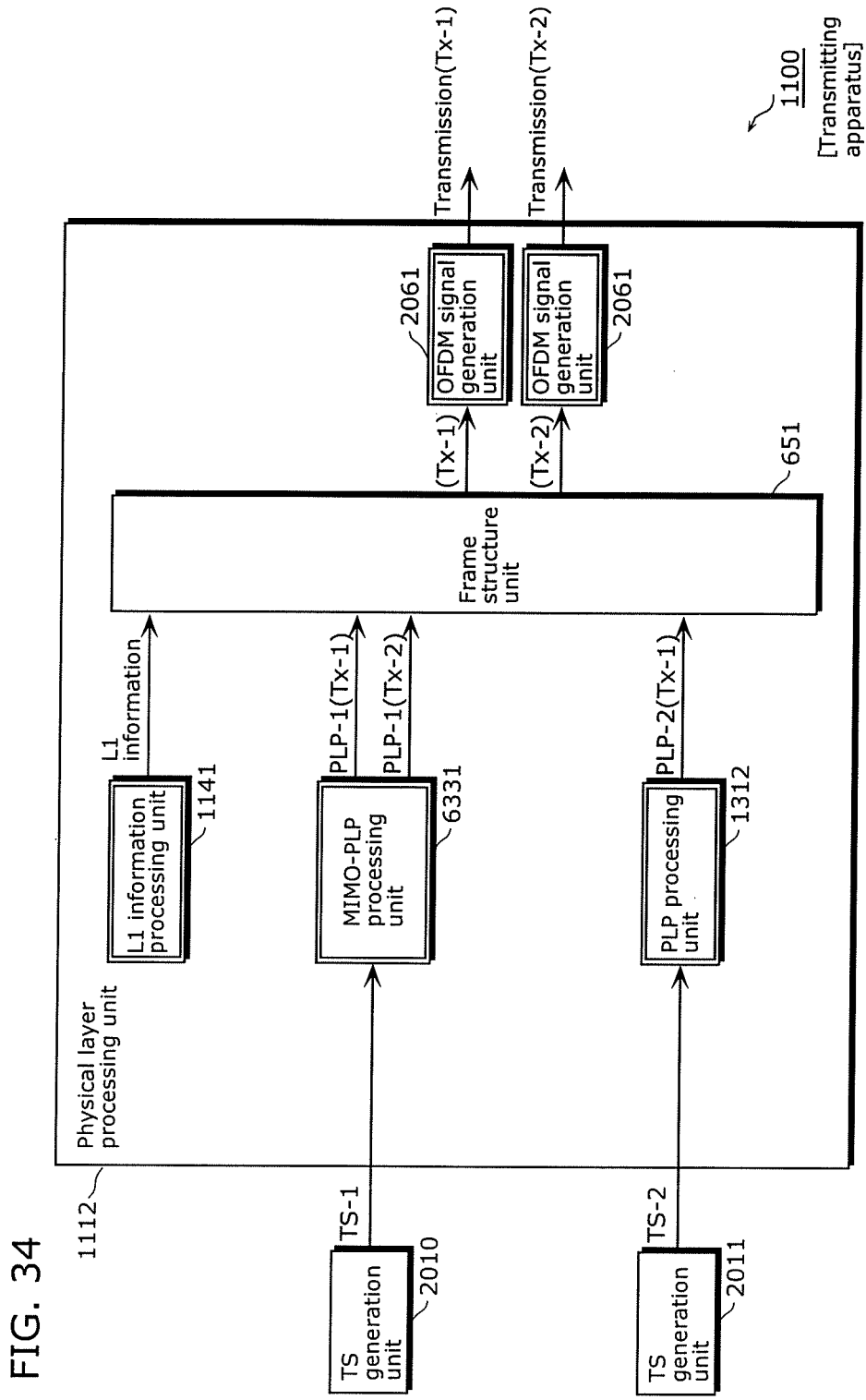
[FIG. 34]

FIG. 34 is a diagram showing a configuration of a transmitting apparatus 1100 in Embodiment 6 according to the present invention.

Components identical to those of the conventional transmitting apparatus and the transmitting apparatuses in Embodiments 1 to 5 are assigned the same reference signs as used in the conventional transmitting apparatus and the transmitting apparatuses in Embodiments 1 to 5. Thus, detailed explanations regarding these components are not repeated.

Embodiment 6 describes the case where the standard updates the version and where a new version includes a process that is not included in the old version.

As one example, the following describes the case where MIMO transmission is added to a version 2.

As compared with the transmitting apparatus 800 shown in FIG. 27 in Embodiment 5, the transmitting apparatus 1100 shown in FIG. 34 has the following configuration. That is, the L1 information processing unit and the frame structure unit in the physical layer processing unit in FIG. 27 are replaced respectively by an L1information processing unit 1141 and the frame structure unit 651 of a physical layer processing unit 1112. Moreover, the PLP processing unit in FIG. 27 is replaced by an MIMO-PLP processing unit 6331, and the OFDM signal generation unit 2061 is provided for each of two transmitting antennas.

For each of the PLPs to be transmitted, a corresponding one of a PLP processing unit 1312 and the MIMO PLP processing unit 6331 is provided.

FIG. 35A is a diagram showing definitions of receiver classes.

A receiver class-2 corresponds to both the versions 1 and 2, and the minimum number of receiving antennas is 2. Moreover, the receiver class-2 needs to perform MIMO decoding.

Furthermore, the maximum interleaved total amount is defined as $2^{20}$ cells, and the maximum DJB total capacity is defined as 2 Mbits On the other hand, a receiver class-1 is defined as corresponding only to the version 1. Thus, the minimum number of receiving antenna can be reduced to 1, and MIMO decoding is not required.

FIG. 35B is a diagram showing: a corresponding PLP for each of programs included in a TS; a corresponding PLP for each of receiver class-1 and -2; a corresponding one of SISO and MISO transmissions; and a corresponding standard version.

FIG. 35C is a diagram showing L1 information created in a PLP loop in L1-post (configurable).

For each of the PLPs, PLP_RX_CLASS is created.

Here, PLP_RX_CLASS indicates a receiver class that receives the current PLP. A value "0" represents the receiver class-1 and -2 (corresponding to the SISO transmission in the present example). A value "1" represents the receiver class-2 (corresponding to the MIMO transmission in the present example).

This identifies the PLP (i.e., the PLP-1) corresponding to the program (such as the Program-1 in the TS-1) selected by the receiver. Thus, whether or not the receiver class-1 and -2are to receive this PLP can be determined.

FIG. 35D is a diagram showing another example of the L1 information to be created.

As shown in FIG. 35D, "PLP_VERSION" may be created for each of the PLPs.

Here, PLP_VERSION indicates a standard version of the current PLP. A value "0" represents the version 1 (corresponding to the SISO transmission in the present example). A value "1" represents the version 2 (corresponding to the MIMO transmission in the present example).

This identifies the PLP (i.e., the PLP-1) corresponding to the program (such as the Program-1 in the TS-1) selected by the receiver. Thus, whether or not the receiver class-1 and -2are to receive this PLP can be determined.

FIG. 35E is a diagram showing another example of the L1information to be created.

As shown in FIG. 35E, "PLP_MIMO_SISO" may be created for each of the PLPs.

Here, as PLP_MIMO_SISO, a value "0" represents the SISO transmission (corresponding to the standard version 1 in the present example). Moreover, a value "1" represents the MIMO transmission (corresponding to the standard version 2 in the present example).

This identifies the PLP (i.e., the PLP-1) corresponding to the program (such as the Program-1 in the TS-1) selected by the receiver. Thus, whether or not the receiver class-1 and -2are to receive this PLP can be determined.

Figure 36:
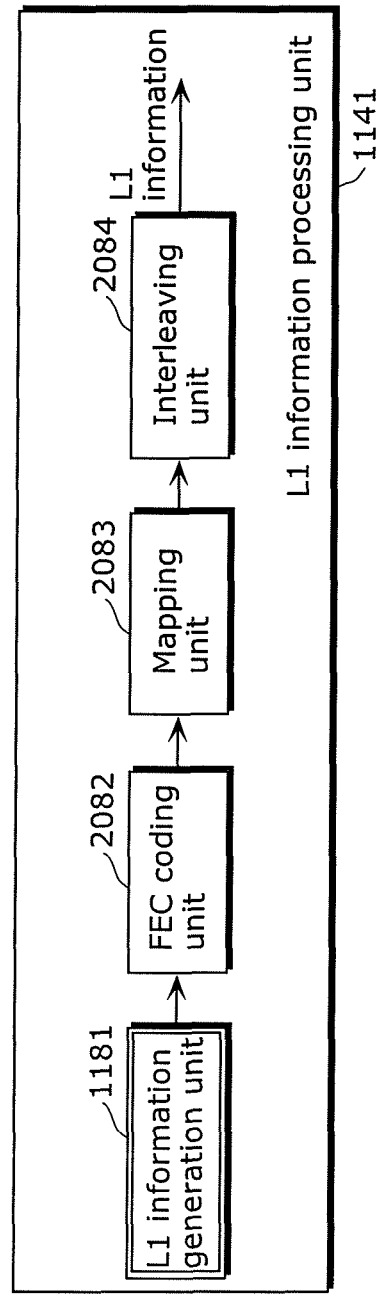
[FIG. 36]

FIG. 36 is a diagram showing a configuration of an L1information processing unit 1141.

As compared with the conventional L1 information processing unit 2041 shown in FIG. 4, the L1 information generation unit in FIG. 4 is replaced by an L1 information generation unit 1181 as shown in the present configuration.

The L1 information generation unit 1181 of the L1 information processing unit 1141 shown in FIG. 36 generates L1-pre information and L1-post information (see the information 2a1 shown in FIG. 1) such that PLP_RX_CLASS shown in FIG. 35C is included.

Alternatively, the L1-pre information and the L1-post information may be generated such that PLP_VERSION shown in FIG. 35D is included.

Or, the L1-pre information and the L1-post information may be generated such that PLP_MIMO_SISO shown in FIG. 35E is included.

Or, the L1-pre information and the L1-post information may be generated such that PLP_MIMO_SISO shown in FIG. 35E is included.

When the L1-pre information and the L1-post information is generated, the transmission parameter related to the interleaving satisfies that the interleaved amount of each corresponding PLP of the receiver class-1 and -2shown in FIG. 35B is smaller than or equal to the maximum interleaved amount shown in FIG. 35A.

For calculating the interleaved amount of the corresponding PLP, "PLP_NUM_BLOCKS_MAX" of the current PLP in L1-post (configurable) is used.

The MIMO-PLP processing unit 633 performs the same operation as shown in FIG. 23 in Embodiment 4.

The frame structure unit 651 generates transmission frames using: the mapping data for each of the PLPs outputted from the PLP processing unit 1312 and the MIMO-PLP processing unit 6331; and the mapping data of the L1 information outputted from the L1information processing unit 1141. Then, the frame structure unit 651 outputs the generated transmission frames.

The following data is allocated to the transmission frame for the transmitting antenna 1 (i.e., Tx-1): the mapping data of the PLP outputted from the PLP processing unit 1312 applying the SISO transmission; the mapping data of the PLP outputted from the MIMO-PLP processing unit 6331 applying the MIMO transmission; and the mapping data of the L1 information outputted from the L1 information processing unit 641.

To the transmission frame for the transmitting antenna 2 (i.e., a Tx-2), the mapping data of the PLP outputted from the MIMO-PLP processing unit 6331 applying the MIMO transmission is allocated.

As in Embodiments 1 to 3, the OFDM signal generation unit 2061 provided for each of the two transmitting antennas performs pilot signal insertion, IFFT, GI insertion, and P1 symbol insertion on the transmission frame structure outputted from the frame structure unit 651, and then outputs the transmission signal.

Figure 37:
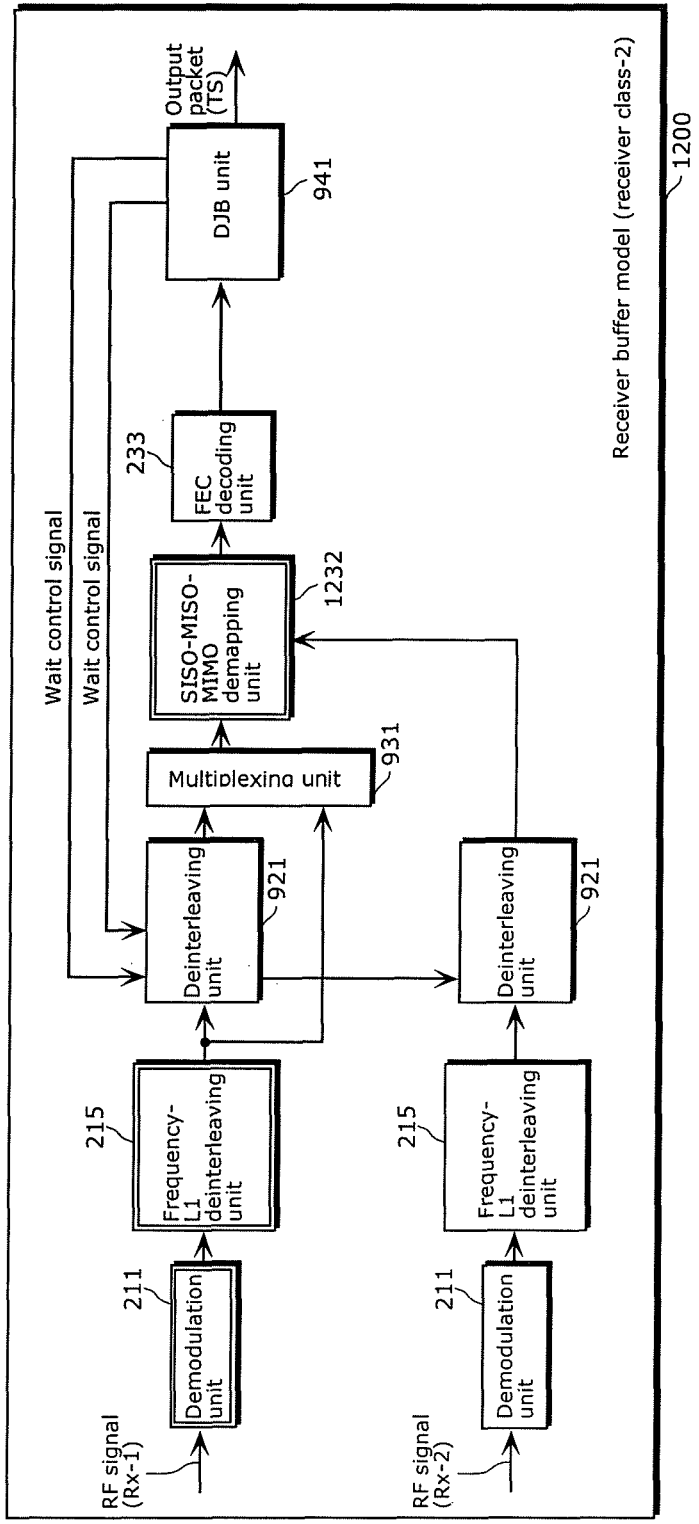
[FIG. 37]
Figure 38:
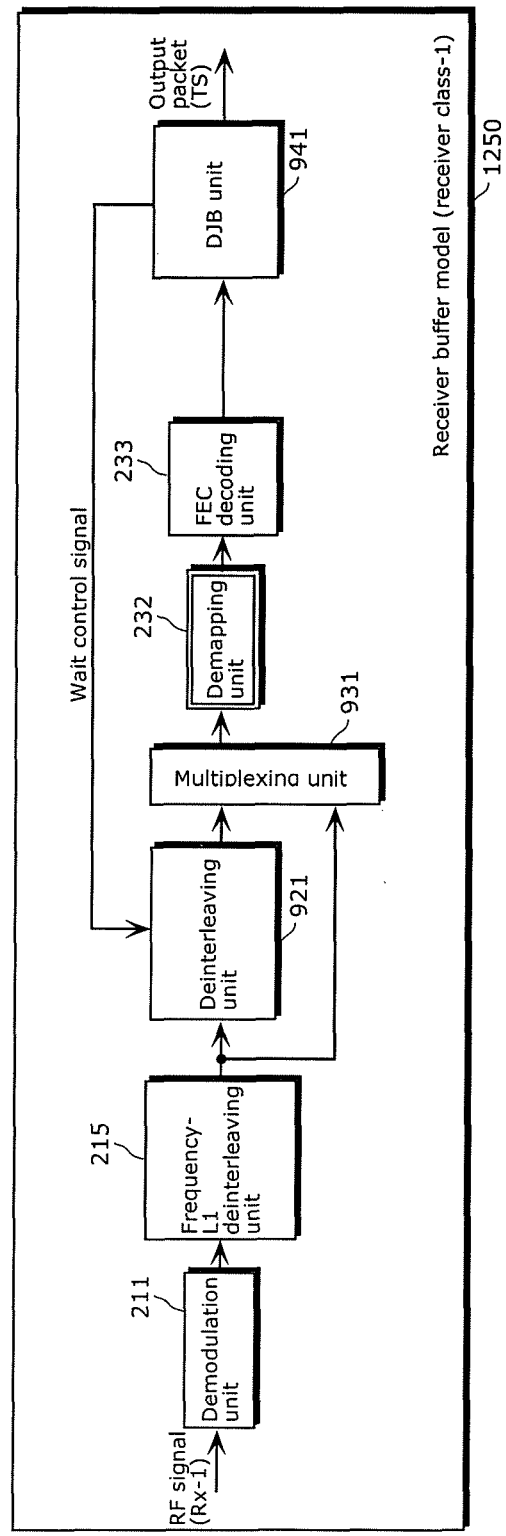
[FIG. 38]

FIGS. 37 and 38 are diagrams showing configurations of a receiver buffer model (in the receiver class-2) 1200 and a receiver buffer model (in the receiver class-1) 1250, respectively.

When inputting a transmission signal to these receiver buffer models, the transmitting apparatus 1100 shown in FIG. 34 generates the transmission parameter related to interleaving and the ISSY information including BUFS such that a buffer overflow is prevented from occurring to the deinterleaving unit and that a buffer underflow is prevented from occurring to the DJB unit.

For this purpose, these receiver buffer models are defined.

As compared with the receiver buffer model (in the receiver class-1a) 950 shown in FIG. 32 in Embodiment 4, the receiver buffer model (in the receiver class-2) 1200 shown in FIG. 37 has the following configuration. That is, the demodulation unit 211 corresponding to a receiving antenna 2 (i.e., an Rx-2), the frequency-L1 deinterleaving unit 215, and the deinterleaving unit 921 are added, and the demapping unit in FIG. 18 is replaced by a SISO-MIMO demapping unit 1232.

In the receiver buffer model (in the receiver class-2) 1200, the demodulation unit 211 and the frequency-L1 deinterleaving unit 215 both corresponding to an Rx-1 perform the same operation as performed by the receiver buffer model (in the receiver class-1a) 950 shown in FIG. 32 in Embodiment 4.

The deinterleaved L1 information passes through the multiplexing unit 931. Then, the SISO-MIMO demapping unit 1232 and the FEC decoding unit 233 perform the same operation as performed by the receiver buffer model (in the receiver class-1a) 950 in Embodiment 4.

As a result, the L1 information is decoded.

When the PLP (i.e., the PLP-1) of the selected program (such as the Program-1 of the TS-1) is identified, the PLP-1 is recognized as being received by the receiver class-2, based on PLP_RX_CLASS shown in FIG. 35C, PLP_VERSION shown in FIG. 35D, or PLP_MISO_SISO shown in FIG. 35E.

The deinterleaving unit 921 corresponding to the Rx-1 extracts the cell of the PLP-1 and sorts the data in the reverse of the order in which sorting is performed in the interleaving at the transmitting side, on the basis of the decoded L1 information.

The output from the deinterleaving unit passes through the multiplexing unit 931.

The demodulation unit 211 and the frequency-L1 deinterleaving unit 215 both corresponding to the RX-2 perform the same operation as the Rx-1.

The deinterleaving unit 921 for the Rx-2 extracts the cell of the PLP-1 and sorts the data in the reverse of the order in which sorting is performed in the interleaving at the transmitting side, on the basis of the decoded L1 information.

The maximum total amount of memory in these two deinterleaving units is $2^{20}$ cells.

The L1 information related to deinterleaving is indicated by, for example, PLP_NUM_BLOCKS and PLP_NUM_BLOCKS_MAX of the PLP-1.

The SISO-MIMO demapping unit 1232 performs MIMO demapping.

The FEC decoding unit 233 performs LDPC-BCH decoding.

The DJB unit eliminates jitter on the basis of the ISSY information included in the baseband frame storing the decoded PLP data, and then outputs the TS.

The amount of the buffer capacity used in the de-jitter buffering process is 2 Mbits, as shown in FIG. 35A.

The buffer capacity of the PLP-1 is specified by a value of BUFS included in the ISSY information.

Moreover, in the de-jitter buffering process, while the remaining buffer capacity is smaller than one baseband frame, "Wait" control signals to be transmitted to the two deinterleaving units 921 are set active so that outputs from the deinterleaving units 921 corresponding to the Rx-1 and -2 are both stopped.

When the selected program is the Program-1 of the TS-2 and the corresponding PLP (i.e., the PLP-2) is identified, the PLP-2 is recognized as being received by the receiver class-2, based on PLP_RX_CLASS shown in FIG. 35C, PLP_VERSION shown in FIG. 35D, or PLP_MIMO_SISO shown in FIG. 35E.

A difference between the aforementioned case where the Program-1 of the TS-1 is selected and the process performed hereafter is that: the process performed for the Rx-2 is not needed; and the SISO-MISO demapping unit 1232 corresponding to the PLP-2 performs demapping as with the receiver buffer model (in the receiver class-1a) 950 in Embodiment 4.

As compared with the receiver buffer model (in the receiver class-2) 1200 shown in FIG. 37, the receiver buffer model (in the receiver class-1) 1250 shown in FIG. 38 has the following configuration. That is, the Rx-2 is deleted and the SISO-MISO-MIMO demapping unit in FIG. 37 is replaced by the demapping unit 232 as shown in the present configuration.

When the PLP (i.e., the PLP-2) of the selected program (such as the Program-1 of the TS-2) is identified, the same operations as performed by the receiver buffer model (in the receiver class-2) 1200 are performed.

Although the SISO-MISO-MIMO demapping unit is replaced by the demapping unit 232, the PLP-2 has been transmitted according to the SISO transmission and thus can be demapped by the demapping unit 232.

When the selected program is the Program-1 of the TS-1 and the corresponding PLP (i.e., the PLP-1) is identified, the PLP-1 is recognized as not being received by the receiver class-1, based on PLP_RX_CLASS shown in FIG. 35C, PLP_VERSION shown in FIG. 35D, or PLP_MIMO_SISO shown in FIG. 35E.

A receiving apparatus (in the receiver class-2) in Embodiment 6 is configured based on the receiver buffer model (in the receiver class-2) 1200 shown in FIG. 37.

According to the definition of the receiver class-2 shown in FIG. 35A, the receiving apparatus (in the receiver class-2) previously includes two antennas.

Moreover, in order to allow MIMO decoding and SISO decoding to be performed, the receiving apparatus (in the receiver class-2) previously includes the SISO-MIMO demapping unit 1232 capable of both MIMO decoding and SISO decoding.

Moreover, a capacity corresponding to $2^{20}$ cells or more is prepared as the amount of memory in the deinterleaving unit, and a capacity corresponding to 2 Mbits or more is prepared as the buffer capacity of the DJB unit.

It should be noted that an integrated circuit may be configured, as one chip, to include a part or whole of the receiving apparatus.

A receiving apparatus (in the receiver class-1) in Embodiment 6 is configured based on the receiver buffer model (in the receiver class-1) 1250 shown in FIG. 38. According to the definition of the receiver class-1 shown in FIG. 35A, the receiving apparatus (in the receiver class-1) previously includes, in order to allow SISO decoding to be performed, the demapping unit 232 capable of SISO decoding.

Moreover, a capacity corresponding to $2^{19}$ cells or more is prepared as the amount of memory in the deinterleaving unit, and a capacity corresponding to 2 Mbits or more is prepared as the buffer capacity of the DJB unit.

It should be noted that an integrated circuit may be configured, as one chip, to include a part or whole of the receiving apparatus.

Accordingly, the configuration described thus far provides, in the case where the standard updates the version and the MIMO transmission that is not included in the old version is added to the new version in a transmission system having a PLP structure: a transmitting apparatus which defines a plurality of receiver classes; and a receiver buffer model which controls such a transmitting apparatus, a receiving apparatus, an integrated circuit, and a program.

Embodiments 1 to 6 have been explained based on the DVB-T2 standard. However, it should be noted that the standard is not limited to this, and any PLP structure can be used as long as a transmission parameter can be independently set.

In Embodiments 1 to 6 described above, the number of TSs is two. However, the number is not limited to this.

Moreover, the number of programs included in the TS-1 is 2 and the number of programs included in the TS-2 is 1. However, the numbers are not limited to these.

Furthermore, in Embodiments 1 and 2, the service components are described as audio and video. However, the service components are not limited to these, and may be a data component for example.

In Embodiments 3 and 4, scalable coding is performed on video. However, scalable coding may also be performed on an audio component and a data component.

In Embodiments 1 and 2, the maximum interleaved total amounts of the receiver class-1 and -2 are defined as $(2^{17}+2^{15})$ cells and $(2^{19}+2^{15})$ cells, respectively. However, the maximum interleaved total amounts of the classes are not limited to these. Moreover, the maximum DJB total capacities of the receiver class-1 and -2 are defined as 2 Mbits and 1 Mbit, respectively. However, the maximum DJB total capacities of the classes are not limited to these.

In Embodiment 3, the maximum interleaved total amounts of the receiver class-1, -2 and -3 are defined as $(2^{17}+2^{15})$ cells, $(2^{18}+2^{15})$ cells, and $(2^{19}+2^{15})$ cells, respectively. However, the maximum interleaved total amounts of the classes are not limited to these.

The maximum DJB total capacities of the receiver class-1, -2 and -3 are defined as 2 Mbits, 1.5 Mbits, and 1 Mbit, respectively. However, the maximum DJB total capacities of the classes are not limited to these.

In Embodiment 4, the maximum interleaved total amounts of the receiver class-1, -2 and -3 are defined as $(2^{17}+2^{15})$ cells, $(2^{19}+2^{15})$ cells, and $(2^{20}+2^{15})$ cells, respectively. However, the maximum interleaved total amounts of the classes are not limited to these.

Moreover, the maximum DJB total capacities of the receiver class-1, -2 and -3 are defined as 2 Mbits, 1.5 Mbits, and 1 Mbit, respectively. However, the maximum DJB total capacities of the classes are not limited to these.

In Embodiment 5, the maximum interleaved total amount of the receiver class-1a, -1b, and -2 are defined as $2^{19}$ cells. However, the maximum interleaved total amount of the classes is not limited to this. Moreover, the maximum DJB total capacity of the receiver class-1a, -1b, and -2 are defined as 2 Mbits. However, the maximum DJB total capacity of the classes is not limited to this.

In Embodiment 6, the maximum interleaved total amount of the receiver class-1 and -2 are defined as $2^{19}$ cells. However, the maximum interleaved total amount of the classes is not limited to this. Moreover, the maximum DJB total capacity of the receiver class-1 and -2 are defined as 2 Mbits. However, the maximum DJB total capacity of the classes is not limited to this.

In Embodiment 2, the transmitting apparatus has the configuration where the two audio components of the two programs included in the TS-1 are transmitted using the same PLP. However, the configuration is not limited to this, and video components may be transmitted using the same PLP, for example. Moreover, components each included in a different TS may be transmitted using the same PLP.

In Embodiment 4, the transmitting apparatus has the configuration where: the audio component, the L2 information, and the L1 information are transmitted according to the SISO transmission; the video B component is transmitted according to the MISO transmission; and the video E component is transmitted according to the MIMO transmission. However, the configuration is not limited to these. One of the SISO, MISO, and MIMO transmissions may be selected based on a component type and on whether it is the L2 information or the L1 information.

Moreover, when SVC is not applied, one of the SISO, MISO, and MIMO transmissions may also be selected based on a component type and on whether it is the L2 information or the L1 information.

In Embodiment 5, the standard branch 1 adopts LDPC coding and the standard branch 2 adopts turbo coding. However, the coding methods are not limited to these.

Examples, besides the FEC coding method, that may be different for each of the standard branches include the code rate, the FEC code length, and the modulation level as long as the standard branch can be selected for each of the PLPs.

In Embodiment 6, the MIMO transmission that is not included in the standard version 1 is added to the standard version 2. However, an addition is not limited to this. Examples that may be added to the new version include time frequency slicing (TFS) as long as the standard version can be selected for each of the PLPs.

In Embodiments 1 to 4, a service component or L1 information is assigned to a corresponding one of the deinterleaving units and a corresponding one of the DJB units in the receiver buffer model and the receiving apparatus. However, the configuration is not limited to this.

Each of the deinterleaving units and each of the DJB units may process a different PLP to be received by the current receiver class.

[Embodiment 7]

Figure 39:
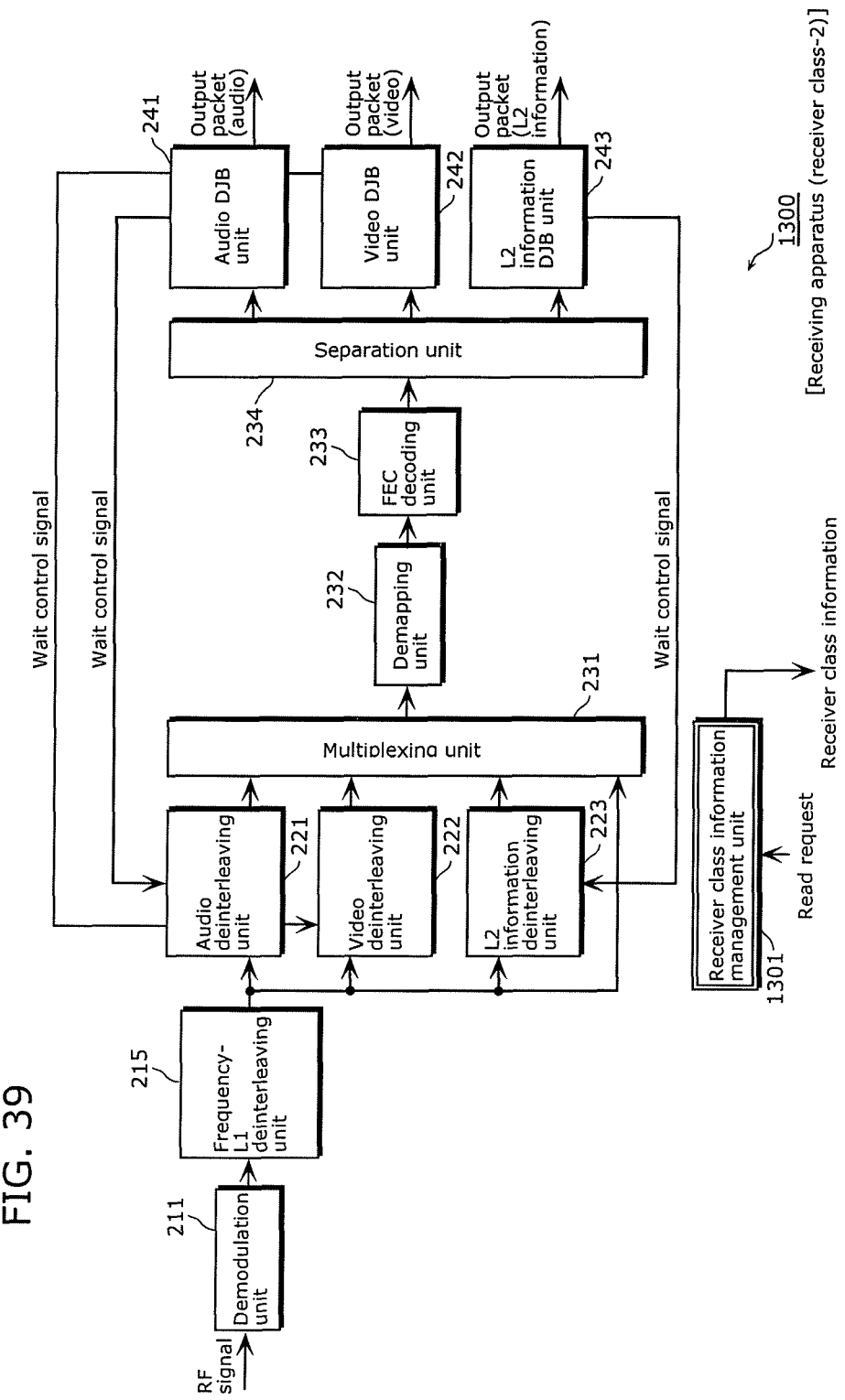
[FIG. 39]

FIG. 39 is a diagram showing a configuration of a receiving apparatus (of a receiver class-2) 1300 in Embodiment 7 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiments 1 and 2, the receiving apparatus (in the receiver class-2) is configured based on the receiver buffer model (in the receiver class-2) 200 shown in FIG. 9.

As compared with the configuration shown in FIG. 9, a receiver class information management unit 1301 is added in the receiving apparatus (in the receiver class-2) 1300 shown in FIG. 39.

The receiver class information management unit 1301 of the receiving apparatus (in the receiver class-2) 1300 shown in FIG. 39 stores receiver class information.

When receiving a read request, the receiver class information management unit 1301 outputs the receiver class information.

Examples of the receiver class information include information included in the definition of the receiver class-2 shown in FIG. 6A.

The receiving apparatus (in the receiver class-2) 1300 shown in FIG. 39 receives a transmission signal generated as described in Embodiment 1 or 2.

Figure 40:
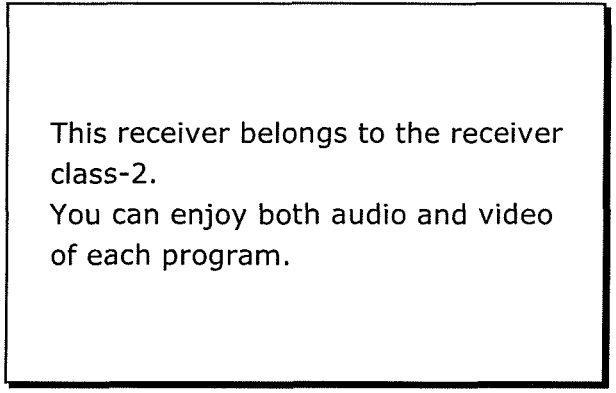
[FIG. 40]

FIG. 40 is a diagram showing an example where the output receiver class information is shown on a display that is not illustrated.

According to the definition of the receiver class-2 shown in FIG. 6A, information regarding the audio and video that can be received by the receiver classs-2 can also be displayed as shown in FIG. 40.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 8]

Figure 41:
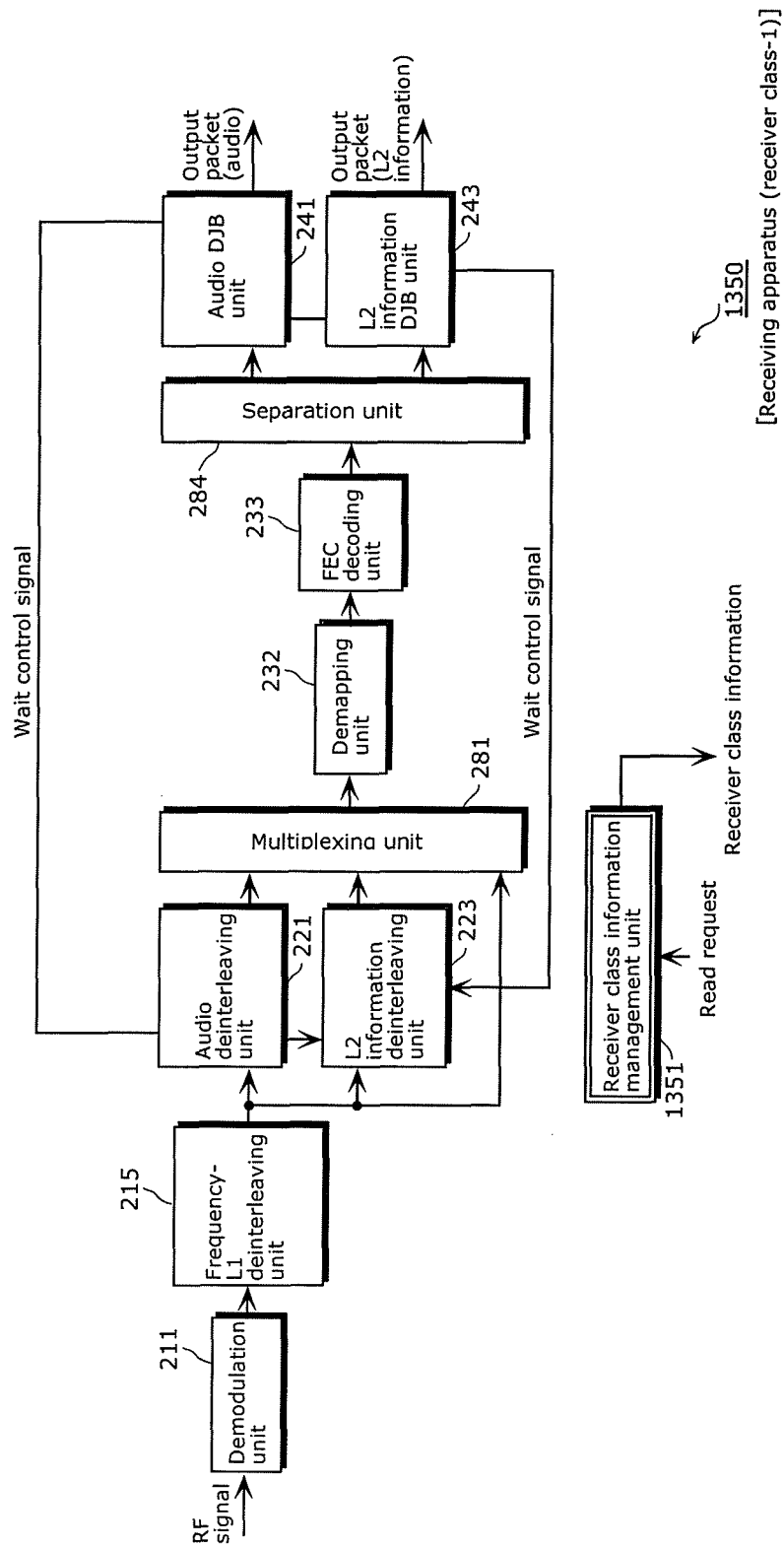
[FIG. 41]

FIG. 41 is a diagram showing a configuration of a receiving apparatus (of a receiver class-1) 1350 in Embodiment 8 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiments 1 to 4, the receiving apparatus (in the receiver class-1) is configured based on the receiver buffer model (in the receiver class-1) 250 shown in FIG. 10.

As compared with the configuration shown in FIG. 10, a receiver class information management unit 1351 is added in the receiving apparatus (in the receiver class-1) 1350 shown in FIG. 41.

The receiver class information management unit 1351 of the receiving apparatus (in the receiver class-1) 1350 shown in FIG. 41 stores receiver class information. When receiving a read request, the receiver class information management unit 1351 outputs the receiver class information. Examples of the receiver class information include information included in the definitions of the receiver class-1 shown in FIG. 6A, FIG. 16A, and FIG. 21A.

The receiving apparatus (in the receiver class-1) 1350 shown in FIG. 41 receives a transmission signal generated as described in any one of Embodiments 1 to 4.

Figure 42:
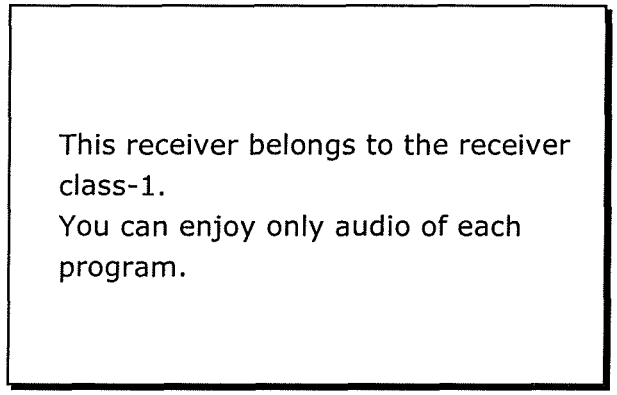
[FIG. 42]

FIG. 42 is a diagram showing an example where the output receiver class information is shown on a display that is not illustrated.

According to the definitions of the receiver class-1 shown in FIG. 6A, FIG. 16A, and FIG. 21A, information regarding the audio that can be received by the receiver class-1 can also be displayed as shown in FIG. 42.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 9]

Figure 43:
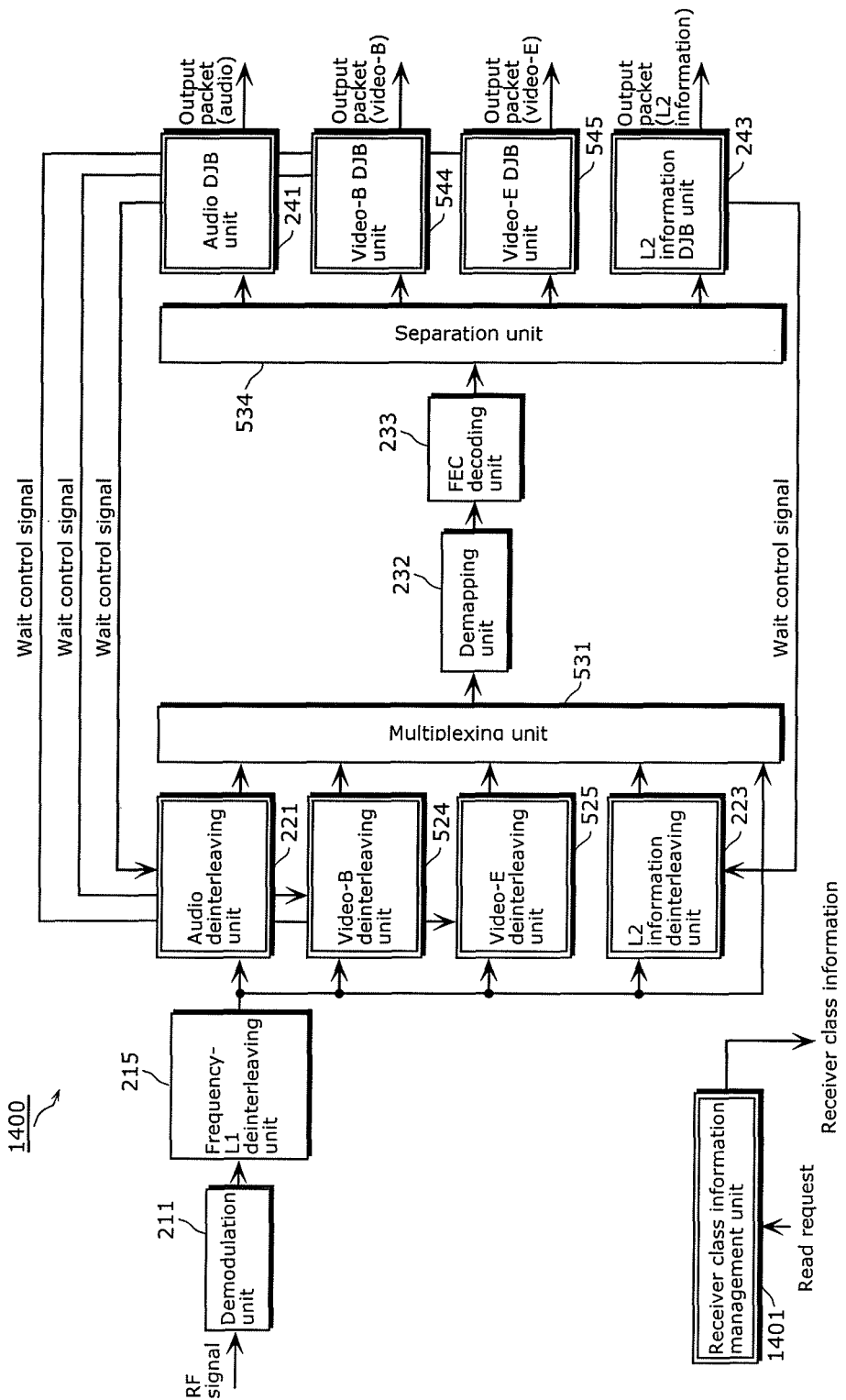
[FIG. 43]

FIG. 43 is a diagram showing a configuration of a receiving apparatus (of a receiver class-3) 1400 in Embodiment 9 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiment 3, the receiving apparatus (in the receiver class-3) is configured based on the receiver buffer model (in the receiver class-3) 500 shown in FIG. 18.

As compared with the configuration shown in FIG. 18, a receiver class information management unit 1401 is added in the receiving apparatus (in the receiver class-3) 1400 shown in FIG. 43.

The receiver class information management unit 1401 of the receiving apparatus (in the receiver class-3) 1400 shown in FIG. 43 stores receiver class information. When receiving a read request, the receiver class information management unit 1401 outputs the receiver class information. Examples of the receiver class information include information included in the definition of the receiver class-3 shown in FIG. 16A.

The receiving apparatus (in the receiver class-3) 1400 shown in FIG. 43 receives a transmission signal generated as described in Embodiment 3.

Figure 44:
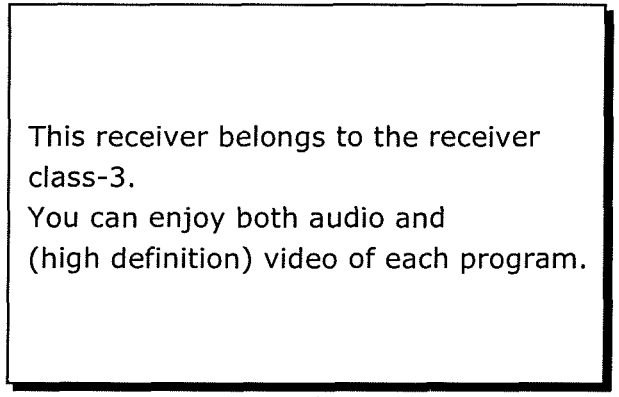
[FIG. 44]

FIG. 44 is a diagram showing an example where the output receiver class information is shown on a display that is not illustrated.

According to the definition of the receiver class-3 shown in FIG. 16A, information regarding the audio and video that can be received by the receiver class-3 can also be displayed as shown in FIG. 44.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 10]

Figure 45:
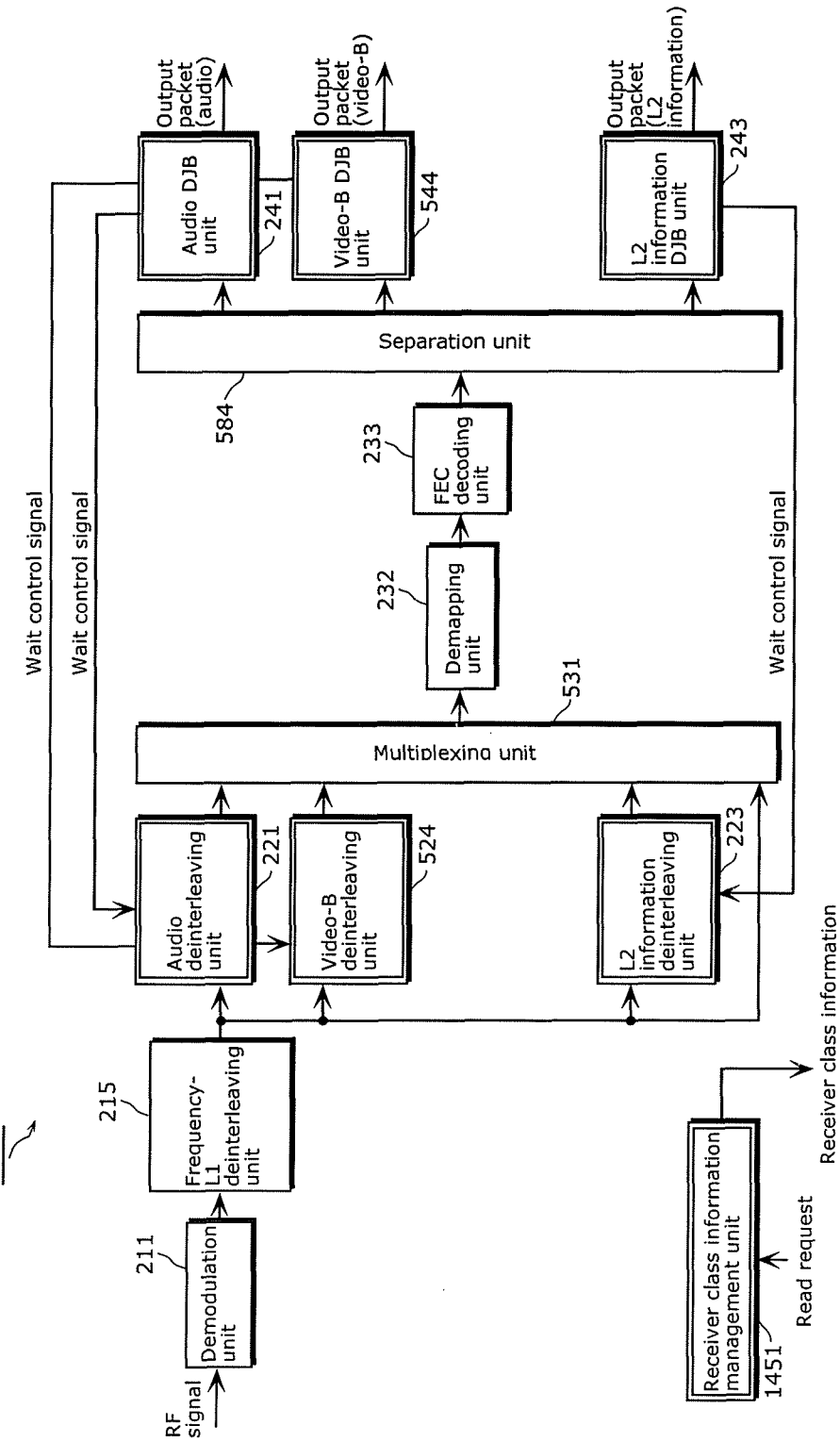
[FIG. 45]

FIG. 45 is a diagram showing a configuration of a receiving apparatus (of a receiver class-2) 1450 in Embodiment 10 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiment 3, the receiving apparatus (in the receiver class-2) is configured based on the receiver buffer model (in the receiver class-2) 550 shown in FIG. 19.

As compared with the configuration shown in FIG. 19, a receiver class information management unit 1451 is added in the receiving apparatus (in the receiver class-2) 1450 shown in FIG. 45.

The receiver class information management unit 1451 of the receiving apparatus (in the receiver class-2) 1450 shown in FIG. 45 stores receiver class information. When receiving a read request, the receiver class information management unit 1451 outputs the receiver class information. Examples of the receiver class information include information included in the definition of the receiver class-2 shown in FIG. 16A.

The receiving apparatus (in the receiver class-2) 1450 shown in FIG. 45 receives a transmission signal generated as described in Embodiment 3.

FIG. 46 is a diagram showing an example where the output receiver class information is shown on a display that is not illustrated.

According to the definition of the receiver class-2 shown in FIG. 16A, information regarding the audio and video that can be received by the receiver classs-2 can also be displayed as shown in FIG. 46.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 11]

Figure 47:
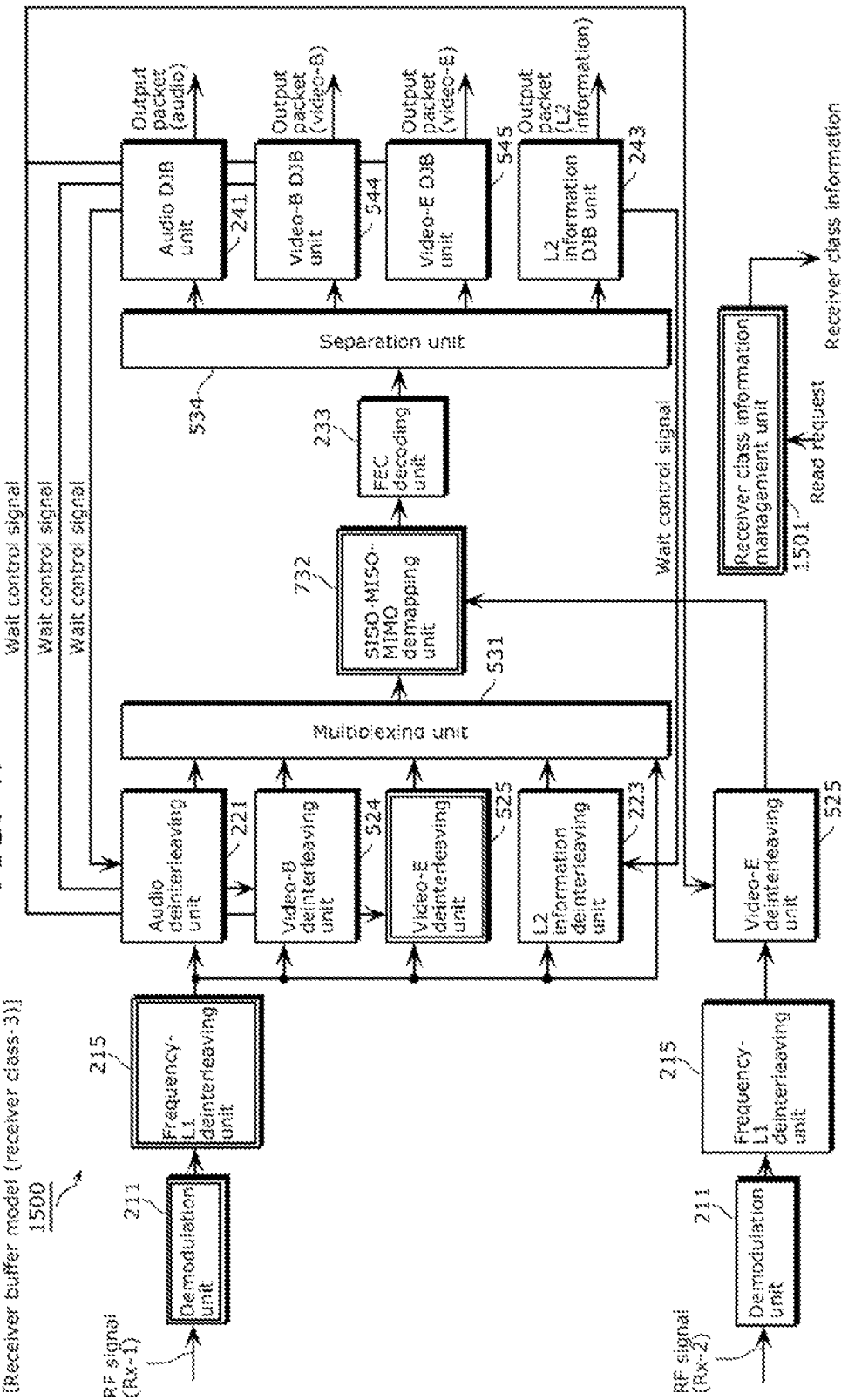
[FIG. 47]

FIG. 47 is a diagram showing a configuration of a receiving apparatus (of a receiver class-3) 1500 in Embodiment 11 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiment 4, the receiving apparatus (in the receiver class-3) is configured based on the receiver buffer model (in the receiver class-3) 700 shown in FIG. 25.

As compared with the configuration shown in FIG. 25, a receiver class information management unit 1501 is added in the receiving apparatus (in the receiver class-3) 1500 shown in FIG. 47.

The receiver class information management unit 1501 of the receiving apparatus (in the receiver class-3) 1500 shown in FIG. 47 stores receiver class information. When receiving a read request, the receiver class information management unit 1501 outputs the receiver class information. Examples of the receiver class information include information included in the definition of the receiver class-3 shown in FIG. 21A.

The receiving apparatus (in the receiver class-3) 1500 shown in FIG. 47 receives a transmission signal generated as described in Embodiment 4.

As in Embodiment 9, FIG. 44 is the diagram showing the example where the output receiver class information is shown on the display that is not illustrated.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 12]

Figure 48:
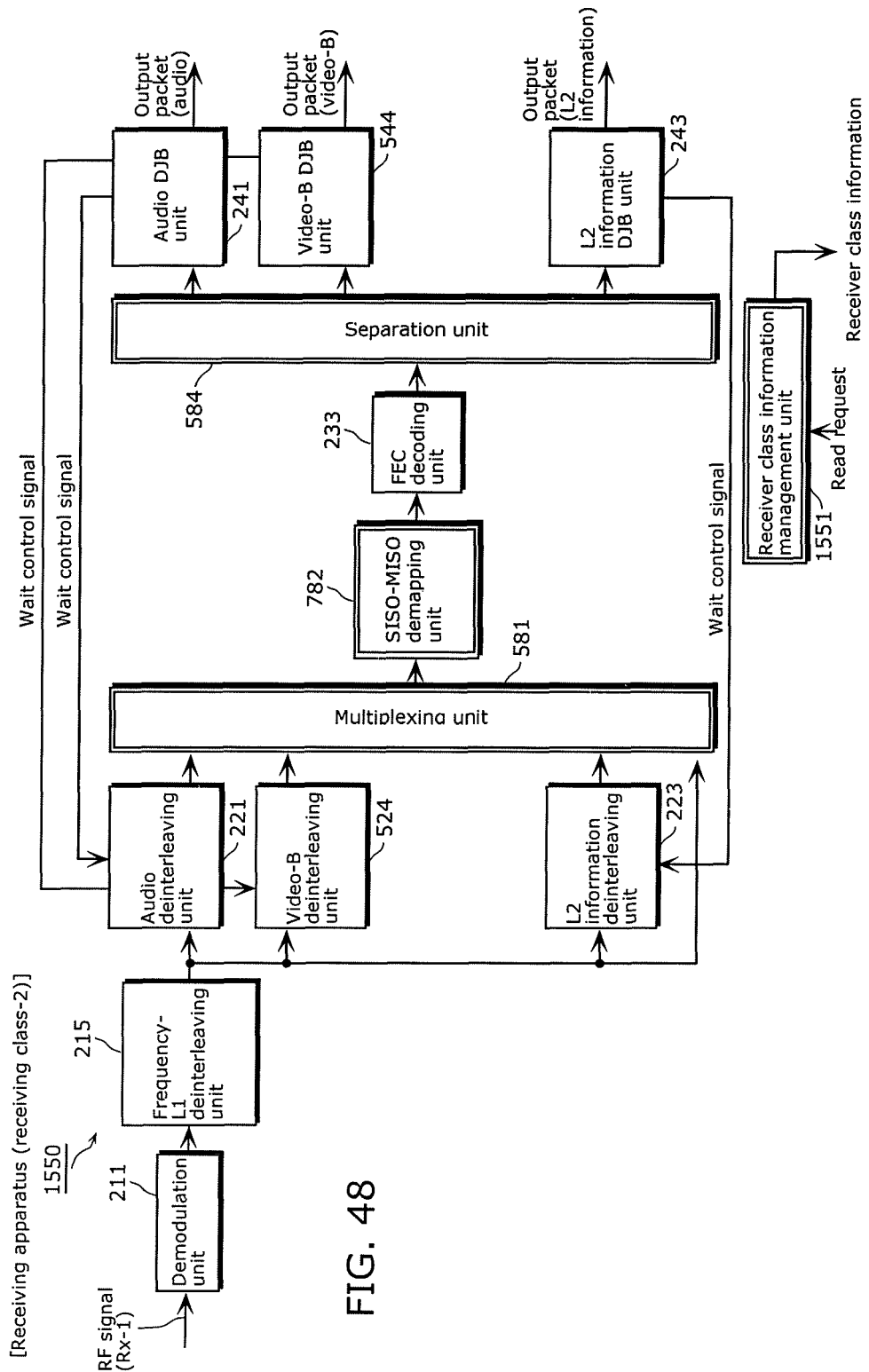
[FIG. 48]

FIG. 48 is a diagram showing a configuration of a receiving apparatus (of a receiver class-2) 1550 in Embodiment 12 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiment 4, the receiving apparatus (in the receiver class-2) is configured based on the receiver buffer model (in the receiver class-2) 750 shown in FIG. 26.

As compared with the configuration shown in FIG. 26, a receiver class information management unit 1551 is added in the receiving apparatus (in the receiver class-2) 1550 shown in FIG. 48.

The receiver class information management unit 1551 of the receiving apparatus (in the receiver class-2) 1550 shown in FIG. 48 stores receiver class information. When receiving a read request, the receiver class information management unit 1551 outputs the receiver class information. Examples of the receiver class information include information included in the definition of the receiver class-2 shown in FIG. 21A.

The receiving apparatus (in the receiver class-2) 1550 shown in FIG. 48 receives a transmission signal generated as described in Embodiment 4.

As in Embodiment 10, FIG. 46 is the diagram showing the example where the output receiver class information is shown on the display that is not illustrated.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 13]

Figure 49:
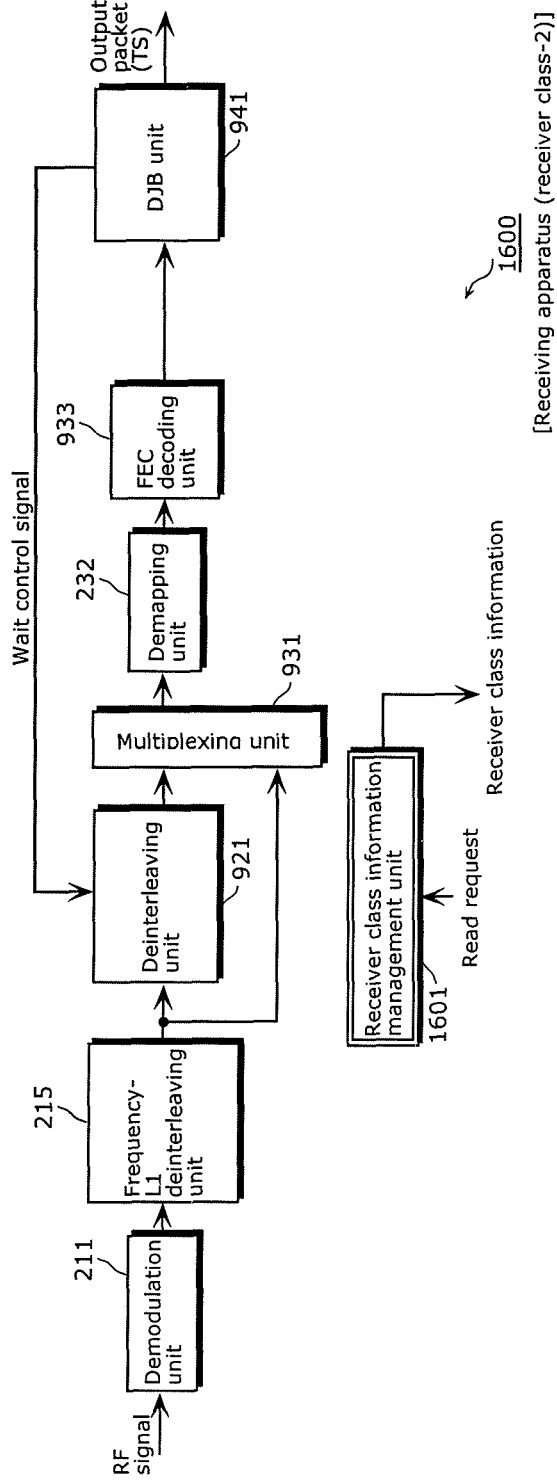
[FIG. 49]

FIG. 49 is a diagram showing a configuration of a receiving apparatus (of a receiver class-2) 1600 in Embodiment 13 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiment 5, the receiving apparatus (in the receiver class-2) is configured based on the receiver buffer model (in the receiver class-2) 900 shown in FIG. 31.

As compared with the configuration shown in FIG. 31, a receiver class information management unit 1601 is added in the receiving apparatus (in the receiver class-2) 1600 shown in FIG. 49.

The receiver class information management unit 1601 of the receiving apparatus (in the receiver class-2) 1600 shown in FIG. 49 stores receiver class information. When receiving a read request, the receiver class information management unit 1601 outputs the receiver class information. Examples of the receiver class information include information included in the definition of the receiver class-2 shown in FIG. 28A.

The receiving apparatus (in the receiver class-2) 1600 shown in FIG. 49 receives a transmission signal generated as described in Embodiment 5.

Figure 50:
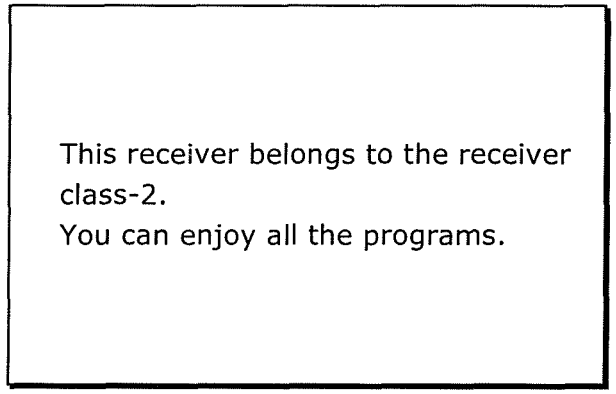
[FIG. 50]

FIG. 50 is a diagram showing an example where the output receiver class information is shown on a display that is not illustrated.

According to the definition of the receiver class-2 shown in FIG. 28A, information that the receiver class-2 is capable of receiving all the programs can also be displayed as shown in FIG. 50.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 14]

Figure 51:
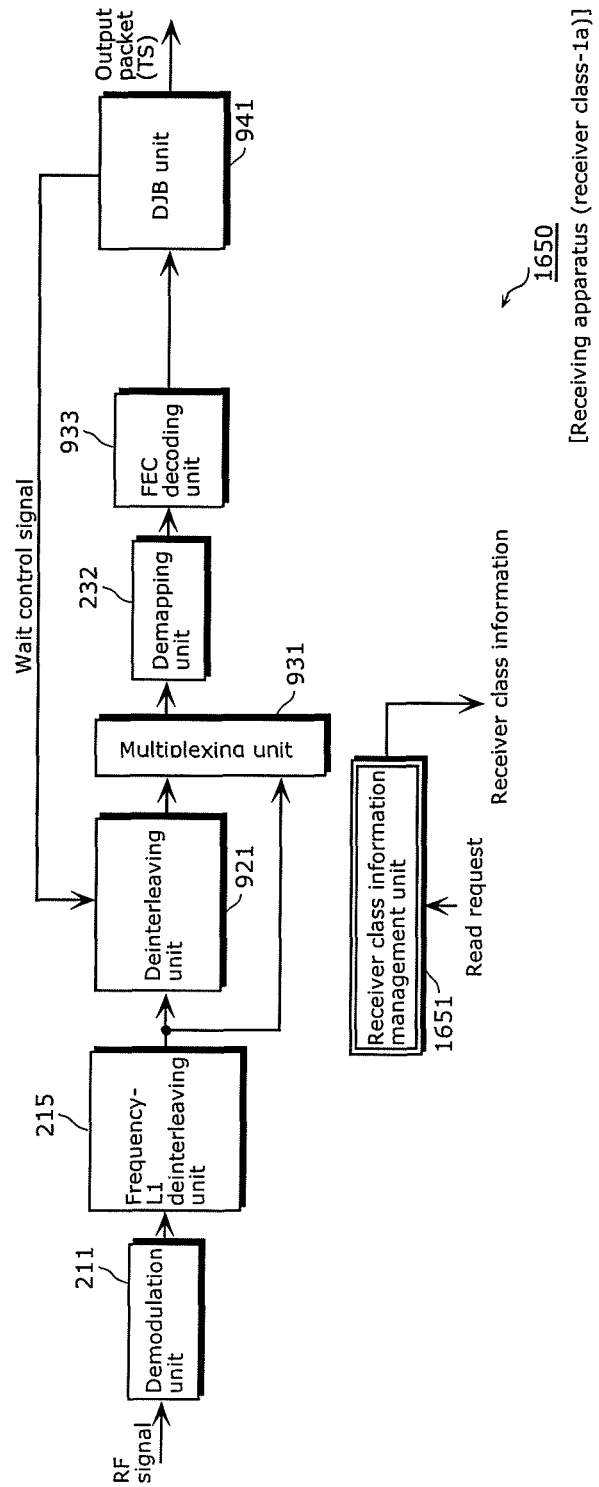
[FIG. 51]

FIG. 51 is a diagram showing a configuration of a receiving apparatus (of a receiver class-1a) 1650 in Embodiment 14 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiment 5, the receiving apparatus (in the receiver class-1a) is configured based on the receiver buffer model (in the receiver class-1a) 950 shown in FIG. 32.

As compared with the configuration shown in FIG. 32, a receiver class information management unit 1651 is added in the receiving apparatus (in the receiver class-1a) 1650 shown in FIG. 51.

The receiver class information management unit 1651 of the receiving apparatus (in the receiver class-1a) 1650 shown in FIG. 51 stores receiver class information. When receiving a read request, the receiver class information management unit 1651 outputs the receiver class information. Examples of the receiver class information include information included in the definition of the receiver class-1a shown in FIG. 28A.

The receiving apparatus (in the receiver class-1a) 1650 shown in FIG. 51 receives a transmission signal generated as described in Embodiment 5.

Figure 52:
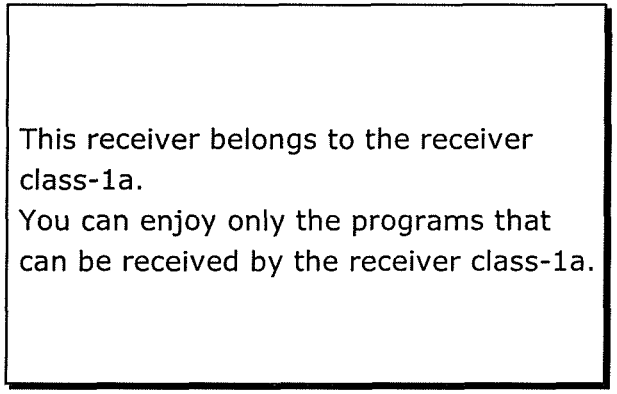
[FIG. 52]

FIG. 52 is a diagram showing an example where the output receiver class information is shown on a display that is not illustrated.

According to the definition of the receiver class-1a shown in FIG. 28A, information that the receiver class-1a is capable of receiving some of the programs can also be displayed as shown in FIG. 52.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 15]

Figure 53:
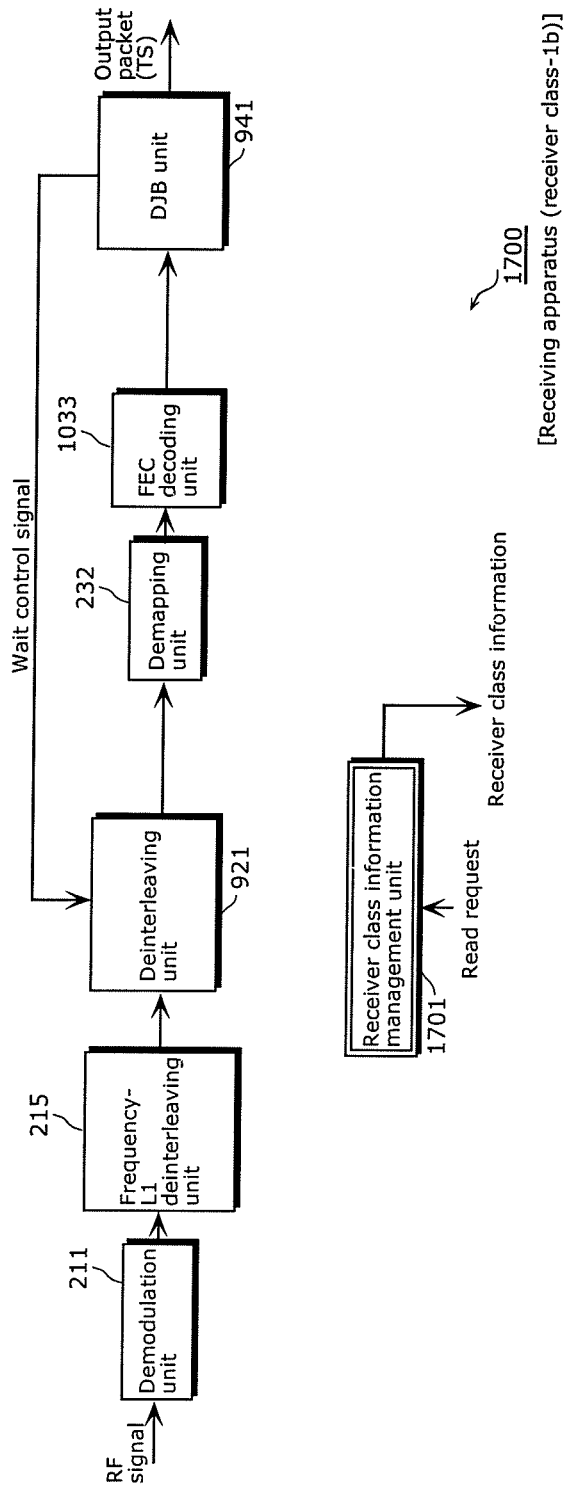
[FIG. 53]

FIG. 53 is a diagram showing a configuration of a receiving apparatus (of a receiver class-1b) 1700 in Embodiment 15 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiment 5, the receiving apparatus (in the receiver class-1b) is configured based on the receiver buffer model (in the receiver class-1a) 1000 shown in FIG. 33.

As compared with the configuration shown in FIG. 33, a receiver class information management unit 1701 is added in the receiving apparatus (in the receiver class-1b) 1700 shown in FIG. 53.

The receiver class information management unit 1701 of the receiving apparatus (in the receiver class-1b) 1700 shown in FIG. 53 stores receiver class information. When receiving a read request, the receiver class information management unit 1701 outputs the receiver class information. Examples of the receiver class information include information included in the definition of the receiver class-1b shown in FIG. 28A. The receiving apparatus (in the receiver class-1b) 1700 shown in FIG. 51 receives a transmission signal generated as described in Embodiment 5.

FIG. 54 is a diagram showing an example where the output receiver class information is shown on a display that is not illustrated.

According to the definition of the receiver class-1b shown in FIG. 28A, information that the receiver class-1b is capable of receiving some of the programs can also be displayed as shown in FIG. 52.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 16]

Figure 55:
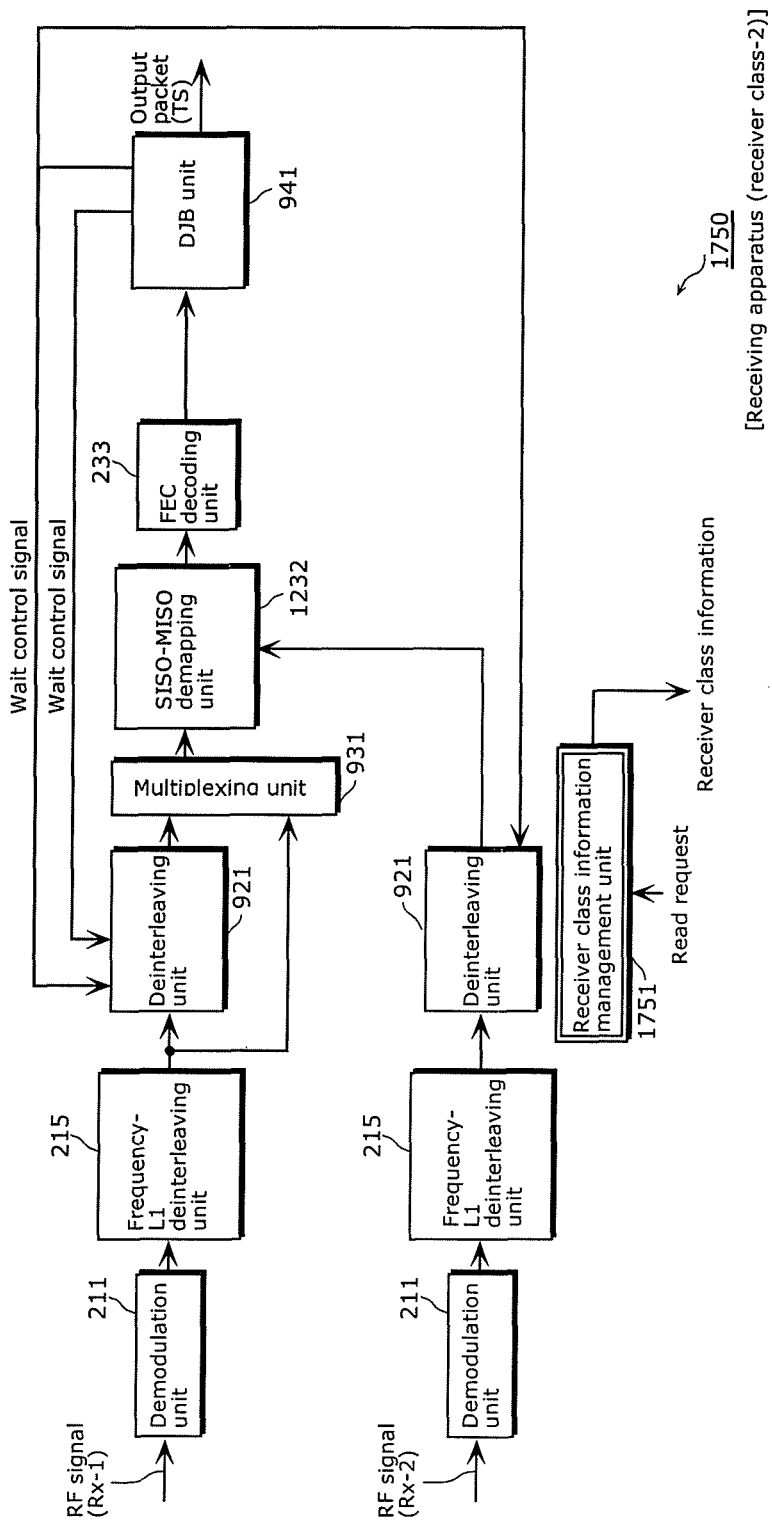
[FIG. 55]

FIG. 55 is a diagram showing a configuration of a receiving apparatus (of a receiver class-2) 1750 in Embodiment 16 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiment 6, the receiving apparatus (in the receiver class-2) is configured based on the receiver buffer model (in the receiver class-2) 1200 shown in FIG. 37.

As compared with the configuration shown in FIG. 37, a receiver class information management unit 1751 is added in the receiving apparatus (in the receiver class-2) 1750 shown in FIG. 55.

The receiver class information management unit 1751 of the receiving apparatus (in the receiver class-2) 1750 shown in FIG. 55 stores receiver class information. When receiving a read request, the receiver class information management unit 1751 outputs the receiver class information. Examples of the receiver class information include information included in the definition of the receiver class-2 shown in FIG. 35A. The receiving apparatus (in the receiver class-2) 1750 shown in FIG. 55 receives a transmission signal generated as described in Embodiment 6.

As in Embodiment 13, FIG. 50 is the diagram showing the example where the output receiver class information is shown on the display that is not illustrated.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 17]

Figure 56:
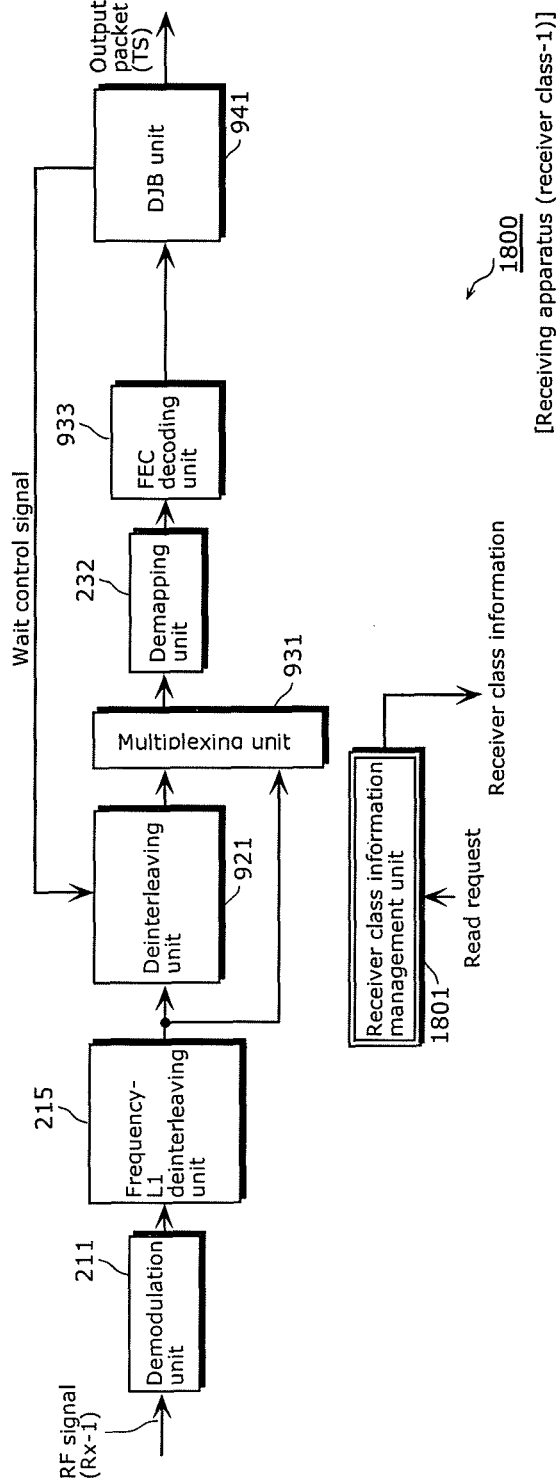
[FIG. 56]

FIG. 56 is a diagram showing a configuration of a receiving apparatus (of a receiver class-1) 1800 in Embodiment 17 according to the present invention.

Components identical to those of the receiving apparatuses in Embodiments 1 to 6 are assigned the same reference signs as used in the receiving apparatuses in Embodiments 1 to 6. Thus, explanations regarding these components are not repeated.

In Embodiment 6, the receiving apparatus (in the receiver class-1) is configured based on the receiver buffer model (in the receiver class-1) 1250 shown in FIG. 38.

As compared with the configuration shown in FIG. 38, a receiver class information management unit 1801 is added in the receiving apparatus (in the receiver class-1) 1800 shown in FIG. 56.

The receiver class information management unit 1801 of the receiving apparatus (in the receiver class-1) 1800 shown in FIG. 56 stores receiver class information. When receiving a read request, the receiver class information management unit 1801 outputs the receiver class information. Examples of the receiver class information include information included in the definition of the receiver class-1 shown in FIG. 35A.

The receiving apparatus (in the receiver class-1) 1800 shown in FIG. 56 receives a transmission signal generated as described in Embodiment 6.

FIG. 57 is a diagram showing an example where the output receiver class information is shown on a display that is not illustrated.

According to the definition of the receiver class-1 shown in FIG. 35A, information that the receiver class-1 is capable of receiving some of the programs can also be displayed as shown in FIG. 57.

It should be noted that an integrated circuit may be configured, as one chip, to include a part or whole of the receiving apparatus.

Accordingly, the configuration described thus far provides a receiving apparatus, an integrated circuit, and a computer program for outputting the receiver class information, in a transmission system having a PLP structure.

[Embodiment 18]

Figure 58:
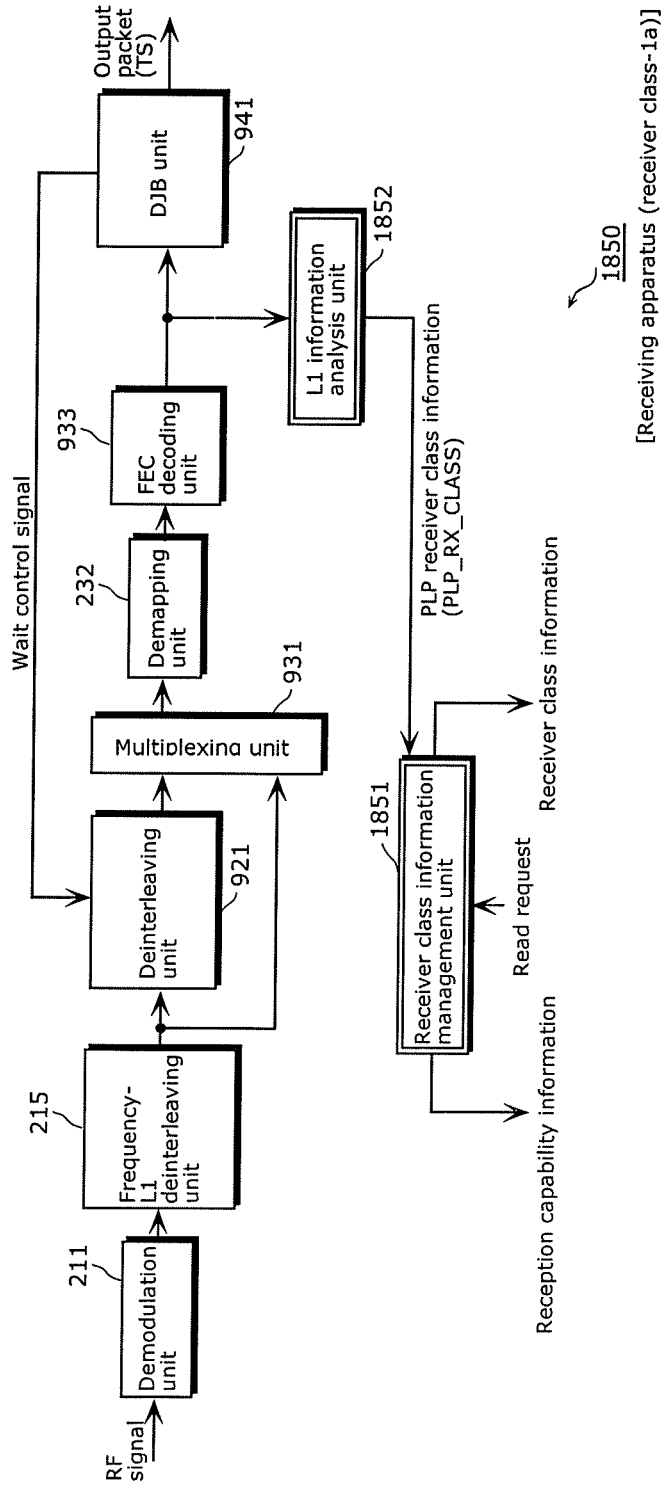
[FIG. 58]

FIG. 58 is a diagram showing a configuration of a receiving apparatus (of a receiver class-1a) 1850 in Embodiment 18 according to the present invention.

Components identical to those of the receiving apparatuses in Embodiments 1 to 17 are assigned the same reference signs as used in the receiving apparatuses in Embodiments 1 to 17. Thus, explanations regarding these components are not repeated.

As compared with the receiving apparatus (in the receiving class-1a) 1650 shown in FIG. 51 in Embodiment 14, the receiving apparatus (in the receiver class-1a) 1850 shown in FIG. 58 has the following configuration. That is, the receiver class information management unit in FIG. 51 is replaced by a receiver class information management unit 1851, and an L1 information analysis unit 1852 is added, as shown in the present configuration.

The receiving apparatus (in the receiver class-1a) 1850 shown in FIG. 58 receives a transmission signal generated as described in Embodiment 5.

As in Embodiment 14, the receiver class information management unit 1851 stores receiver class information and outputs the receiver class information.

The L1 information analysis unit 1852 analyzes the decoded L1 information and outputs PLP receiver class information.

Examples of the PLP receiver class information include PLP_RX_CLASS shown in FIG. 28C.

As explained in Embodiment 5, the receiver class information management unit 1851 determines, from PLP_RX_CLASS, whether or not the receiver class-1a can receive the PLP of the selected program. Then, the receiver class information management unit 1851 outputs information as to whether or not to allow reception.

Figure 59:
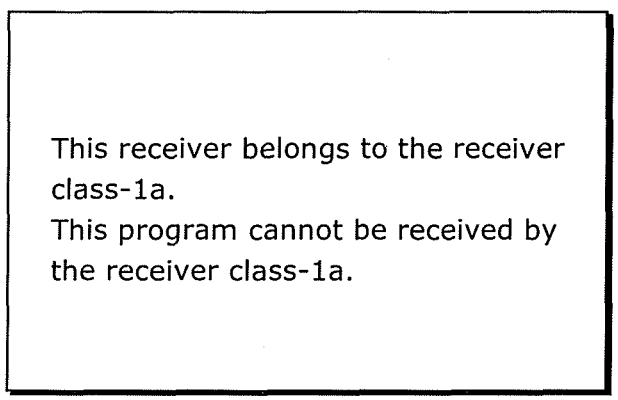
[FIG. 59]

FIG. 59 is a diagram showing an example where the information as to whether or not to allow reception is shown on a display that is not illustrated.

The present example shows the case where the reception is not allowed.

It should be noted that an integrated circuit may be configured, as one chip, to include a part or whole of the receiving apparatus.

Accordingly, the configuration described thus far provides a receiving apparatus, an integrated circuit, and a computer program for outputting information as to whether or not to allow reception, in a transmission system having a PLP structure.

[Embodiment 19]

Figure 60:
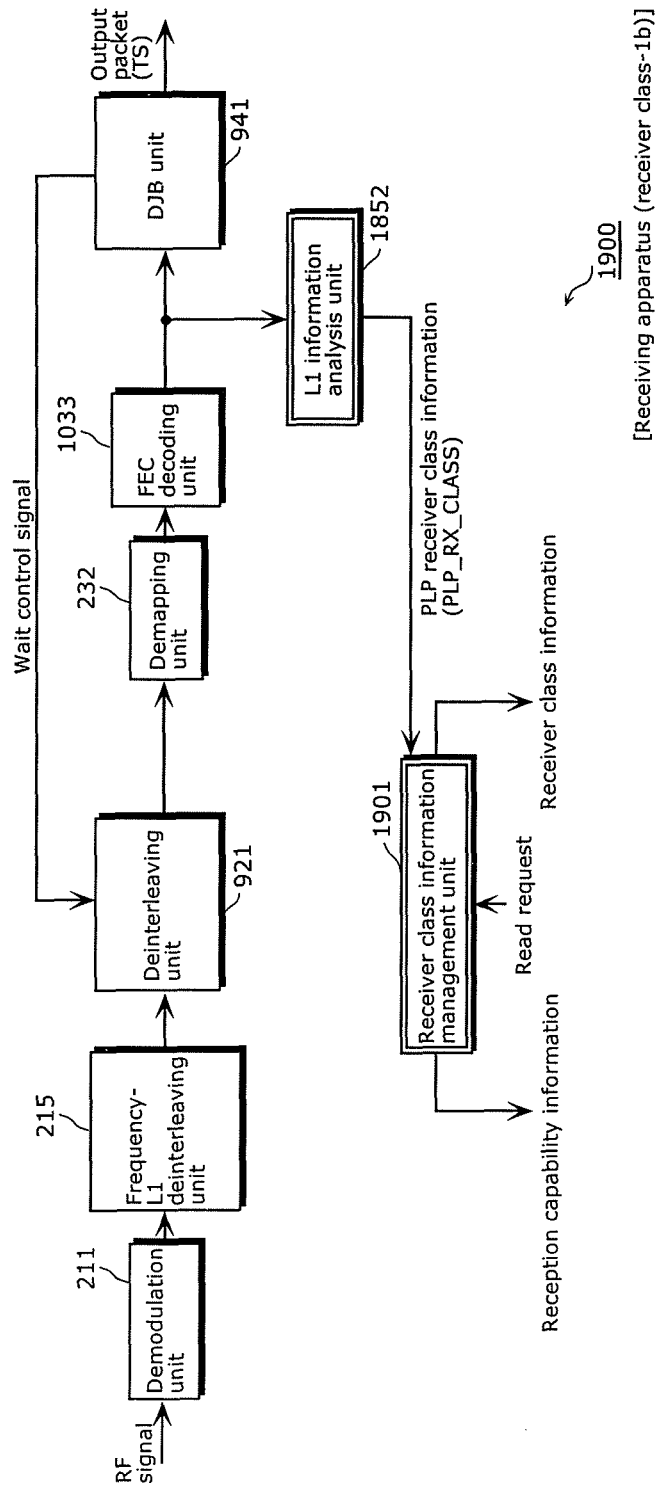
[FIG. 60]

FIG. 60 is a diagram showing a configuration of a receiving apparatus (of a receiver class-1b) 1900 in Embodiment 19 according to the present invention.

Components identical to those of the receiving apparatuses in Embodiments 1 to 18 are assigned the same reference signs as used in the receiving apparatuses in Embodiments 1 to 18. Thus, explanations regarding these components are not repeated.

As compared with the receiving apparatus (in the receiving class-1b) 1700 shown in FIG. 53 in Embodiment 15, the receiving apparatus (in the receiver class-1b) 1900 shown in FIG. 60 has the following configuration. That is, the receiver class information management unit in FIG. 53 is replaced by a receiver class information management unit 1901, and the L1 information analysis unit 1852 is added, as shown in the present configuration.

The receiving apparatus (in the receiver class-1b) 1900 shown in FIG. 60 receives a transmission signal generated as described in Embodiment 5.

As in Embodiment 15, the receiver class information management unit 1901 stores receiver class information and outputs the receiver class information.

The L1 information analysis unit 1852 analyzes the decoded L1 information and outputs PLP receiver class information.

Examples of the PLP receiver class information include PLP_RX_CLASS shown in FIG. 28C.

As explained in Embodiment 5, the receiver class information management unit 1901 determines, from PLP_RX_CLASS, whether or not the receiver class-1b can receive the PLP of the selected program. Then, the receiver class information management unit 1901 outputs information as to whether or not to allow reception.

FIG. 61 is a diagram showing an example where the information as to whether or not to allow reception is shown on a display that is not illustrated.

The present example shows the case where the reception is not allowed.

It should be noted that an integrated circuit may be configured, as one chip, to include a part or whole of the receiving apparatus.

Accordingly, the configuration described thus far provides a receiving apparatus, an integrated circuit, and a computer program for outputting information as to whether or not to allow reception, in a transmission system having a PLP structure.

[Embodiment 20]

Figure 62:
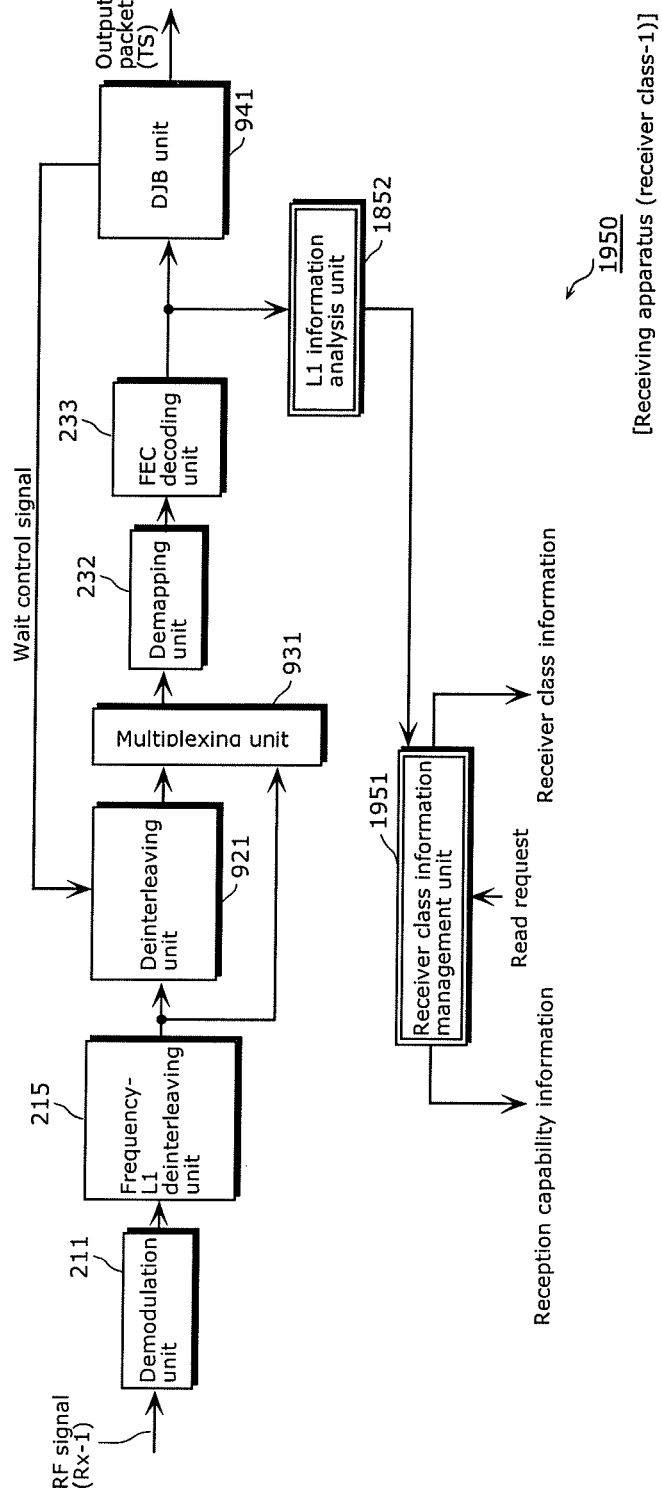
[FIG. 62]

FIG. 62 is a diagram showing a configuration of a receiving apparatus (of a receiver class-1) 1950 in Embodiment 20 according to the present invention.

Components identical to those of the receiving apparatuses in Embodiments 1 to 19 are assigned the same reference signs as used in the receiving apparatuses in Embodiments 1 to 19. Thus, explanations regarding these components are not repeated.

As compared with the receiving apparatus (in the receiving class-1) 1800 shown in FIG. 56 in Embodiment 17, the receiving apparatus (in the receiver class-1) 1950 shown in FIG. 62 has the following configuration. That is, the receiver class information management unit in FIG. 56 is replaced by a receiver class information management unit 1951, and the L1 information analysis unit 1852 is added, as shown in the present configuration.

The receiving apparatus (in the receiver class-1) 1950 shown in FIG. 62 receives a transmission signal generated as described in Embodiment 6.

As in Embodiment 17, the receiver class information management unit 1951 stores receiver class information and outputs the receiver class information.

The L1 information analysis unit 1852 analyzes the decoded L1 information and outputs PLP receiver class information.

Examples of the PLP receiver class information include PLP_RX_CLASS shown in FIG. 35C.

As explained in Embodiment 6, the receiver class information management unit 1951 determines, from PLP_RX_CLASS, whether or not the receiver class-1 can receive the PLP of the selected program. Then, the receiver class information management unit 1951 outputs information as to whether or not to allow reception.

Figure 63:
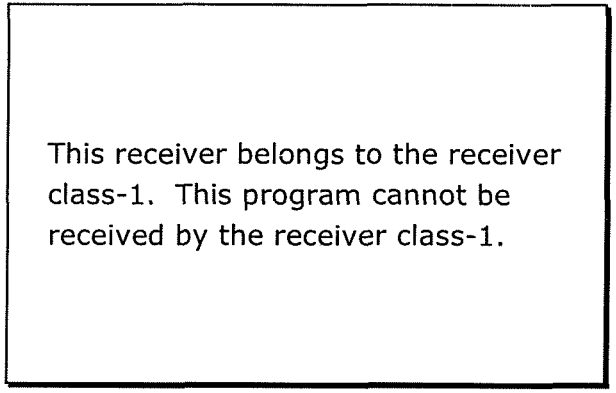
[FIG. 63]

FIG. 63 is a diagram showing an example where the information as to whether or not to allow reception is shown on a display that is not illustrated.

The present example shows the case where the reception is not allowed.

It should be noted that an integrated circuit may be configured, as one chip, to include a part or whole of the receiving apparatus.

It should be noted that a receiving apparatus (see a receiving apparatus 2c1 shown in FIG. 64 described later, for example) may output information (using an image, letters, or the like) indicating a class (or, a state) of the current receiving apparatus as shown in FIG. 63 described above.

For example, the information may be displayed as an expression representing the class, or may be outputted as an audio representing the class.

It should be noted, for example, that this information may indicate whether or not the current receiving apparatus can receive a channel as shown in FIG. 63.

Such information may be outputted at the following timing.

For example, an instruction may be sent from a remote control to the receiving apparatus which is a TV set.

With this instruction, for example, a channel may be selected from among a plurality of channels.

The aforementioned information may be outputted when this selection is made.

Note that the output information indicates, for example, whether or not the selected channel can be received.

Moreover, the current receiving apparatus may display electronic program guide (EPG) information, for example.

When this EPG information is displayed, the aforementioned information may also be outputted.

For example, the displayed EPG information may include information for each of the channels.

Together with the information regarding the channel, the aforementioned information indicating whether or not the reception of the channel is allowed may be outputted.

For example, when the channel information included in the EPG information is displayed, the aforementioned information indicating whether or not the reception of the channel is allowed may also be displayed near a position where the channel information is displayed.

It should be noted that the receiving apparatus may be a cellular phone, for example.

When an incoming call arrives, the cellular phone may vibrate.

The output information may be information to be notified to a user by the vibration by the receiving apparatus which is the cellular phone.

Figure 64:
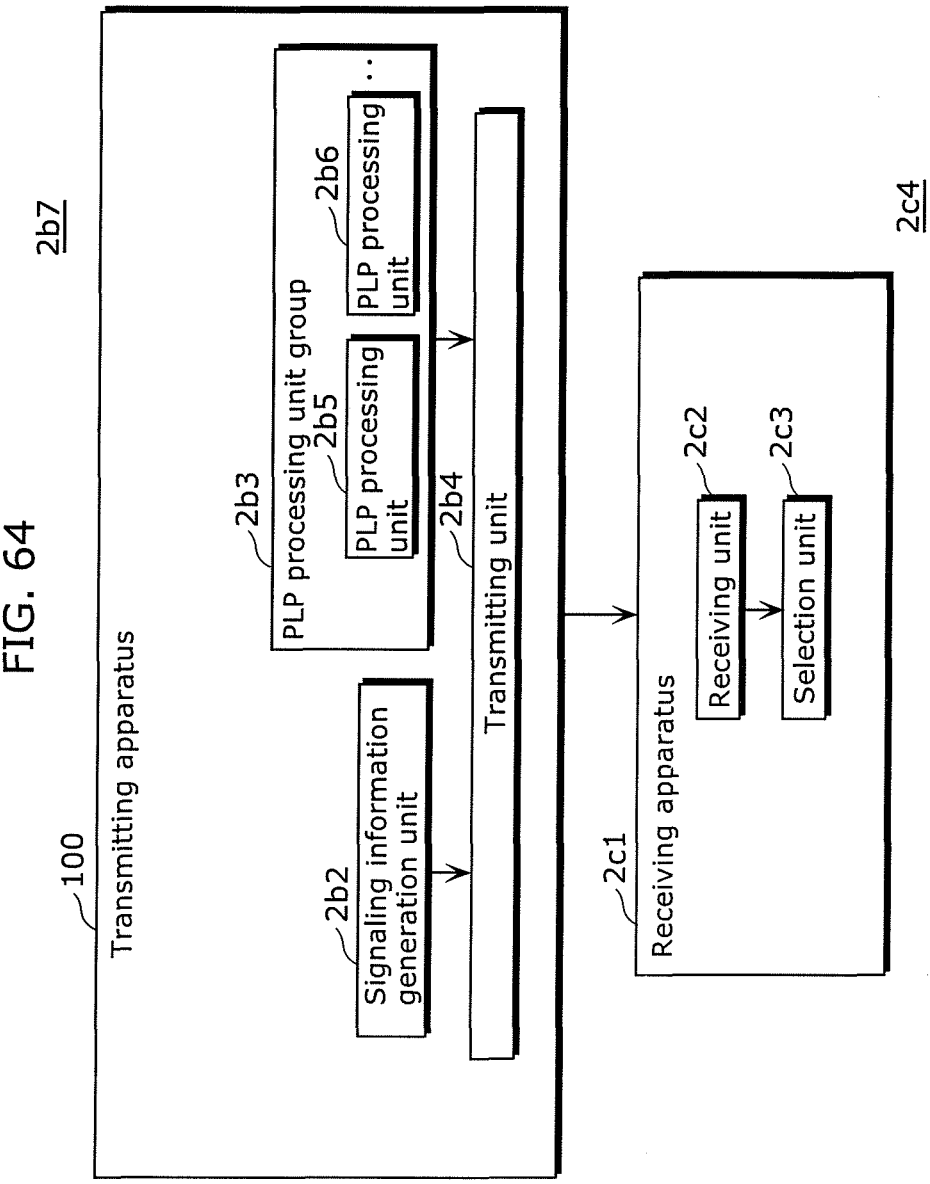
[FIG. 64]

FIG. 64 is a diagram showing the transmitting apparatus 100 (shown in FIG. 5) and so forth.

FIG. 65 is a diagram showing the data 2e and so forth.

Figure 66:
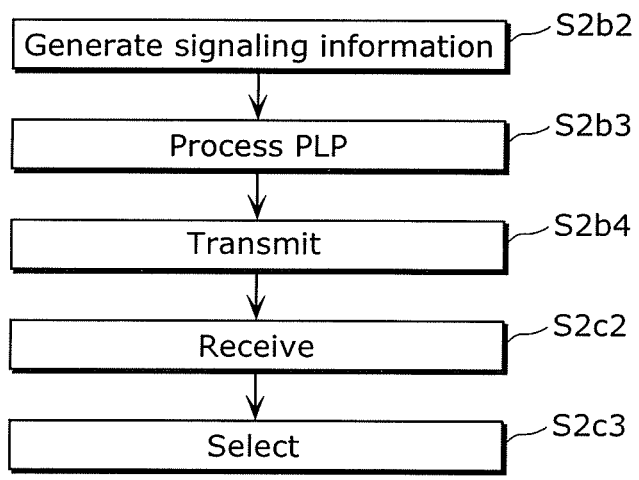
[FIG. 66]

FIG. 66 is a diagram showing a flow of an operation performed by a system including the transmitting apparatus 100 and the receiving apparatus 2c1.

It should be noted that the system including the transmitting apparatus 100 and the receiving apparatus 2c1 may perform the following operation in an aspect.

To be more specific, the transmitting apparatus 100 may transmit the data 2e (shown in FIG. 65) of a TV program to be broadcasted.

Note that the transmitting apparatus 100 may be provided in, for example, the transmission facility 2b7 (such as a facility at a broadcast station) that transmits a wireless signal of the data 2e.

For example, the transmitting apparatus 100 may transmit the aforementioned data 2e by transmitting the above wireless signal via an antenna or the like.

The receiving apparatus 2c1 is, for example, a TV set provided in a house 2c4, and reproduces video, audio, and the like of the TV program of the data 2e transmitted as the wireless signal.

The transmitting unit 2b4 (shown in FIG. 64) transmits the data 2e (S2b4 in FIG. 66).

It should be noted that the data 2e to be sent is, for example, a transmission frame (see a Frame 1 in FIG. 1, for instance).

The data 2e to be sent includes the data 2e1 (see the data 2a2 in FIG. 1) and the signaling information 2e2 (see the data 2a1 in FIG. 1).

The signaling information 2e2 is generated by the signaling information generation unit 2b2 (S2b2).

It should be noted that the data 2e1 is the aforementioned main signal and the signaling information 2e2 is the L1 signaling information, for example, as described above.

The data 2e1 includes the data regarding the PLPs (the data 2f1, 2f2, ... )

Each piece of the included data (see the data 2a3 in FIG. 1) indicates information regarding video, audio, or the like.

This video, for example, is video of the aforementioned TV program to be broadcasted.

The signaling information 2e2 includes flags (a flag 2g1, a flag 2g2, ... ) of the PLPs.

It should be noted that each of the flags (see the data 1b in FIG. 6C) indicates a transmission parameter, for example.

Each of the flags identifies a corresponding receiving apparatus (a receiver) that receives the PLP data corresponding to the current flag, from among the receiving apparatuses classified under a plurality of states (such as the receiving apparatus 2d1 in a first state and the receiving apparatus 2d2 in a second state).

It should be noted that, for example, a configuration of the receiving apparatus (such as the receiving apparatus 2d1) in the corresponding state (such as the first state) may be set by a manufacturer of the current receiving apparatus.

Moreover, the receiving apparatus (such as the receiving apparatus 2d1) in the corresponding state may be in this state while the receiving apparatus processes the data 2e, for example.

In this way, the receiving apparatuses are classified under the plurality of classes (or, states). A receiving apparatus is present for each of the classes (or, states).

It should be noted that each piece of PLP data (such as the data 2f1 or 2f2) included in the data 2e1 may be generated by the PLP processing unit corresponding to the current PLP, out of the plurality of the PLP processing units (such as the PLP processing units 2b5 and 2b6) (S2b3).

The receiving unit 2c2 included in the receiving apparatus 2c1 (the receiving apparatus 2d1 or 2d2) receives the signaling information 2e2 included in the transmitted data 2e (S2c2).

The selection unit 2c3 selects the data of a next PLP to be received as the PLP data by the receiving apparatus 2c1 (S2c3).

The selected data is the PLP data corresponding to the flag indicating the receiving apparatus in the state of the receiving apparatus 2c1. Here, the flag is included in the received signaling information 2e2, out of the plurality of pieces of PLP data (the data 2f1, 2f2, . . . ) included in the transmitted data 2e.

Thus, the data (the data 2f1, 2f2, . . . ) of the information regarding video, audio, and the like refers to the PLP data.

On this account, the plurality of data pieces (the data 2f1, 2f2, . . . ) include two pieces of data as follows.

To be more specific, these two pieces of data may be: modulated according to different methods; coded according to different error correction methods; and coded according to different code rates (compression rates).

Moreover, rates of information such as video and audio included in these two pieces of data may be different from each other, for example.

Furthermore, the number of parity bits included in one of these two data pieces may be different from the number of parity bits included in the other. Moreover, coding and decoding methods for one of these two data pieces may be different from coding and decoding methods for the other (see the fourth column in FIG. 28A, for example).

Furthermore, a buffer (a storage area) of the receiving apparatus 2c1 may store the received PLP data.

It should be noted that the aforementioned buffer may be a storage area having only a capacity of the current buffer and that the storage area may be set in a storage area in memory or the like by the receiving apparatus 2c1.

With the above storage of the PLP data, the deinterleaving process described above may be performed by the receiving apparatus 2c1.

The aforementioned capacity of the buffer used when the PLP data that is one of the above two data pieces is received may be different from the capacity of the buffer used when the PLP data that is the other one of the two data pieces is received.

It should be noted that the PLP data may include data indicating video of each corresponding time of day.

An order in which the data is included in the PLP data may be different from a chronological order of the data.

In the aforementioned deinterleaving process, the PLP data before transformation as described above may be transformed into the transformed PLP data by the aforementioned storage of the PLP data.

For example, an order in which the data is included in the transformed PLP data may be the same as a chronological order of the data.

As a result, the merits in using the PLP technology, such as using the different modulation methods as described above, are obtained.

Moreover, the signaling information 2e2 included in the transmitted data 2e includes the aforementioned plurality of flags (flags 2g1, 2g2, . . . ), as described above.

Thus, each of the pieces of PLP data is received only by the receiving apparatus in the class (state) corresponding to the current PLP and is not received by the receiving apparatus in a different class (state).

Accordingly, the merits in the processing performed based on the plurality of classes are obtained.

Thus, the merits in using the PLP technology and the merits in the processing performed based on the plurality of classes are both obtained.

For example, video, audio, and the like of the PLP data (such as the data 2f1 and 2f2), which is received by the receiving apparatus 2c1 that is a TV set or the like, corresponding to the flag indicating the receiving apparatus in the state of the receiving apparatus 2c1 may be reproduced by this receiving apparatus 2c1.

It should be noted that the plurality of receiving apparatuses may include the first receiving apparatus 2d1 in the first class (shown in FIG. 65) and the second receiving apparatus 2d2 in the second class.

For example, the amount that can be processed by the first receiving apparatus 2d1 may be relatively small. On the other hand, the amount that can be processed by the second receiving apparatus 2d2 may be relatively large.

Moreover, for example, the first receiving apparatus 2d1 may receive the data using a relatively small number of antennas (see the sixth column of the second and third rows in FIG. 21A, for instance). On the other hand, the second receiving apparatus 2d2 may receive the data using a relatively large number of antennas (see the sixth column of the fourth row, for instance).

It should be noted that the first receiving apparatus 2d1 may be an apparatus, such as a cellular phone or a smart phone, carried by a user of the first receiving apparatus 2d1.

On the other hand, the second receiving apparatus 2d2 may be an apparatus, such as a TV set, that is not carried along.

The signaling information 2e2 may include first data and second data.

The first data identifies one or more pieces of PLP data in a first combination (a first data group 2h1).

The identified one or more pieces of PLP data include PLPs corresponding to the flags indicating the first receiving apparatus 2d1.

The first data refers to, for example, data including the flags.

The second data identifies one or more pieces of PLP data in a second combination (a second data group 2h2).

The identified one or more pieces of PLP data include PLPs corresponding to the flags indicating the second receiving apparatus 2d2.

The second data refers to, for example, data including the flags.

On this account, the one or more pieces of PLP data in the first combination includes each of the pieces of PLP data to be received by the first receiving apparatus 2d1.

The one or more pieces of PLP data in the second combination includes each of the pieces of PLP data to be received by the second receiving apparatus 2d2.

For example, as described above, out of video PLP data of a TV program and audio PLP data of the TV program, the one or more pieces of PLP data in the first combination includes only the audio PLP data.

On the other hand, the one or more pieces of PLP data in the second combination includes both video PLP data of a TV program to be broadcasted and audio PLP data of the TV program.

Accordingly, the first receiving apparatus 2d1 in the first class does not receive the video of this TV program and receives only the audio of the TV program. Thus, only the audio is reproduced by the first receiving apparatus 2d1.

On the other hand, the second receiving apparatus 2d2 in the second class receives both the video and the audio of the TV program. Thus, both the video and the audio are reproduced by the second receiving apparatus 2d2.

It should be noted that, for example, the one or more pieces of PLP data in the first combination may include the audio PLP data and the aforementioned common PLP data. In addition to these pieces of data, the one or more pieces of PLP data in the second combination may further include the video PLP data.

It should be noted that, for example, the one or more pieces of PLP data in the second combination may include data indicating information with a relatively high degree of precision, such as video data with a relatively high quality. On the other hand, the one or more pieces of PLP data in the first combination may include data indicating information with a relatively low degree of precision, such as video data with a relatively low quality.

It should be noted that, for example, the one or more pieces of PLP data in the second combination may include expansion data for showing the video in 3D. On the other hand, the one or more pieces of PLP data in the first combination may include data for showing the video in 2D and may not include the expansion data.

Accordingly, the aforementioned plurality of flags (the aforementioned first and second data) are included in the transmitted data 2e, so that an appropriated reproduction (the reproduction of both the audio and the video, and the reproduction of only the audio) suited for the class of the receiving apparatus 2c1 is performed. As a result, the corresponding reproduction can be performed more appropriately.

In addition, since the plurality of flags are simply included in the data 2 to be sent by the transmitting apparatus 100, the receiving apparatus 2c1 does not need to perform, for example, a process of determining whether or not to allow PLP data to be received. Therefore, the processing can be performed easily.

Moreover, this can prevent the receiving apparatus 2c1 from performing an inappropriate process as the determination process and executing an inappropriate reproduction. Therefore, an appropriate reproduction can be executed with relative reliability.

It should be noted that the signaling information 2e may include a transmission parameter suited for the aforementioned reception performed by the corresponding receiving apparatus (the receiving apparatus 2d1 or 2d2).

For example, the receiving apparatus may perform the aforementioned reception, using a parameter suited for the current receiving apparatus out of a plurality of the included transmission parameters.

Each of the plurality of transmission parameters may be data indicating the aforementioned capacity of the corresponding buffer, for example.

A storage area having the capacity indicated by the transmission parameter corresponding to the receiving apparatus performing the reception may be set as the above buffer. Then, the receiving apparatus may perform the aforementioned reception For example, by setting the storage area having the indicated capacity, an inappropriate operation such as a buffer overflow can be prevented so that an appropriate operation can be performed.

It should be noted that when one transmission parameter (see the data 1b in FIG. 6C, for example) included in the signaling information 2e is received by one of the receiving apparatuses (such as the receiving apparatuses 2d1 and 2d2) in two or more classes, the transmission parameter may be used by the current receiving apparatus.

For example, the selection unit 2c3 may identify or extract, from the received signaling information 2e2, the transmission parameter used by the receiving apparatus 2c1 including the selection 2c3.

Accordingly, the identified transmission parameter may be used by this receiving apparatus 2c1.

For example, when the first receiving apparatus 2d1 in the first class performs the aforementioned reception, a first process specified by a first transmission parameter corresponding to the first class may be performed. On the other hand, when the second receiving apparatus 2d2 in the second class performs the aforementioned reception, a second process specified by a second transmission parameter corresponding to the second class may be performed.

For example, the first process may refer to a process according to a first standard, and the second process may refer to a process according to a second standard different from the first standard.

For example, the first standard may be a standard of a first branch of a third standard, and the second standard may be a standard of a second branch of the third standard (see the fifth column in FIG. 28A, for instance).

Moreover, the first standard may be a standard of a first version, and the second standard may be a standard of another version different from the first version.

Furthermore, coding and decoding methods employed in the first process may be a first method, and coding and decoding methods employed in the second process may be a second method (see the fourth column in FIG. 28A, for instance).

It should be noted that the first process may perform reproduction with a first degree of precision, and that the second process may perform reproduction with a second degree of precision.

For example, a resolution of reproduction by the first process may be different from that of reproduction by the second process.

Moreover, a rate (i.e., a bit rate) at which information including video and audio is reproduced by the first process may be different from a rate at which reproduction is performed by the second process.

Accordingly, the configuration described thus far provides a receiving apparatus, an integrated circuit, and a computer program for outputting information as to whether or not to allow reception, in a transmission system having a PLP structure.

A receiving apparatus is disclosed that sets, for a transmission signal on which a process is performed based on a transmission parameter for each PLP (physical layer pipe) where the transmission parameter can be independently set, a receiver class on the basis of the number of PLPs to be received from the transmission signal, and outputs information regarding the receiver class. The receiving apparatus may output information regarding the receiver class of its own, as the information regarding the receiver class. The receiving apparatus may output information regarding a receivable service component, as the information regarding the receiver class. The receiving apparatus may select audio or video as the receivable service component. The receiving apparatus may select among audio, first-type video, and second-type video as the receivable service component. The receiving apparatus may output information regarding a receivable program type, as the information regarding the receiver class. The receiving apparatus may present that all programs are receivable, as the information regarding the receivable program type. The receiving apparatus may present that some of programs are receivable, as the information regarding the receivable program type. The receiving apparatus may set, for a transmission signal on which a process is performed based on a transmission parameter for each PLP (physical layer pipe) where the transmission parameter can be independently set, a receiver class on the basis of a branch of the standard to be received from the transmission signal, and may output information as to whether or not to allow reception. The receiving apparatus may output, as the information as to whether or not to allow reception, information indicating whether or not the selected program is receivable. The receiving apparatus may set, for a transmission signal on which a process is performed based on a transmission parameter for each PLP (physical layer pipe) where the transmission parameter can be independently set, a receiver class on the basis of a version of the standard to be received from the transmission signal, and may output information as to whether or not to allow reception.

The receiving apparatus may output, as the information as to whether or not to allow reception, information indicating whether or not the selected program is receivable. The receiving apparatus may set, for a transmission signal on which a process is performed based on a transmission parameter for each PLP (physical layer pipe) where the transmission parameter can be independently set, a receiver class on the basis of the number of PLPs to be received from the transmission signal, and may output information regarding the receiver class. The receiving apparatus may set, for a transmission signal on which a process is performed based on a transmission parameter for each PLP (physical layer pipe) where the transmission parameter can be independently set, a receiver class on the basis of a branch of the standard to be received from the transmission signal, and may output information as to whether or not to allow reception. The receiving apparatus may set, for a transmission signal on which a process is performed based on a transmission parameter for each PLP (physical layer pipe) where the transmission parameter can be independently set, a receiver class on the basis of a version of the standard to be received from the transmission signal, and may output information as to whether or not to allow reception. An integrated circuit is disclosed that sets, for a transmission signal on which a process is performed based on a transmission parameter for each PLP (physical layer pipe) where the transmission parameter can be independently set, a receiver class on the basis of the number of PLPs to be received from the transmission signal, and outputs information regarding the receiver class.

An integrated circuit is disclosed that sets, for a transmission signal on which a process is performed based on a transmission parameter for each PLP (physical layer pipe) where the transmission parameter can be independently set, a receiver class on the basis of a branch of the standard to be received from the transmission signal, and outputs information as to whether or not to allow reception.

An integrated circuit is disclosed that sets, for a transmission signal on which a process is performed based on a transmission parameter for each PLP (physical layer pipe) where the transmission parameter can be independently set, a receiver class on the basis of a version of the standard to be received from the transmission signal, and outputs information as to whether or not to allow reception.

A transmitting apparatus is disclosed that includes: an L1 (Layer-1) signaling information generation unit which generates L1 signaling information storing a transmission parameter; and a PLP processing unit which performs a process based on the transmission parameter for each PLP (physical layer pipe) where the transmission parameter can be independently set. The L1 signaling information generation unit generates the transmission parameter based on the number of PLPs to be received by a receiver. The PLP processing unit performs the process using the transmission parameter based on the number of PLPs to be received by the receiver.

The L1 signaling information generation unit may generate a transmission parameter based on the number of all PLPs to be received by a receiver, and the PLP processing unit may perform a process using the transmission parameter based on the number of all PLPs to be received by the receiver. The L1 signaling information generation unit may generate a transmission parameter based on the number of some of the PLPs to be received by a receiver, and the PLP processing unit may which perform a process using the transmission parameter based on the number of some of the PLPs to be received by the receiver. The L1 signaling information generation unit may generate an interleaved amount corresponding to the number of all the PLPs to be received by a receiver, and the PLP processing unit may perform an interleaving process based on the interleaved amount corresponding to the number of all the PLPs to be received by the receiver. The L1 signaling information generation unit may generate an interleaved amount corresponding to the number of some of the PLPs to be received by a receiver, and the PLP processing unit may perform an interleaving process based on the interleaved amount corresponding to the number of some of the PLPs to be received by the receiver.

The PLP processing unit may generate a de-jitter buffer (DJB) capacity corresponding to the number of all the PLPs to be received by the receiver. The PLP processing unit may generate a DJB capacity corresponding to the number of some of the PLPs to be received by the receiver.

The L1 signaling information generation unit may generate a synchronization condition for an integration process performed by the receiver after the de-jitter buffering.

The PLP processing unit may perform a process using, as an input, service component information or L2 (Layer-2) information.

The number of the PLPs to be received by the receiver may be determined on the basis of the number of service components to be received and the number of pieces of L2 information to be received.

The PLP processing unit may select, when performing a transmission process, one of SISO (single-input single-output) transmission, MISO (multi-input single-output) transmission, and MIMO (multi-input multi-output) transmission.

This selection is made on the basis of the type of the service component to be received or on whether or not the input is the L2 information.

The receiver classes may be set on the basis of the number of PLPs to be received by the receiver. Moreover, the L1 signaling information generation unit may generate, for each of the PLPs, information indicating the receiver class that receives the PLP and information indicating one of SISO transmission, MISO transmission, and MIMO transmission.

The receiver classes may be set on the basis of the number of PLPs to be received by the receiver. Moreover, the L1 signaling information generation unit may generate, for each of the PLPs, information indicating the receiver class that receives the PLP.

A transmitting apparatus is disclosed that includes: an L1 (Layer-1) signaling information generation unit which generates L1 signaling information storing a transmission parameter; and a PLP processing unit which performs a process based on a transmission parameter for each PLP (physical layer pipe) where the transmission parameter can be independently set. The L1 signaling information generation unit generates the transmission parameter based on a branch of the standard. The PLP processing unit performs the process using the transmission parameter based on the branch of the standard.

The transmitting apparatus is disclosed that employs the branch of the standard including a different error correction method.

The receiver classes may be set on the basis of a branch of the standard used by the receiver. Moreover, the L1 signaling information generation unit may generate, for each of the PLPs, information indicating the receiver class that receives the PLP.

A transmitting apparatus is disclosed that includes: an L1 (Layer-1) signaling information generation unit which generates L1 signaling information storing a transmission parameter; and a PLP processing unit which performs a process based on a transmission parameter for each PLP (physical layer pipe) where the transmission parameter can be independently set. The L1 signaling information generation unit generates the transmission parameter based on a version of the standard. The PLP processing unit performs the process using the transmission parameter based on the version of the standard.

For each of the versions of the standard, a different one of SISO transmission, MISO transmission, and MIMO transmission may be employed.

A receiver buffer model is disclosed that is used for preventing a buffer overflow and/or a buffer underflow from occurring to the receiver when a transmitting side generates a transmission parameter. The receiver buffer model includes: deinterleaving units as many as the number of PLPs to be received; and DJBs (de-jitter buffers) as many as the number of PLPs to be received.

The number of the PLPs to be received by the receiver may be determined on the basis of the number of service components to be received and the number of pieces of L2 information to be received.

For each of the PLPs, one of SISO (single-input single-output) transmission, MISO (multi-input single-output) transmission, and MIMO (multi-input multi-output) transmission may be selected. This selection is made on the basis of the type of the service component to be received or on whether or not the input is the L2 information.

The receiver classes may be set on the basis of the number of PLPs to be received by the receiver, and the receiver buffer model may be defined for each of the receiver classes.

A receiver buffer model may be used for preventing a buffer overflow and/or a buffer underflow from occurring to the receiver when a transmitting side generates a transmission parameter. The receiver buffer model may set the receiver classes on the basis of a branch of the standard to be used by the receiver and may be defined for each of the receiver classes.

For each of the branches of the standard, a different error correction method may be employed.

A receiver buffer model may be used for preventing a buffer overflow and/or a buffer underflow from occurring to the receiver when a transmitting side generates a transmission parameter. The receiver buffer model may set the receiver classes on the basis of a version of the standard to be used by the receiver and may be defined for each of the receiver classes.

For each version of the standard, a different one of SISO transmission, MISO transmission, and MIMO transmission may be employed.

A receiving apparatus may include: deinterleaving units as many as the maximum number of PLPs to be received; and DJBs (de-jitter buffers) as many as the maximum number of PLPs to be received.

The maximum number of the PLPs to be received may be determined on the basis of the number of service components to be received and the number of pieces of L2 information to be received.

For each of the PLPs, one of SISO (single-input single-output) transmission, MISO (multi-input single-output) transmission, and MIMO (multi-input multi-output) transmission may be selected. This selection is made on the basis of the type of the service component to be received or on whether or not the input is the L2 information.

A transmitting method is disclosed that includes: a step of generating L1 signaling information storing a transmission parameter; and a step of performing a process based on the transmission parameter for each PLP (physical layer pipe) where the transmission parameter can be independently set. In the step of generating the L1 signaling information, the transmission parameter is generated based on the number of PLPs to be received by a receiver. In the step of performing the process for each PLP, the process is performed using the transmission parameter based on the number of PLPs to be received by the receiver.

A transmitting method includes: a step of generating L1 signaling information storing a transmission parameter; and a step of performing a process based on the transmission parameter for each PLP (physical layer pipe) where the transmission parameter can be independently set. In the step of generating the L1 signaling information, the transmission parameter may be generated based on a branch of the standard. In the step of performing the process for each PLP, the process may be performed using the transmission parameter based on the branch of the standard.

A transmitting method includes: a step of generating L1 signaling information storing a transmission parameter; and a step of performing a process based on the transmission parameter for each PLP (physical layer pipe) where the transmission parameter can be independently set. In the step of generating the L1 signaling information, the transmission parameter may be generated based on a version of the standard. In the step of performing the process for each PLP, the process may be performed using the transmission parameter based on the version of the standard.

A receiving method is disclosed that includes: a step of performing interleaving processes as many as the maximum number of PLPs to be received; and a step of performing de-jitter buffering processes as many as the maximum number of PLPs to be received.

An integrated circuit is disclosed that includes: deinterleaving units as many as the maximum number of PLPs to be received; and DJBs (de-jitter buffers) as many as the maximum number of PLPs to be received.

It should be noted that the present invention can be implemented not only as an apparatus, but also as: a method having, as steps, processing units included in the apparatus; a computer program causing a computer to execute the steps; a computer-readable recording medium, such as a CD-ROM, having the computer program recorded thereon; and information, data, or a signal indicating the computer program. The computer program, the information, the data, and the signal may be distributed via a communication network, such as the Internet.

[Industrial Applicability]

The transmitting apparatus, the transmitting method, the receiver buffer model, the receiving apparatus, the receiving method, the integrated circuit, and the computer program according to the present invention can be applied particularly to a transmission system having a PLP structure where a transmission parameter can be independently set.

REFERENCE SIGNS LIST

100, 300, 400, 600, 800, 1100, 2000 Transmitting apparatus
112, 312, 412, 612, 812, 1112, 2012 Physical layer processing unit
1211, 1212, 3211, 3212, 4211, 4212 PLP assignment unit
1311 to 1318, 13110, 13111, 831, 20311, 20312 PLP processing unit
141, 341, 441, 641, 841, 1141, 2041 L1 information processing unit
171, 2071 Input processing unit
174, 2084 Interleaving unit
181, 381, 481, 681, 881, 1181, 2081 L1 information generation unit
200, 550, 750, 900, 1200 Receiver buffer model (in a receiver class-2)
211 Demodulation unit
215 Frequency-L1 deinterleaving unit
221 Audio deinterleaving unit
222 Video deinterleaving unit
223 L2 information deinterleaving unit
232 Demapping unit
231, 281, 531, 581, 931 Multiplexing unit
233, 933, 1033 FEC decoding unit
234, 284, 534, 584 Separation unit
241 Audio DJB unit
242 Video DJB unit
243 L2 information DJB unit
250, 1250 Receiver buffer model (in a receiver class-1)
4221, 4222, 20221, 20222 Video coding unit
425, 2025 L2 information processing unit
500, 700 Receiver buffer model (in a receiver class-3)
524 Video-B deinterleaving unit
525 Video-E deinterleaving unit
544 Video-B DJB unit
545 Video-E DJB unit
6322, 6325, 6329 MISO-PLP processing unit
6331, 6333, 6336, 63310 MIMO-PLP processing unit
651, 2051 Frame structure unit
675 MISO coding unit
676 MIMO coding unit
732 SISO-MISO-MIMO demapping unit
782 SISO-MISO demapping unit
872, 2072, 2082 FEC coding unit
921 Deinterleaving unit
941 DJB unit
950 Receiver buffer model (in a receiver class-1a)
1000 Receiver buffer model (in a receiver class-1b)
1232 SISO/MIMO demapping unit
1300, 1450, 1550, 1600, 1750 Receiver buffer model (in a receiver class-2)
1301, 1351, 1401, 1451, 1501, 1551, 1601, 1651, 1701, 1751, 1801, 1851, 1901, 1951 Receiver class information management unit
1350, 1800, 1950 Receiving apparatus (in a receiver class-1)
1400, 1500 Receiving apparatus (in a receiver class-3)
1650, 1850 Receiving apparatus (in a receiver class-1a)
1700, 1900 Receiving apparatus (in a receiver class-1b)
1852 L1 information analysis unit
2010, 2011 TS generation unit
20211, 20212 Audio coding unit
20231 to 20236 Packetization unit
2024 Packetized-stream multiplexing unit
2061 OFDM signal generation unit
2073, 2083 Mapping unit

The invention claimed is:

1. A communication system comprising:

a transmitting apparatus, wherein the transmitting apparatus includes:

a signaling information generator configured to generate signaling information including a transmission parameter for each of a plurality of physical layer pipes (PLPs);

a PLP processor configured to perform a process based on the transmission parameter for each of the PLPs; and a transmitter configured to transmit data including (i) the generated signaling information and (ii) PLP data for each of the PLPs, wherein:

the PLP data is received by a receiving apparatus that is indicated by a flag of the PLP and is not received by an other receiving apparatus, the receiving apparatuses being included in a plurality of receiving apparatuses classified under a plurality of states, the generated signaling information includes, as the transmission parameter for each of the PLPs, the flag of the PLP, the receiving apparatuses classified under the states include a first receiving apparatus and a second receiving apparatus, the state of the second receiving apparatus is one of the state of the first receiving apparatus and a state different from the state of the first receiving apparatus, the second receiving apparatus receives each piece of PLP data received by the first receiving apparatus, a plurality of pieces of PLP data corresponding to the PLPs include first PLP data representing audio and second PLP data representing video;

the flag of the first PLP data indicates both the first receiving apparatus and the second receiving apparatus, the flag of the second PLP data indicates only the second receiving apparatus, the first receiving apparatus (i) receives only the first PLP data, (ii) does not receive the second PLP data, (iii) reproduces only the audio, and (iv) does not reproduce the video, and the second receiving apparatus receives both the first PLP data and the second PLP data, and reproduces both the audio and the video represented respectively by the received first PLP data and the received second PLP data.

2. The transmitting apparatus according to claim 1,
wherein the signaling information generator is configured to generate data indicating an interleaved amount that is appropriate for the receiving apparatus to receive the PLP data, the interleaved amount corresponding to the number of pieces of PLP data to be received by the receiving apparatus, and
the PLP processor is configured to perform interleaving based on the interleaved amount indicated by the generated data.

3. The transmitting apparatus according to claim 1,
wherein the PLP processor is configured to generate data indicating a de-jitter buffer (DJB) capacity that is appropriate for the receiving apparatus to receive the PLP data,
the DJB capacity corresponding to the number of pieces of PLP data to be received by the receiving apparatus.

4. The transmitting apparatus according to claim 1,
wherein the signaling information generator is configured to generate the transmission parameter based on a standard included in a plurality of standards, and
the PLP processor is configured to perform the process using the transmission parameter based on the standard.

5. The transmitting apparatus according to claim 4,
wherein an error correction method used by the standard is different from an error correction method used by an other standard included in the plurality of standards.

6. The transmitting apparatus according to claim 1,
wherein the signaling information generator is configured to generate the transmission parameter based on a version of a standard, and
the PLP processor is configured to perform the process using the transmission parameter based on the version.

7. The transmitting apparatus according to claim 6,
wherein a combination of one or more of transmission methods adopted by the version is different from a combination of one or more of the transmission methods adopted by an other version of the standard, the transmission methods including a single-input single-output (SISO) transmission method, a multi-input single-output (MISO) transmission method, and a multi-input multi-output (MIMO) transmission method.

8. A receiving apparatus comprising:
a receiver configured to receive signaling information included in data including each of transmitted pieces of PLP data; and
a selector configured to select at least one of the pieces of PLP data as the PLP data to be received by the receiving apparatus,
wherein:
the signaling information to be received includes a flag for each of the pieces of PLP data,
the flag identifies, from among a plurality of receiving apparatuses classified under a plurality of states, at least one of the receiving apparatuses that receives the PLP data corresponding to the flag,
the selector is configured to select, as the PLP data to be received by the receiving apparatus including the selector, the PLP data corresponding to the flag identifying a receiving apparatus that is classified under the state of the receiving apparatus including the selector,
the receiving apparatuses classified under the states include a first receiving apparatus and a second receiving apparatus,
the state of the second receiving apparatus is one of the state of the first receiving apparatus and a state different from the state of the first receiving apparatus,
the second receiving apparatus receives each piece of PLP data received by the first receiving apparatus,
a plurality of pieces of PLP data corresponding to the PLPs include first PLP data representing audio and second PLP data representing video;
the flag of the first PLP data indicates both the first receiving apparatus and the second receiving apparatus,
the flag of the second PLP data indicates only the second receiving apparatus,
the first receiving apparatus (i) receives only the first PLP data, (ii) does not receive the second PLP data, (iii) reproduces only the audio, and (iv) does not reproduce the video, and
the second receiving apparatus receives both the first PLP data and the second PLP data, and
reproduces both the audio and the video represented respectively by the received first PLP data and the received second PLP data.

9. A communication method comprising:
generating signaling information including a transmission parameter for each of a plurality of PLPs;
performing a process based on the transmission parameter for each of the PLPs; and
transmitting data including (i) the generated signaling information and (ii) PLP data for each of the PLPs;
wherein:
the PLP data is received by a receiving apparatus that is indicated by a flag of the PLP and is not received by another receiving apparatus, the receiving apparatuses being included in a plurality of receiving apparatuses classified under a plurality of states,
the generated signaling information includes the flag as the transmission parameter for each of the PLPs,
the receiving apparatuses classified under the states include a first receiving apparatus and a second receiving apparatus,
the state of the second receiving apparatus is one of the state of the first receiving apparatus and a state different from the state of the first receiving apparatus,
the second receiving apparatus receives each piece of PLP data received by the first receiving apparatus,
a plurality of pieces of PLP data corresponding to the PLPs include first PLP data representing audio and second PLP data representing video;
the flag of the first PLP data indicates both the first receiving apparatus and the second receiving apparatus,
the flag of the second PLP data indicates only the second receiving apparatus,
the first receiving apparatus (i) receives only the first PLP data, (ii) does not receive the second PLP data, (iii) reproduces only the audio, and (iv) does not reproduce the video, and
the second receiving apparatus receives both the first PLP data and the second PLP data,
and reproduces both the audio and the video represented respectively by the received first PLP data and the received second PLP data.

10. A receiving method comprising:
receiving signaling information included in data including each of transmitted pieces of PLP data; and
selecting at least one of the pieces of PLP data as the PLP data to be received by a receiving apparatus executing the receiving method, wherein:

the signaling information to be received includes a flag for each of the pieces of PLP data, the flag identifies, from among a plurality of receiving apparatuses classified under a plurality of states, at least one of the receiving apparatuses that receives the PLP data corresponding to the flag, in the selecting, as the PLP data to be received by the receiving apparatus executing the receiving method, the PLP data corresponding to the flag identifying a receiving apparatus that is classified under the state of the receiving apparatus executing the receiving method is selected, the receiving apparatuses classified under the states include a first receiving apparatus and a second receiving apparatus, the state of the second receiving apparatus is one of the state of the first receiving apparatus and a state different from the state of the first receiving apparatus, the second receiving apparatus receives each piece of PLP data received by the first receiving apparatus, wherein a plurality of pieces of PLP data corresponding to the PLPs include first PLP data representing audio and second PLP data representing video;

the flag of the first PLP data indicates both the first receiving apparatus and the second receiving apparatus, the flag of the second PLP data indicates only the second receiving apparatus, the first receiving apparatus (i) receives only the first PLP data, (ii) does not receive the second PLP data, (iii) reproduces only the audio, and (iv) does not reproduce the video, and the second receiving apparatus receives both the first PLP data and the second PLP data, and reproduces both the audio and the video represented respectively by the received first PLP data and the received second PLP data.

* * * * *